United States Patent
Kadar-Kallen et al.

(10) Patent No.: US 11,860,423 B2
(45) Date of Patent: *Jan. 2, 2024

(54) OPTICAL CONNECTOR AND ADAPTER

(71) Applicant: COMMSCOPE TECHNOLOGIES LLC, Hickory, NC (US)

(72) Inventors: Michael Aaron Kadar-Kallen, Harrisburg, PA (US); Michael Ward Zitsch, Carlisle, PA (US); Dwight Andrew Bretz, Hummelstown, PA (US); Michael James Ott, Hudson, WI (US); Robert Charles Flaig, Lancaster, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,607

(22) Filed: May 27, 2022

(65) Prior Publication Data

US 2022/0283380 A1 Sep. 8, 2022

Related U.S. Application Data

(63) Continuation of application No. 17/129,044, filed on Dec. 21, 2020, now Pat. No. 11,347,006, which is a continuation of application No. 16/523,077, filed on Jul. 26, 2019, now Pat. No. 10,871,616, which is a continuation of application No. 16/098,382, filed as application No. PCT/US2017/030450 on May 1, 2017, now Pat. No. 10,409,007.

(60) Provisional application No. 62/447,984, filed on Jan. 19, 2017, provisional application No. 62/330,655, filed on May 2, 2016.

(51) Int. Cl.
*G02B 6/38* (2006.01)

(52) U.S. Cl.
CPC .......... *G02B 6/3809* (2013.01); *G02B 6/3849* (2013.01)

(58) Field of Classification Search
CPC .................................................. G02B 6/3809
See application file for complete search history.

(56) References Cited

U.S. PATENT DOCUMENTS

| 6,425,694 B1 | 7/2002 | Szilagyi et al. |
| 6,471,412 B1 | 10/2002 | Belenkiy et al. |
| 6,648,521 B2 | 11/2003 | Roehrs et al. |

(Continued)

FOREIGN PATENT DOCUMENTS

| EP | 0 697 607 A1 | 2/1996 |
| WO | 2012/112344 A1 | 8/2012 |

(Continued)

OTHER PUBLICATIONS

International Search Report and Written Opinion of the International Searching Authority for International Patent Application No. PCT/US2017/030450 dated Jun. 23, 2017, 14 pages.

(Continued)

*Primary Examiner* — Michael Stahl
(74) *Attorney, Agent, or Firm* — MERCHANT & GOULD P.C.

(57) ABSTRACT

A system for connecting a fiber optic connector to a fiber optic adapter includes various alternative improvements, including improvements to the shutter, the alignment device, and the adapter in general.

23 Claims, 46 Drawing Sheets

(56) References Cited

U.S. PATENT DOCUMENTS

| | | |
|---|---|---|
| 7,959,361 B2 | 6/2011 | Lu et al. |
| 9,158,075 B2 | 10/2015 | Benjamin et al. |
| 9,575,263 B2 | 2/2017 | Gurreri et al. |
| 10,001,605 B2 | 6/2018 | Gurreri et al. |
| 10,409,007 B2 | 9/2019 | Kadar-Kallen et al. |
| 10,509,178 B1 | 12/2019 | Tran et al. |
| 10,684,427 B2 | 6/2020 | Yang |
| 2008/0101757 A1 | 5/2008 | Lin et al. |
| 2010/0054665 A1 | 3/2010 | Jones et al. |
| 2010/0322561 A1 | 12/2010 | Lin et al. |
| 2014/0341511 A1 | 11/2014 | Daems et al. |
| 2015/0362681 A1 | 12/2015 | Watte et al. |
| 2015/0378109 A1 | 12/2015 | Samal et al. |
| 2016/0018604 A1 | 1/2016 | Gurreri et al. |
| 2016/0062051 A1 | 3/2016 | Taira et al. |
| 2016/0124160 A1 | 5/2016 | Verheyden et al. |
| 2016/0170152 A1 | 6/2016 | Verheyden et al. |
| 2017/0184798 A1 | 6/2017 | Coenegracht |
| 2018/0329155 A1 | 11/2018 | Verheyden et al. |
| 2019/0241219 A1 | 8/2019 | Smith |
| 2019/0346627 A1 | 11/2019 | Zimmel et al. |
| 2020/0218015 A1* | 7/2020 | Ho .................... G02B 6/3825 |

FOREIGN PATENT DOCUMENTS

| | | |
|---|---|---|
| WO | 2013/117589 A2 | 8/2013 |
| WO | 2013/117598 A2 | 8/2013 |
| WO | 2014/118224 A1 | 8/2014 |
| WO | 2014/118225 A1 | 8/2014 |
| WO | 2015/048198 A1 | 4/2015 |
| WO | 2017/070220 A1 | 4/2017 |

OTHER PUBLICATIONS

Partial Supplementary European Search Report for Application No. 17793081.5 dated Dec. 5, 2019.

Extended European Search Report for Application No. 17793081.5 dated Mar. 10, 2020.

* cited by examiner

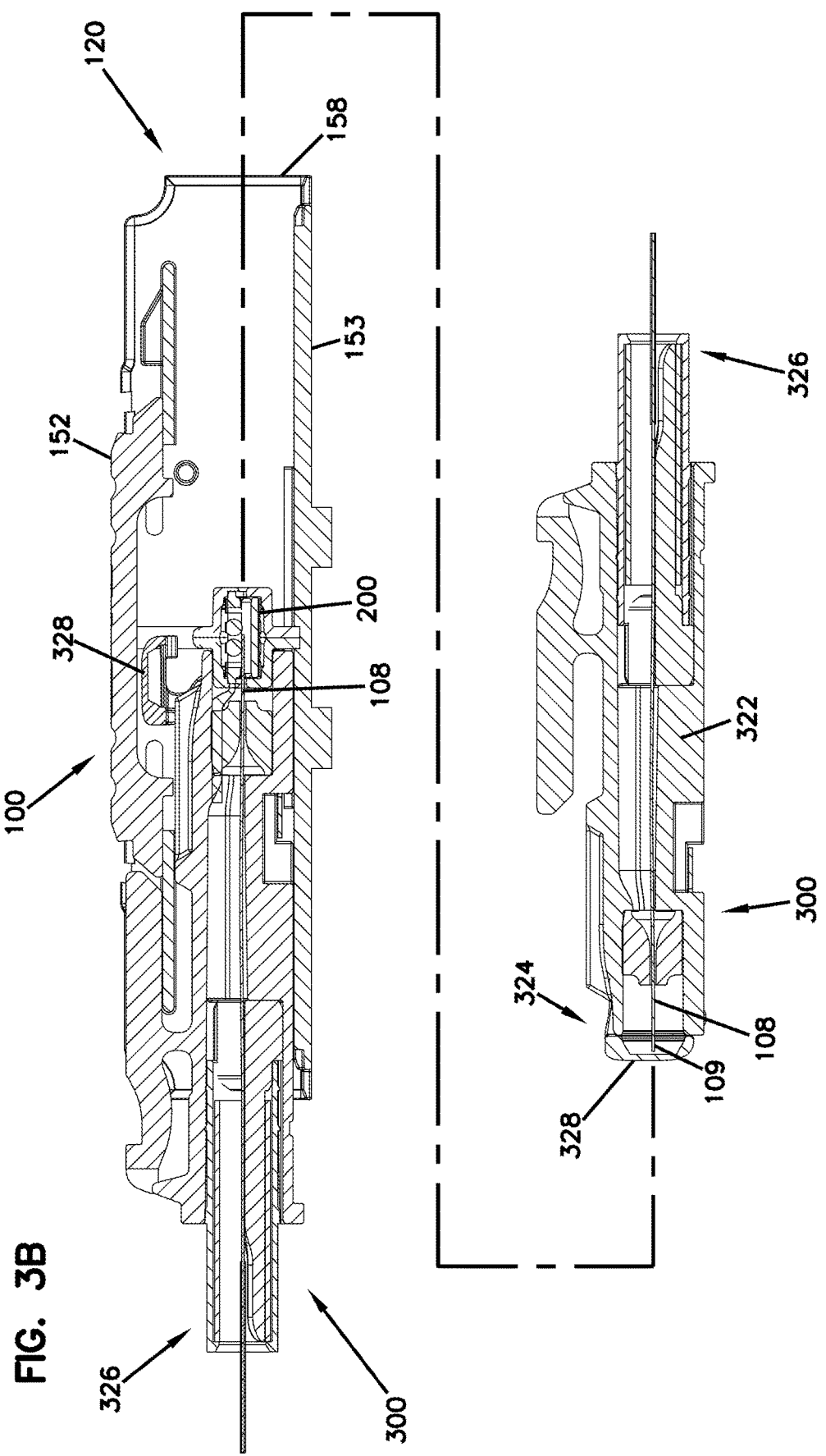

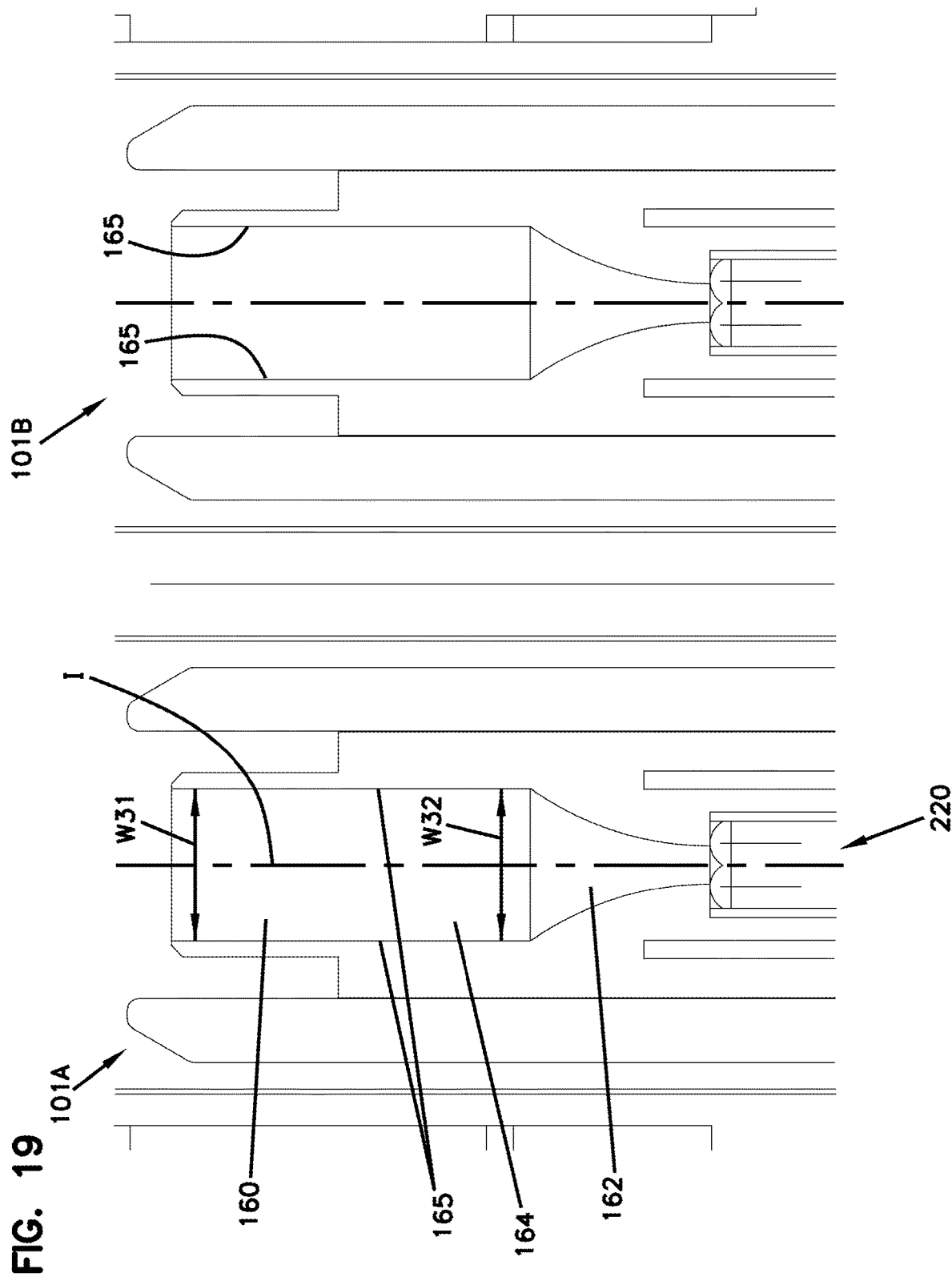

OPTICAL CONNECTOR AND ADAPTER

CROSS-REFERENCE TO RELATED APPLICATIONS

This application is a Continuation of U.S. patent application Ser. No. 17/129,044, filed on Dec. 21, 2020, which Continuation of U.S. patent application Ser. No. 16/523,077, filed on Jul. 26, 2019, now U.S. Pat. No. 10,871,616, which is a Continuation of U.S. patent application Ser. No. 16/098,382, filed on Nov. 1, 2018, now U.S. Pat. No. 10,409,007, which is a National Stage Application of PCT/US2017/030450, filed on May 1, 2017, which claims the benefit of U.S. Patent Application Ser. No. 62/330,655, filed on May 2, 2016, and claims the benefit of U.S. Patent Application Ser. No. 62/447,984, filed on Jan. 19, 2017, the disclosures of which are incorporated herein by reference in their entireties.

BACKGROUND

Optical adapters are used to optically couple together optical fibers of optical connectors. An optical adapter typically includes an alignment structure that coaxially aligns the optical fibers of the connectors desired to be optically connected together. Optical connectors can be secured to the optical adapter by being received at ports of the optical adapter.

In certain examples, the optical connectors include ferrule-less optical connectors. For example, an example ferrule-less optical connector 10 known in the art is shown at FIG. 1. The optical connector 10 includes a connector body 11 having a front mating end 12 (plug end) and a rear cable terminating end 13. An optical fiber extends forwardly through the connector body 11 and has a ferrule-less end portion that is accessible at the front mating end 12 of the connector body 11. A shutter 15 protects the ferrule-less end portion of the optical fiber from contamination when shut and allows access to the ferrule-less end portion when open. The shutter 15 can move between closed and open positions.

The connector 10 also includes a latch 16 that engages a catch of a fiber optic adapter for holding the connector 10 in place once coupled with the adapter. When the connectors 10 are inserted within coaxially aligned ports of the adapter, the shutters 15 of the connectors 10 are retracted, thereby exposing the ferrule-less ends of the optical fibers. Continued insertion causes the ferrule-less ends to enter the optical fiber alignment device. In an example, the fiber alignment device includes funnels or funnel-like structures leading to a fiber alignment slot, and biasing members pressing the fibers into the slot. Other examples of ferrule-less optical connectors and corresponding optical adapters can be found in U.S. patent application Ser. No. 14/377,189, filed Aug. 7, 2014, titled "Optical Fiber Connection System Including Optical Fiber Alignment Device," and issued as U.S. Pat. No. 9,575,263. The optical fiber is anchored adjacent the rear cable terminating end 13 against axial movement relative to the connector body 11. When two connectors 10 are coupled together, the end faces of the ferrule-less end portions abut one another, thereby causing the optical fibers to be forced rearwardly into the connector bodies 11 and to buckle/bend within fiber buckling regions of the connector bodies 11.

SUMMARY

One aspect of the present disclosure relates to a fiber optic connector having effective fiber end protection and structure for inhibiting back reflection of optical signal. According to some aspects, the fiber optic connector comprises a plug body defining a distal plug end and an opposite proximal end; an optical fiber defining a fiber axis, the optical fiber extending along the fiber axis at least partially through the plug body, the optical fiber including a free end portion that extends outwardly from the plug body distally beyond the plug end, the free end portion of the optical fiber not being supported by a ferrule; a shutter pivotally connected to the plug body and pivotally movable relative to the plug body between an open position and a closed position, the shutter including an interior receptacle that receives the free end portion of the optical fiber when the shutter is in the closed position. The interior receptacle is defined at least in part by a light distribution structure including a plurality of facet surfaces angled relative to one another, the light distribution structure being intersected by the fiber axis when the shutter is in the closed position. Index matching gel is positioned within the interior receptacle of the shutter, the index matching gel covering at least a portion of the light distribution structure such that the free end portion of the optical fiber is embedded within the index matching gel when the shutter is in the closed position.

According to some aspects, a fiber optic adapter comprises an adapter body defining an adapter axis, the adapter body defining a first connector port aligned along the adapter axis, the adapter body also defining a second connector port aligned along the adapter axis, the first connector port having an open end that faces in a first axial direction, and the second connector port having an open end that faces in a second axial direction. A fiber alignment groove extends axially through at least a portion of the adapter body, the fiber alignment groove including a first portion corresponding to the first connector port and a second portion corresponding to the second connector port, the fiber alignment groove having an open side that extends axially along the fiber alignment groove. Three discrete fiber biasing members oppose the fiber alignment groove for pressing optical fibers into the fiber alignment groove, with one biasing member positioned at a midpoint between the other two.

The adapter may also comprise an alignment device with an offset fiber contact location. The fiber alignment groove is bisected by a reference plane that includes the adapter axis. A first fiber biasing member opposes the first portion of the fiber alignment groove, the first fiber biasing member having a fiber contact location that is offset in a first lateral direction from the reference plane by a lateral offset distance of at least 0.05 mm. A second fiber biasing member opposes the second portion of the fiber alignment groove, the second fiber biasing member having a fiber contact location that is offset in the first lateral direction from the reference plane by a lateral offset distance of at least 0.05 mm.

In some aspects, the adapter is constructed to accommodate more fiber buckling at one side of the adapter than the other. The adapter body defines an adapter axis, and a first connector port and second connector port aligned along the adapter axis. The adapter body is bisected by a first reference plane that is perpendicular relative to the adapter axis. A fiber alignment structure is mounted within the adapter body including a fiber alignment groove that extends axially through at least a portion of the adapter body along the adapter axis, the fiber alignment groove including a first portion corresponding to the first connector port and a second portion corresponding to the second connector port, the fiber alignment groove having an open side that extends axially along the fiber alignment groove. The fiber alignment structure is bisected by a second reference plane that is perpendicular relative to the adapter axis, the second reference plane being offset from the first reference plane in a direction toward the second connector port. The fiber alignment structure includes a first fiber biasing member that opposes the first portion of the fiber alignment groove and a second fiber biasing member that opposes the second portion of the fiber alignment groove.

In some aspects, the adapter includes an adapter body defining an adapter axis, a first connector port, and a second connector port aligned along the adapter axis, and an indication for directing a technician to install a fiber optic connector in the first connector port before installing a second fiber optic connector in the second connector port. In another aspect, the adapter includes a structure that prevents a second fiber optic connector from being installed in the second connector port before installing a first fiber optic connector in the first port. The adapter can include a first connector key corresponding to the first connector port and a second connector key corresponding to the second connector port, the first and second connector keys having different configurations from one another.

According to some aspects, a fiber optic connection system includes a fiber optic adapter defining an adapter axis. The fiber optic adapter defines a first connector port aligned along the adapter axis and also defines a second connector port aligned along the adapter axis. The first connector port has an open end that faces in a first axial direction. The second connector port has an open end that faces in a second axial direction. A first ferrule-less fiber optic connector is configured to be received in the first connector port and a second ferrule-less fiber optic connector is configured to be received in the second connector port. The second ferrule-less fiber optic connector is configured to accommodate more fiber buckling than the first ferrule-less fiber optic connector.

In some aspects, the fiber optic connector is provided with a connector body defining a fiber buckling zone within an interior of the connector body; a connector tip positioned at one end of the connector body. The connector body is movable relative to the connector tip between first and second axial positions along an axis that extends through the first buckling zone. An optical fiber that extends through the fiber buckling zone and through the connector tip has a free end that protrudes beyond the connector tip in a direction away from the buckling zone. The free end of the optical fiber is not supported by a ferrule. The optical fiber is axially moveable relative to the connector tip. A fiber buckling controller is positioned at the fiber buckling zone, the fiber buckling controller including a flex member that elastically flexes from a first flex position to a second flex position as the connector body moves between the first and second axial positions relative to the connector tip. The flex member has a sharper curvature in the second flex position as compared to the first flex position, and is configured to positively force the optical fiber to buckle within the buckling zone as the flex member moves from the first flex position to the second flex position.

According to some aspects, the fiber optic adapter is provided with an adapter body defining an adapter axis, the adapter body defining a first connector port and a second connector port aligned along the adapter axis. A fiber alignment structure is mounted within the adapter body. The first and second connector ports each have a lead-in section for directing a free end portion of an optical fiber of a ferrule-less fiber optic connector into the fiber alignment structure, the lead-in section having a tapered fiber passage profile including: a) a first axial transition portion having a first passage section that tapers radially outwardly away from the adapter axis as the first axial transition portion extends axially toward the fiber alignment structure; and b) a second axial transition portion positioned axially between the first axial transition portion and the fiber alignment structure, the second axial transition portion having a second passage section that tapers radially inwardly toward the adapter axis as the second axial transition portion extends axially toward the fiber alignment structure.

BRIEF DESCRIPTION OF DRAWINGS

The accompanying drawings, which are incorporated in and constitute a part of the description, illustrate several aspects of the present disclosure. A brief description of the drawings is as follows:

FIGS. 3A-3D show a system including the optical connector of FIG. 2 aligned with and/or inserted into a port of an example optical adapter.

FIG. 19 is a top view of two halves of a fiber optic adapter with a tapered lead-in section in accordance with the principles of the present disclosure for directing optical fibers into a fiber alignment structure housed within a housing of the adapter.

DETAILED DESCRIPTION

The present disclosure relates generally to fiber optic adapters, fiber optic connectors and systems including fiber optic adapters for use in optically coupling fiber optic connectors together. In preferred examples, the fiber optic connectors are ferrule-less (i.e., include fiber ends that are free and not supported by ferrules) and the fiber optic adapters are configured for co-axially aligning bare optical fibers. Aspects also relate to connectors having enhanced shutter configurations for protecting optical fibers.

The term "fiber" as used herein can relate to an optical signal transmission element. In certain examples, the fiber can include a core having a diameter of 8-12 µm and a cladding having a diameter of 120-130 µm, wherein the core is the central, light-transmitting region of the fiber, and the cladding is the material surrounding the core forming a guiding structure for light propagation within the core. The core and cladding can be coated with a primary coating usually comprising one or more organic or polymer layers surrounding the cladding to provide mechanical and environmental protection to the light-transmitting region. The primary coating may have a diameter ranging, e.g., between 200 and 300 µm. The core, cladding and primary coating may also be coated with a secondary coating, a so-called "buffer," a protective polymer layer without optical properties applied over the primary coating. The buffer or secondary coating usually has a diameter ranging between 300-1100 µm, depending on the manufacturer. It will be appreciated that aspects of the present disclosure also apply to optical fibers having dimensions other than those specifically recited.

The term "light" as used herein relates to electromagnetic radiation, which comprises a part of the electromagnetic spectrum that is classified by wavelength into infrared, the visible region, and ultraviolet.

Index matching gel can be used with alignment devices in accordance with the principles of the present disclosure to improve the optical connection between the open light transmission paths of the first and second optical fibers (e.g., to reduce loss that may otherwise occur at air gaps between the fiber end faces). The index matching gel preferably has an index of refraction that closely approximates that of an optical fiber. The index matching gel is used to reduce Fresnel reflection at the surface of the bare optical fiber ends.

Without the use of an index-matching material, Fresnel reflections will occur at the smooth end faces of a fiber and reduce the efficiency of the optical connection and thus of the entire optical circuit.

Reference will now be made in detail to exemplary aspects of the present disclosure that are illustrated in the accompanying drawings. Wherever possible, the same reference numbers will be used throughout the drawings to refer to the same or like parts.

Figure 1:
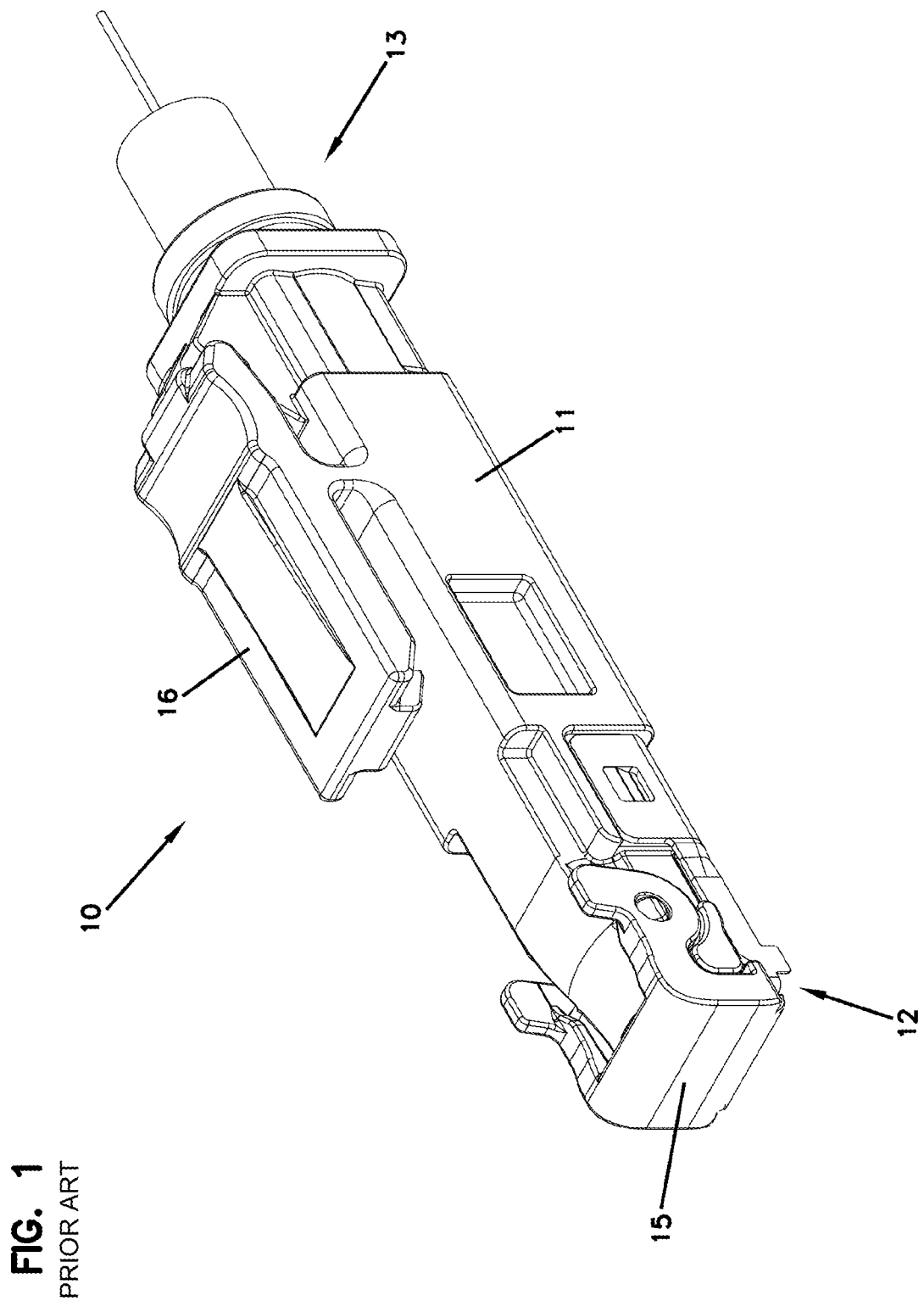
FIG. 1 is a perspective view of an example prior art ferrule-less optical connector.
Figure 2:
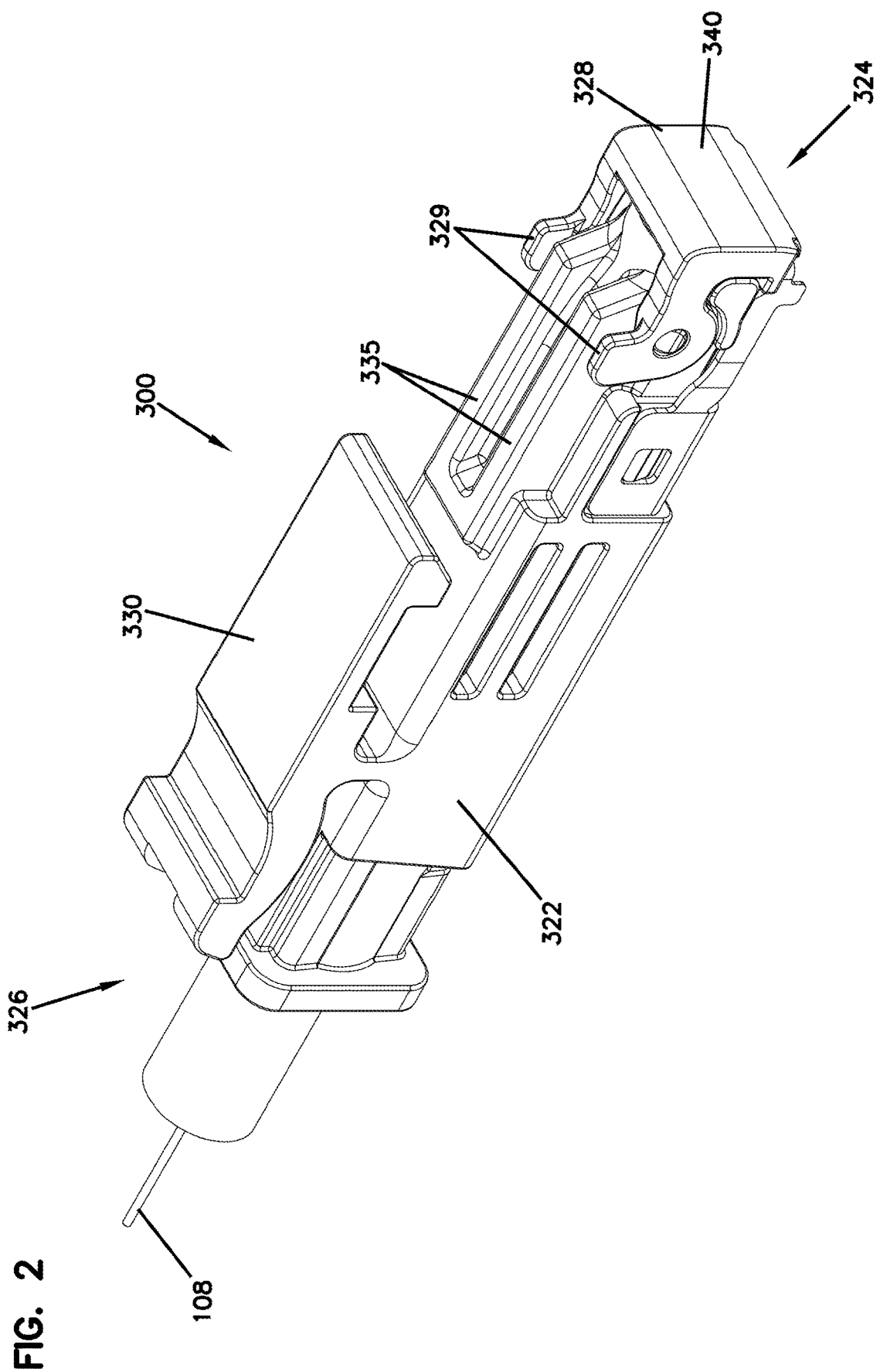
FIG. 2 is a perspective view of an exemplary optical connector.

The present disclosure relates generally to fiber optic connectors and adapters. FIGS. 2 and 3A-3D illustrate example fiber optic connectors 300 and adapters 100. The fiber optic connectors 300 each include a connector plug body 322 and a latch arm 330 for securing the connector plug body 322 to a port in a corresponding fiber optic adapter 100 (FIGS. 3A-3D). The connector plug body 322 includes a front end 324 positioned opposite from a rear end 326 (FIG. 2). The front end 324 of the connector body 322 is configured to provide access to an end 109 of an optical fiber 108 that extends through the connector body 322 (see, e.g., FIG. 3B).

Figure 3A:
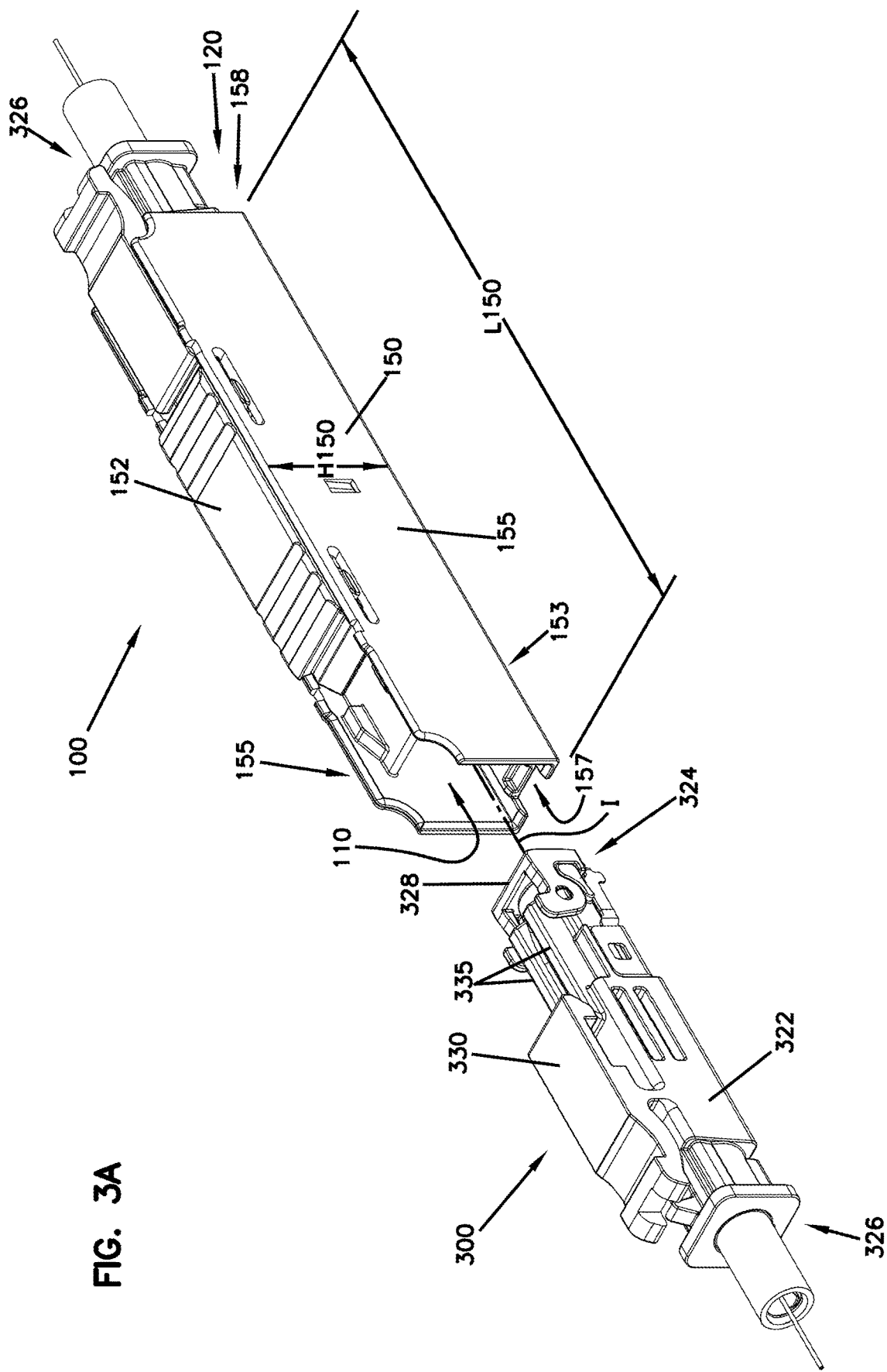
Figure 3C:
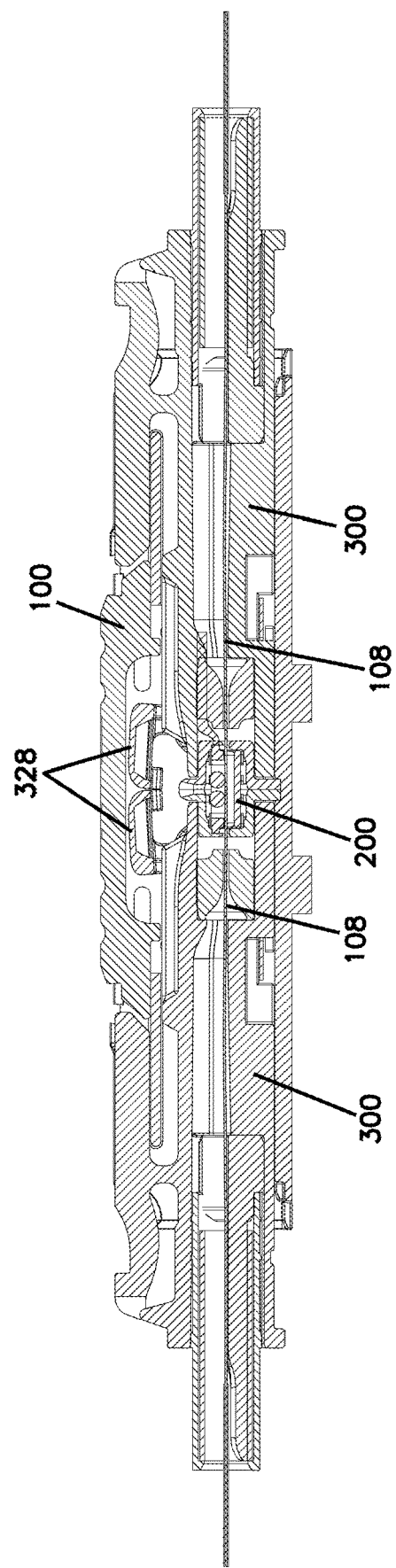

The latch arm 330 is configured to secure the connector plug body 322 to a corresponding fiber optic adapter 100 (see, e.g., FIGS. 3B and 3C). The latch arm 330 is connected to the plug body 322 at a flexible pivot location that allows the latch arm 330 to be pivoted (i.e., flexed) relative to the connector plug body 322 between a latching position and a release position. The adapter 100 may include corresponding latching members constructed to mate with a latch end of the latch arm 330.

In some implementations, the fiber optic connector 300 includes a plurality of ribs 335 that extend outwardly from the plug connector body 322 for providing extra strength to the fiber optic connector body 322 or for inhibiting manual or accidental opening of a shutter 328 by a user. The shutter 328 pivots open and shut relative to the connector body 322 to expose and cover, respectively, the optical fiber tip 109 when tabs 329 of the shutter 328 are deflected. In use, the tabs 329 are deflected by lugs within the adapter 100. The ribs 335 inhibit finger access to the shutter tabs 329 to hinder opening of the shutter 328 outside of the adapter 100 (e.g., accidental opening, unauthorized opening, etc.).

FIG. 3A depicts the fiber optic connector 300 aligned with a first port 110 of an example optical adapter 100. A body 150 of the optical adapter 100 includes opposite sidewalls 155 extending along a height H150 of the body 150 between opposite top 152 and bottom 153. The sidewalls 155 also extend along a length L150 of the body 150 between a first end 157 and a second end 158. The body 150 defines a first port 110 at the first end 157. In certain examples, the body 150 defines a second port 120 at the second end 158 that is aligned with the first port 110 along an insertion axis I. In certain examples, the body 150 can define a greater number of ports 110, 120.

Figure 3D:
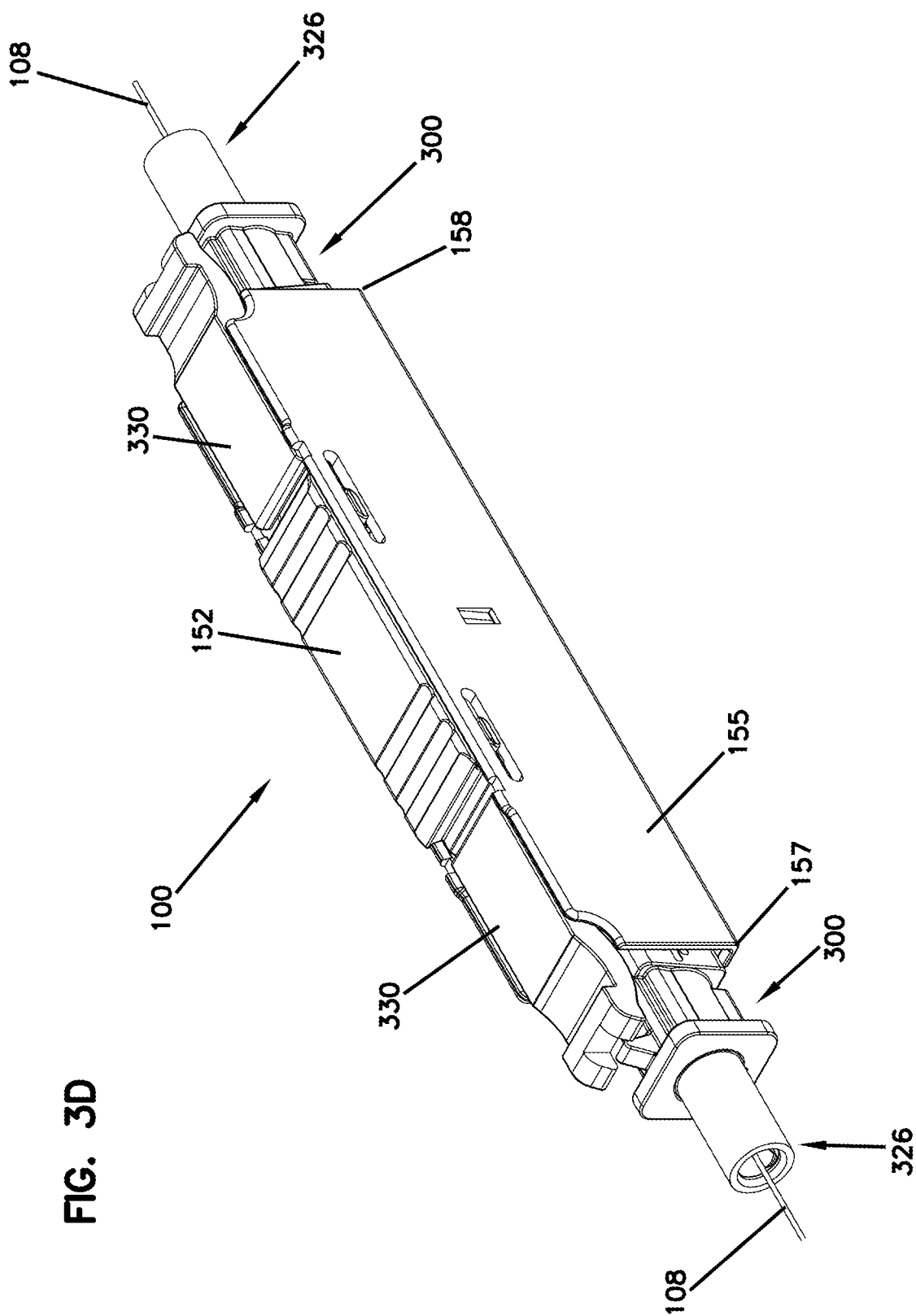
Figure 4A:
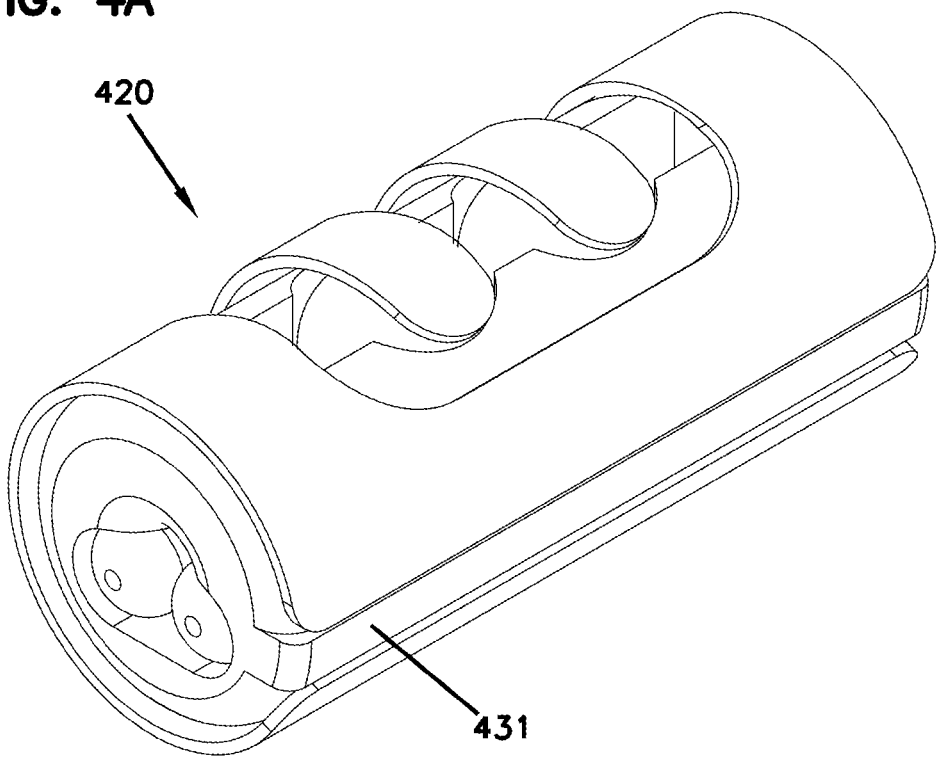
FIG. 4A is a perspective view of a prior art optical fiber alignment device.
Figure 4B:
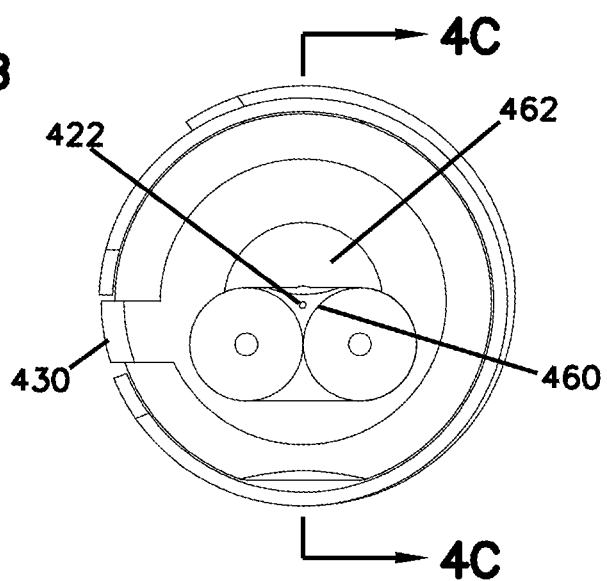
FIG. 4B is an end view of the optical fiber alignment device of FIG. 4A.
Figure 4C:
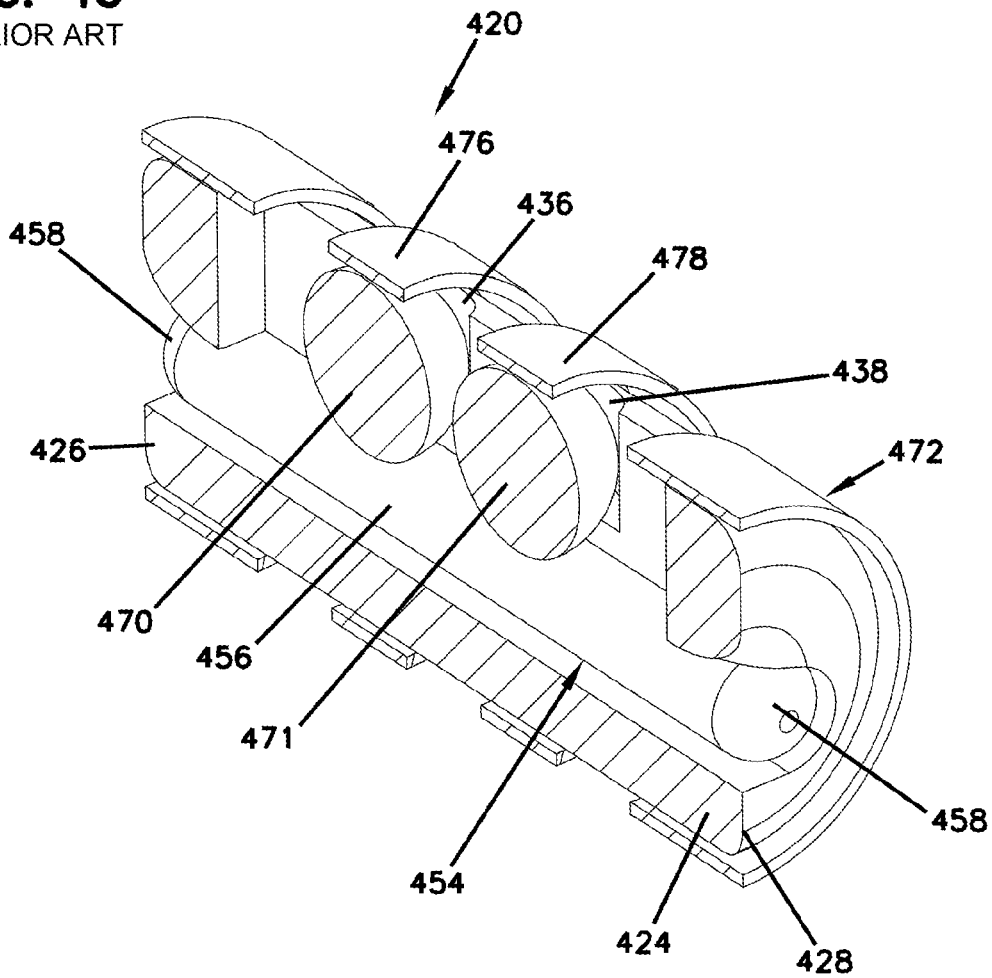
FIG. 4C is a longitudinal cross-sectional view of the optical fiber alignment device of FIG. 4B taken along section line 4C-4C.
Figure 4E:
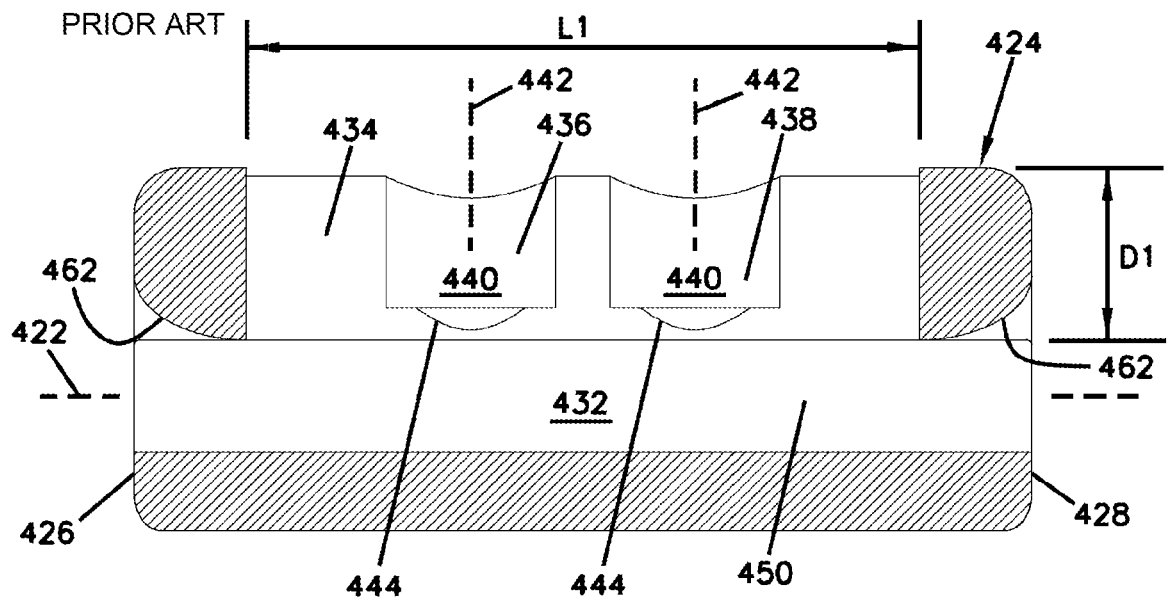
FIG. 4E is a longitudinal cross section of FIG. 4C with the internal components removed.
Figure 4D:
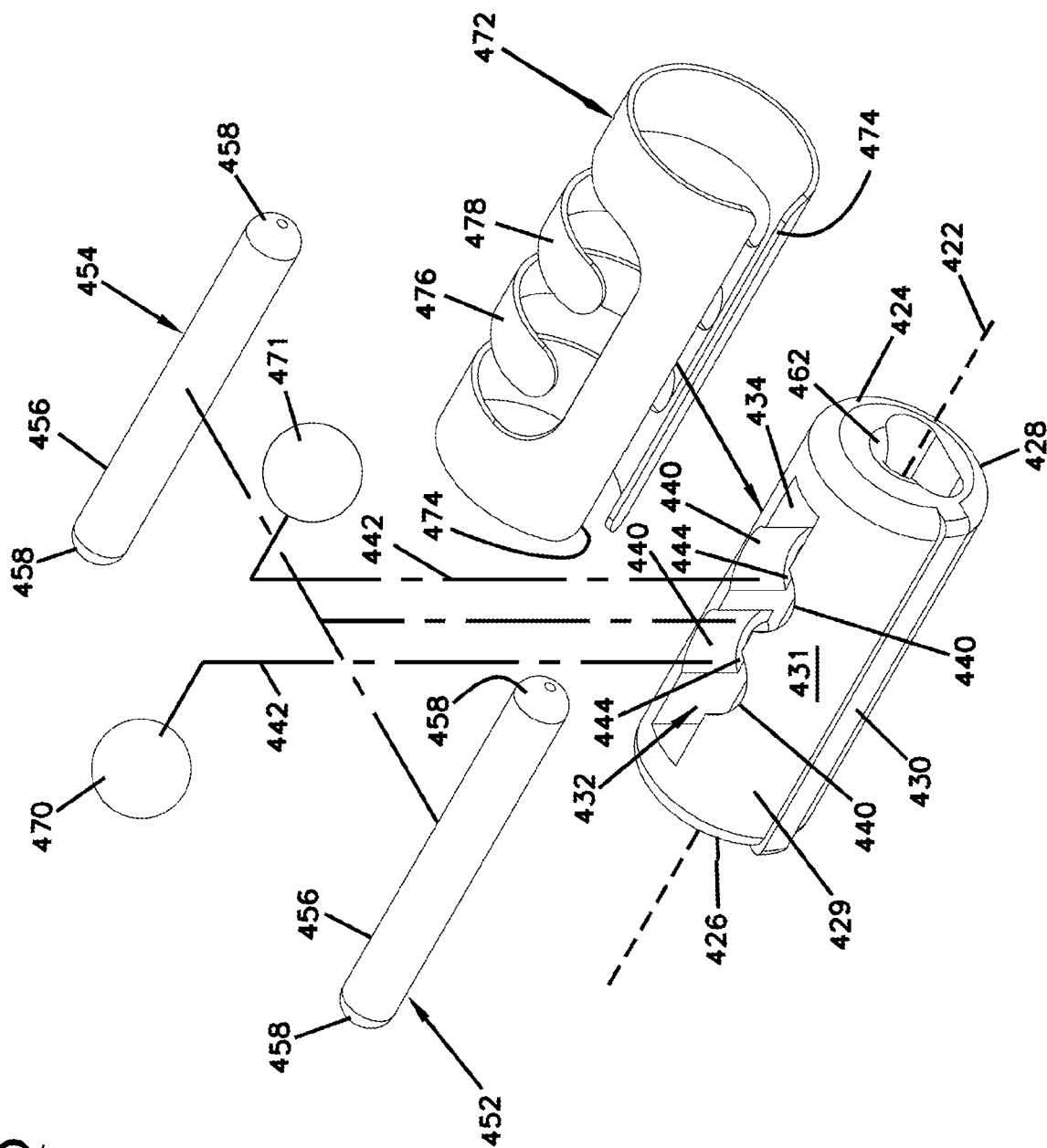
FIG. 4D is an exploded view of the optical fiber alignment device of FIG. 4A.
Figure 4F:
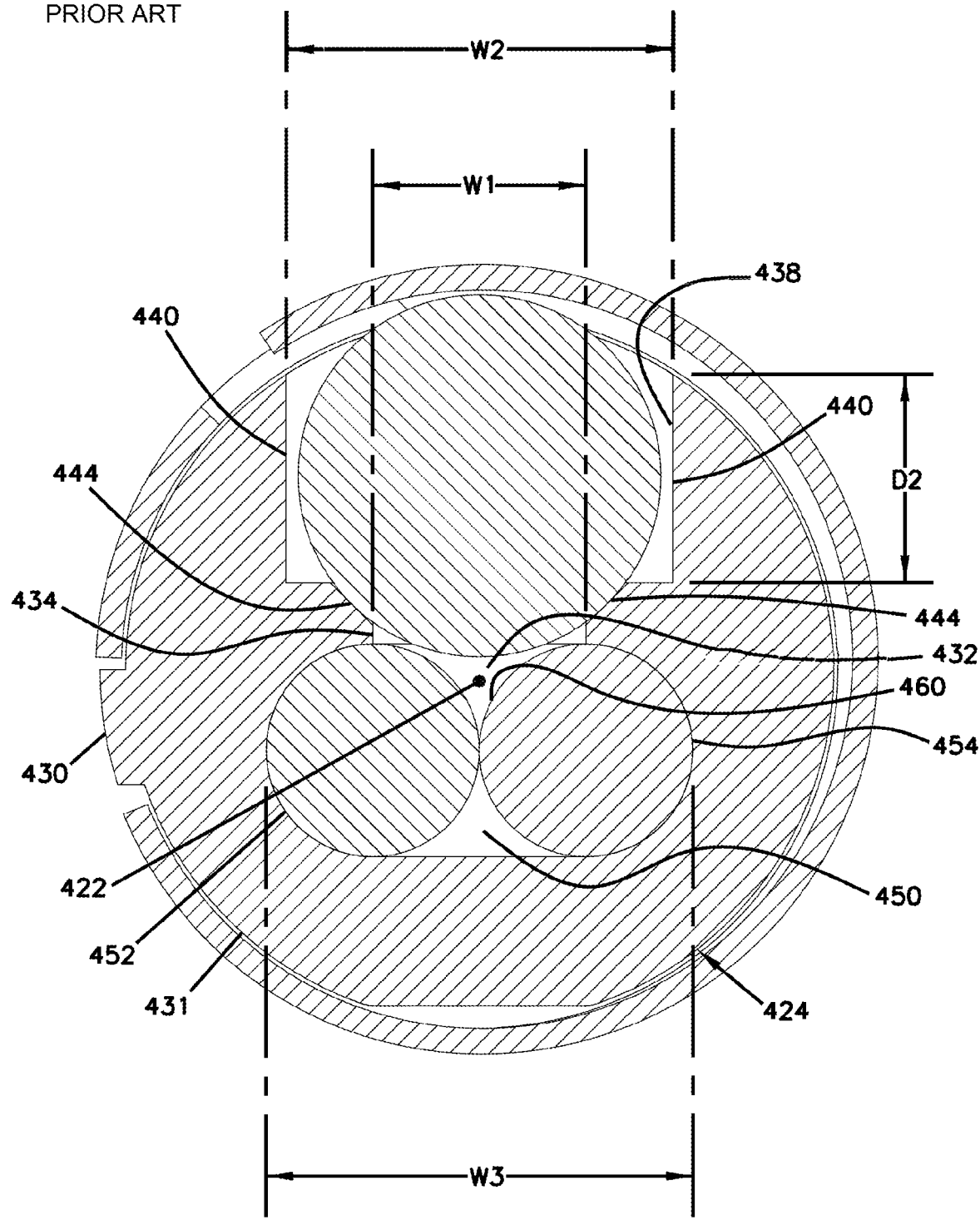
FIG. 4F is a transverse cross section of the optical fiber alignment device of FIG. 4A.

When the connectors 300 are inserted into the first port 110 and the second port 120 of the adapter 100 along the insertion axis I, the shutters 328 of the connectors 300 retract (i.e., pivot open) and expose the ends 109 of the optical fibers 108 (see FIGS. 3A-3D). The adapter body 150 houses an alignment structure 200 for aligning the ends 109. Continued insertion of the connectors 300 into the first and second ports 110, 120 causes the ends 109 to enter the alignment structure 200. FIGS. 3C and 3D show both connectors 300 inserted all the way into the adapter 100 and secured into place by latches 330.

The alignment structure 200 is configured to align optical fibers 108 of optical connectors 300 received at the ports 110, 120. An example of an alignment device is disclosed in U.S. patent application Ser. No. 14/377,189 issued as U.S. Pat. No. 9,575,263, which documents are incorporated herein by reference. The alignment device generally includes an alignment housing with the fiber insertion axis extending through the alignment housing and structures for aligning the optical fibers along the fiber insertion axis. The structures may provide a fiber alignment groove extending along the fiber insertion axis, and fiber biasing members opposing the fiber alignment groove for pressing optical fibers into the fiber alignment groove. The fiber alignment groove can generally be defined as a groove in a plate or other structure, having a V-shaped, rounded, U-shaped, or other cross sectional shape, or may be defined between parallel rods.

FIGS. 4A-4F illustrate a prior art optical fiber alignment device 420 that includes two alignment rods with rounded ends to provide a fiber alignment groove or slot, and two biasing or alignment members (e.g., two balls) that act to align the fiber in the fiber alignment slot. The alignment housing 424 includes first and second ends 426, 428, and a fiber insertion axis 422 that extends through the alignment housing 424 between the first and second ends 426, 428. The alignment housing 424 has a main body 429 that is elongated between the first and second ends 426, 428 and that includes an outer shape 431 that is cylindrical. The alignment housing 424 also includes a longitudinal rib 430 that projects laterally outwardly from the outer shape 431 of the main body 429 of the alignment housing 424.

The alignment housing 424 defines an internal chamber 432. The internal chamber 432 extends completely through the length of the alignment housing 424 from the first end 426 to the second end 428. In this way, optical fibers can be inserted along the fiber insertion axis 422 through the alignment housing 424. The internal chamber 432 includes an elongated access slot 434 having a length L1 (See FIG. 4E), a depth D1 and a width W1 (see FIG. 4F). The length L1 extends along the length of the alignment housing 424. The depth D1 extends laterally (i.e., radially) into the alignment housing 424. The width W1 is transverse with respect to the depth D1 and the length L1. The prior art alignment device 420 shown in FIGS. 4A-4D includes two fiber biasing members (e.g., balls). The internal chamber 432 also includes first and second ball-receiving pockets 436, 438 positioned along the length L1 of the elongated access slot 434. The first and second ball-receiving pockets 436, 438 each have a width W2 (see FIG. 4F) that is larger than the width W1 of the elongated access slot 434. The first and second ball-receiving pockets 436,438 have depths D2 (see FIG. 4F) that are parallel to the depth D1 of the elongated access slot 434. The first and second ball-receiving pockets 436,438 each include cylindrical pocket-defining surfaces 440 (see FIG. 4D) that extend partially around ball insertion axes 442 (see FIG. 4E) that are parallel to the depths D2. The pocket-defining surfaces 440 of each of the pockets 436,438 are positioned on opposite sides of the elongated access slot 434. The pocket-defining surfaces 440 of the first ball-receiving pocket 436 oppose one another, and the pocket-defining surfaces 440 of the second ball-receiving pocket 438 oppose one another. The first and second ball-receiving pockets 436, 438 also include ball seats 444 positioned at opposite sides of the elongated access slot 434. It will be appreciated that one ball seat 444 corresponds to each of the pocket-defining surfaces 440. The ball-seats are located at bottom ends of the first and second ball-receiving pockets 436, 438.

The internal chamber 432 also includes a rod-receiving region 450 at the bottom of the depth D1 of the elongated access slot 434. The rod-receiving region 450 has a width W3 that is larger than the width W1 of the elongated access slot 434. The rod receiving region 450 extends generally along the entire length of the alignment housing 424.

The optical fiber alignment device 420 also includes first and second alignment rods 452, 454 (see FIG. 4D) that fit within the rod-receiving region 450 of the alignment housing 424. The first and second alignment rods 452,454 mount parallel to one another within the rod-receiving region 450 and can be inserted into the rod-receiving region 450 through the elongated access slot 434. Each of the first and second alignment rods 452, 454 includes an intermediate section 456 that is generally cylindrical in shape. Each of the first and second alignment rods 452, 454 also has rounded ends 458. In the example shown, the rounded ends 458 are spherical in shape and form semi-spheres. The intermediate sections 456 of the first and second alignment rods 452, 454 cooperate to define a fiber alignment slot 460 that extends along the fiber insertion axis 422 through the alignment housing 424. The rounded ends 458 are positioned adjacent the first and second ends 426, 428 of the alignment housing 424. The alignment housing 424 defines partial funnel structures 462 positioned at the first and second ends 426, 428. The partial funnel structures 462 are positioned above the rounded ends 458 of the first and second alignment rods 452, 454. The partial funnel structures 462 form a tapered transition that angles toward the fiber insertion axis 422 and the fiber alignment slot 460. The partial funnel structures 462 cooperate with the rounded ends 458 of the first and second alignment rods 454, 456 to define a tapered lead-in structure for guiding optical fibers toward the fiber insertion axis 422.

The optical fiber alignment device 420 is configured for optically aligning the ends of two optical fibers desired to be mechanically and optically connected together. The optical fiber alignment device 420 further includes structure for urging the optical fibers desired to be optically connected together into contact with the fiber alignment slot 460 defined by the fiber alignment rods 452, 454. In the example shown in FIGS. 4A-4D, the fiber optical alignment device 420 includes first and second balls 470, 471 (i.e., fiber biasing members) positioned respectively within the first and second ball-receiving pockets 436, 438. The balls 470, 471 are depicted as being spherical in shape. When inserted within their corresponding first and second ball-receiving pockets 436, 438, the first and second balls 470, 471 seat against the ball seats 444. Lower portions of the first and second balls 470, 471 extend downwardly into the rod-receiving region 450 and are aligned along the fiber alignment slot 460 and the fiber insertion axis 422. The pocket defining surfaces 440 surround portions of the balls 470,471 and maintain alignment of the balls 470, 471 with their respective ball insertion axes 442. In certain examples, the ball insertion axes 442 intersect the fiber insertion access 422 and the fiber alignment slot 460.

The optical fiber alignment device 420 further includes a biasing arrangement for urging the balls 470, 471 generally toward the fiber alignment slot 460. For example, the biasing arrangement can urge the balls 470, 471 in a direction transverse with respect to the fiber insertion axis 422. In the example shown, the biasing arrangement is shown including a clip 472 (e.g., a metal clip having elastic properties) mounted (e.g., snap fitted) over the main body 429 of the alignment housing 424. The clip 472 can have a transverse cross-sectional profile that is generally C-shaped. Ends 474 of the clip can abut against sides of the longitudinal rib 430 of the alignment housing 424. When the clip 472 is snapped or otherwise fitted over the alignment housing 424, the clip 472 functions to capture the first and second balls 470, 471 within their respective first and second ball-receiving pockets 436, 438. The clip 472 can include biasing structures such as first and second springs 476, 478 for respectively biasing the balls 470, 471 toward the fiber alignment slot 460. As depicted, the first and second springs 476, 478 are leaf springs having a cantilevered configuration with a base end integrally formed with a main body of the clip 472 and free ends that are not connected to the main body of the clip 472. In the example shown, the first and second springs 476, 478 both extend from their base ends to their free ends in the same rotational direction about the fiber insertion axis 422. The springs 476, 478 are defined by cutting or slitting the main body of the clip 472 so as to define slots in the main body of the clip 472 that surround three sides of each of the springs 476, 478.

In use of the optical fiber alignment device 420, two optical fibers desired to be optically connected together are inserted into the first and second ends 426, 428 of the alignment housing 424. As the optical fibers are inserted into the first and second ends 426, 428, the partial funnel structure 462 and the rounded ends 458 of the first and second alignment rods 452, 454 cooperate to guide the ends of the optical fiber toward the fiber insertion axis 422. Continued insertion of the optical fibers causes the optical fibers to move along the fiber alignment slot 460 defined by the intermediate sections 456 of the first and second alignment rods 452, 454. As the optic fibers move along the fiber alignment slot 460, the optical fibers force their corresponding balls 470, 471 away from the fiber alignment slot 460 against the bias of the springs 476, 478. The optical fibers slide along the fiber alignment slot 460 until the end faces of the optical fibers are optically coupled to one another. In this configuration, the first and second spring 476, 478 and the first and second balls 470, 471 function to clamp or otherwise retain the optical fibers in the optically coupled orientation within the fiber alignment slot 460. In this way, the optical fibers are pressed within the fiber alignment slot 460 by the first and second balls 470, 471 such that axial alignment between the optical fibers is maintained.

Figure 5:
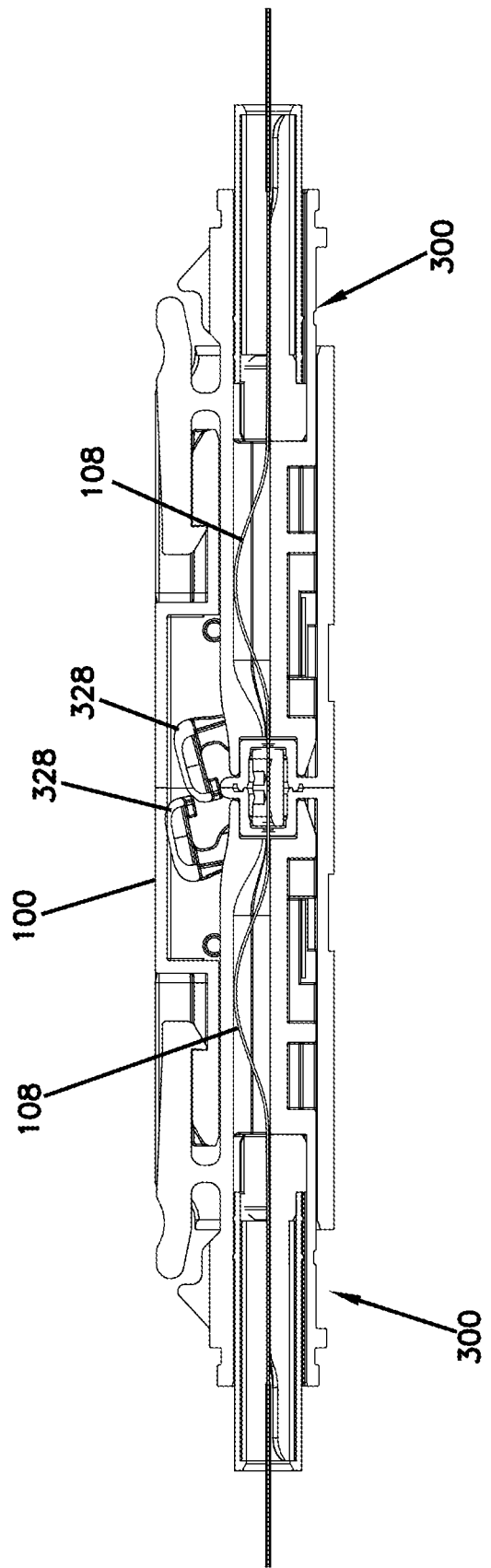
FIG. 5 is a longitudinal cross section of a fiber optic adapter with two optical connector plugs and an optical fiber alignment device connecting optical fibers.

Upon insertion of the connectors in the adapter, the fiber ends 109 abut causing an axial load to be applied to the fibers which causes the fibers to buckle within the connector bodies (see FIG. 5). The optical fibers 108 are placed in the connector 300 so that the fibers protrude past the center line within the alignment structure 200 to ensure contact between the two optical fibers 108. However, uncontrolled buckling of the optical fibers 108 can result in undesired variability in light transfer. Further, if the optical fibers 108 protrude too far (e.g., about 200 μm or more), the increased buckling may result in an increased loss in light transfer.

Figure 6B:
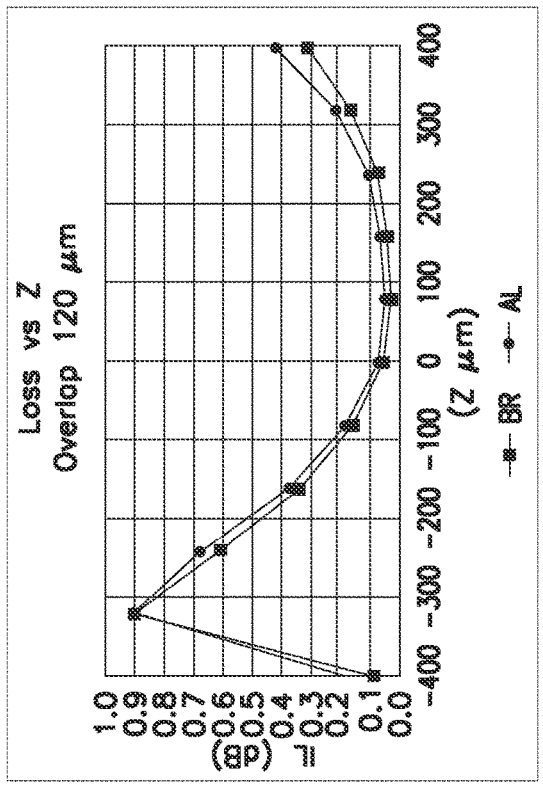
FIGS. 6A-6D are graphical presentations of results from a measurement of optical loss across an optical alignment device.
Figure 6D:
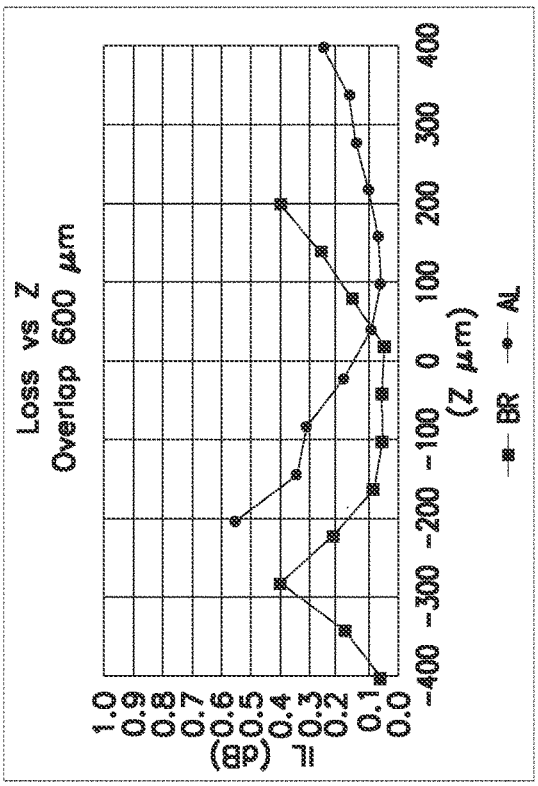
Figure 6A:
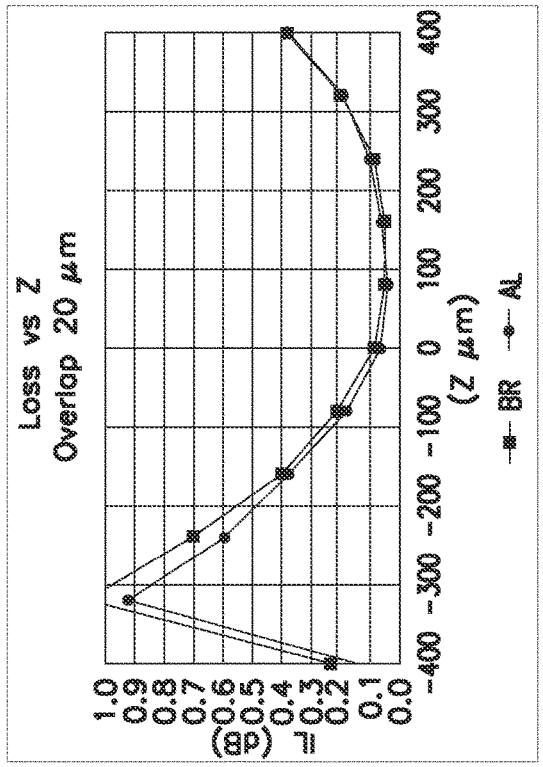
Figure 6C:
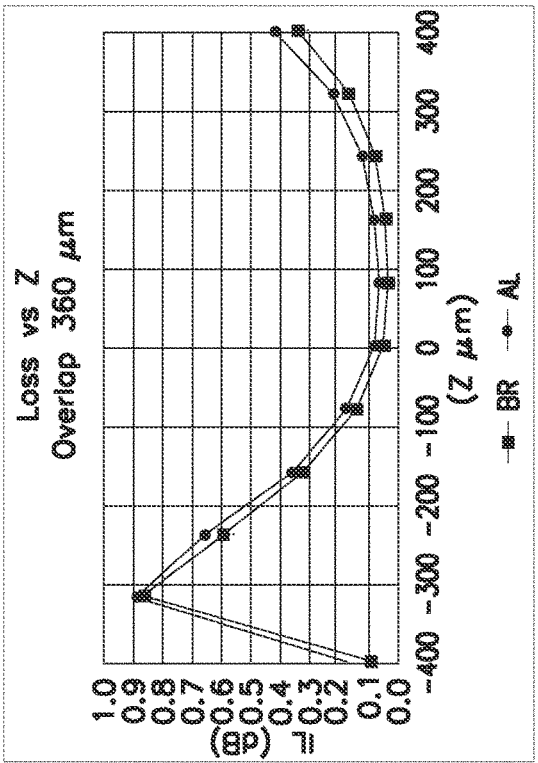

To demonstrate the dependence of optical loss as a function of overlap, connectors 300 were arranged with varying degrees of fiber tip overlap and the optical loss was measured. FIGS. 6A-6D are graphical presentations of the loss in dB as a function of the position of the mating interface relative to the center along the optical axis of the fiber (Z-axis) with 20 μm overlap (FIG. 6A), 120 μm overlap (FIG. 6B), 360 μm overlap (FIG. 6C), and 600 μm overlap (FIG. 6D). As demonstrated by the test results, the loss in light transfer varied as a function of the overlap. However, the range of overlap with minimal loss is small, about 300-400 μm, which may explain some of the issues with variance in optical loss. Controlling the amount of overlap within a range of about 100 µm is technically difficult and requires great precision in assembly. Such a narrow optimal range makes the connector assembly vulnerable to optical losses due to possible errors during assembly or irregularities in materials.

In order to increase tolerance in the direction of the optical axis, the fiber alignment structure 200 can house an alignment device 220 that provides more contact points between the fiber biasing member(s) and the fibers 108 in the fiber alignment groove 105. For example, the alignment device 220 can be provided with three or more (e.g., four, five, six, or more) fiber biasing members that may be biased toward the fiber alignment groove 105 by a spring. In some embodiments, the alignment device 220A, 220B includes first and second fiber biasing members 270, 271, and a third fiber biasing member 272 positioned between the first and second fiber biasing members 270, 271. The third fiber biasing member 272 may be positioned at a mid-point between the first and second fiber biasing members 270, 271, or at a transition between a first portion of the fiber alignment groove 105 and a second portion of the fiber alignment groove 105. In some embodiments, the fiber alignment device 220 includes four or more discrete fiber biasing members. For example, the fiber alignment device 220 may include first and second fiber biasing members positioned opposite of the first portion of the fiber alignment groove 105, and third and fourth fiber biasing members opposite of the second portion of the fiber alignment groove 105.

The fiber biasing members may have any suitable shape, such as balls, spheres, semi-spheres, rods, or rounded cuboids. The fiber biasing members may also be provided as one or more elastic cantilevers. In the embodiments shown in FIGS. 7A-7E and 8A-8E, the fiber biasing members comprise first, second, and third balls 270, 271, 272, where the third ball is positioned between the first and second balls at a midpoint of the fiber alignment device 220. The alignment device 220 is not limited to only two or three fiber biasing members (e.g., balls), but may include four or more fiber biasing members. The fiber biasing members may also have different shapes, such as semi-spheres, rods, or rounded cuboid shapes. The fiber biasing members may also be shaped as a rod (e.g., one or more fiber contact rods 273) extending the length of the elongated access slot 234, as shown in FIGS. 9A-9E. The alignment housing 224 and biasing arrangement can be adjusted accordingly.

Figure 7A:
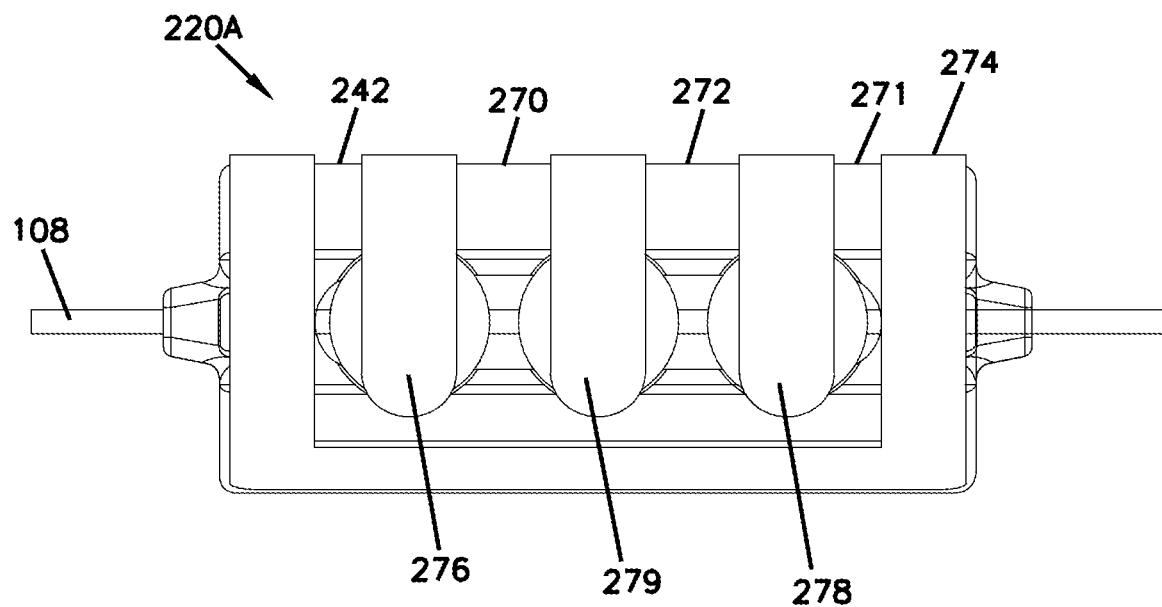
FIG. 7A is a top plan view of an optical fiber alignment device in accordance with the principles of the present disclosure.
Figure 7B:
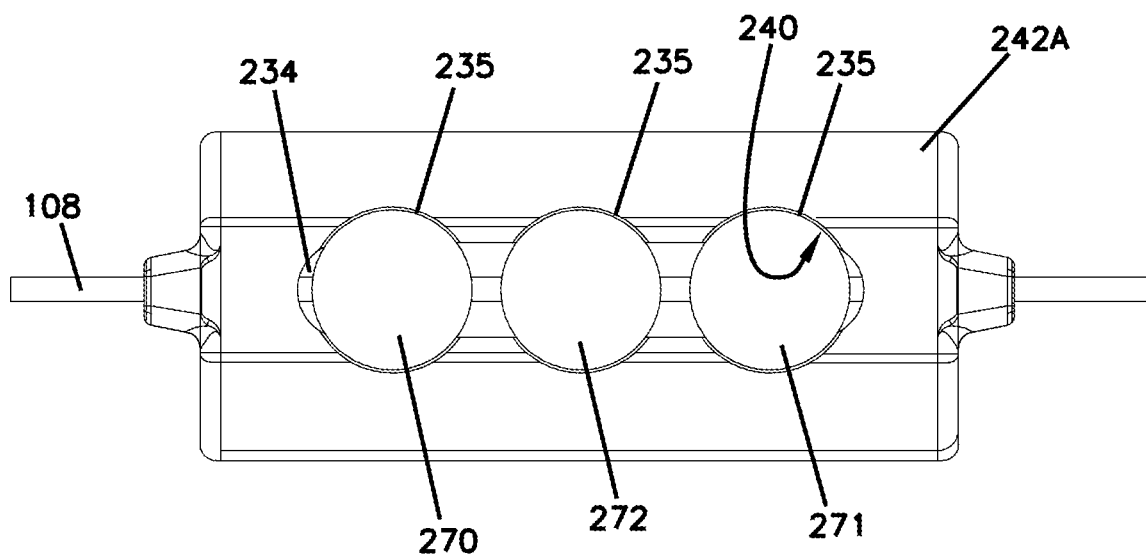
FIG. 7B is a top view of the optical fiber alignment device of FIG. 7A with the biasing arrangement removed.
Figure 7C:
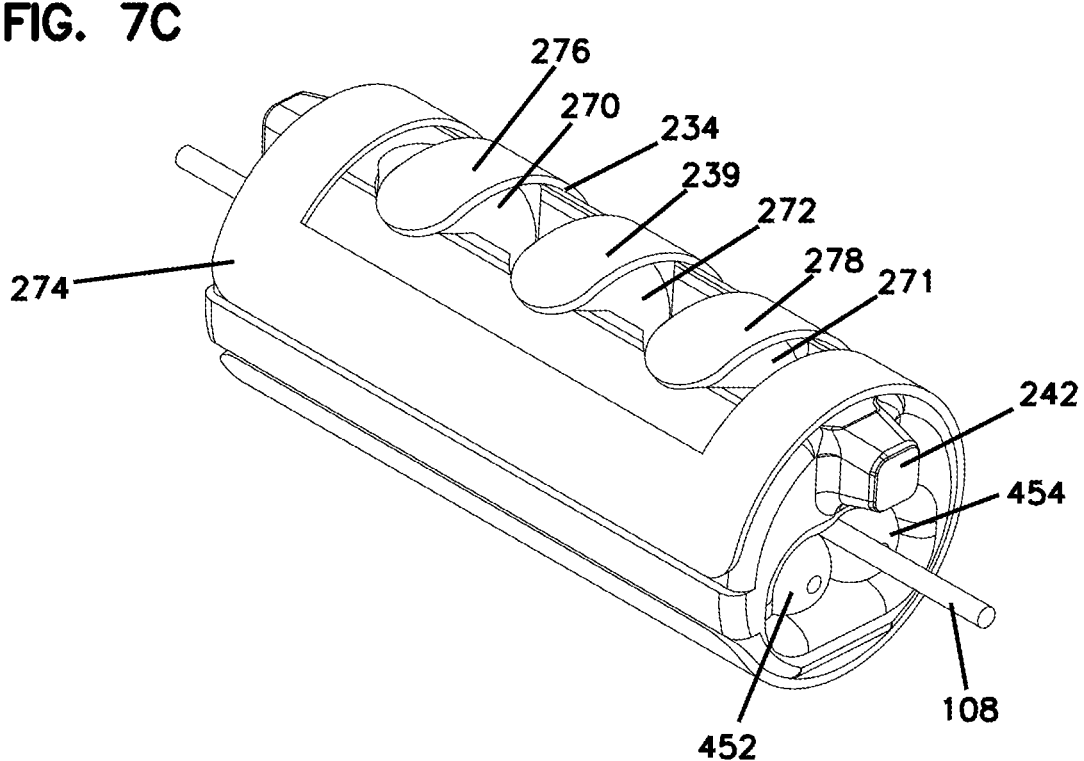
FIG. 7C is a perspective view of the optical fiber alignment device of FIG. 7A.
Figure 7D:
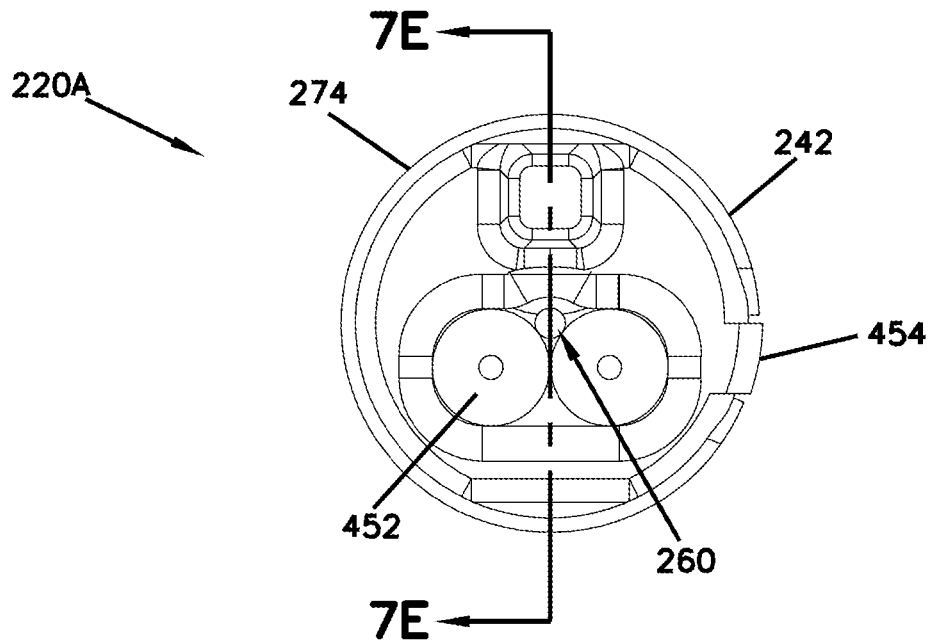
FIG. 7D is a transverse cross section of the optical fiber alignment device of FIG. 7A.
Figure 7E:
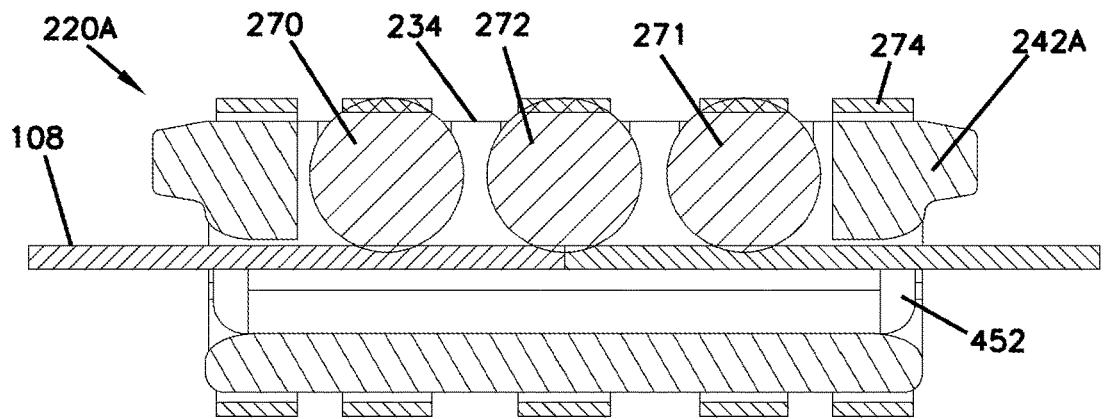
FIG. 7E is a longitudinal cross section of the optical fiber alignment device of FIG. 7D along section line 7E-7E.
Figure 8A:
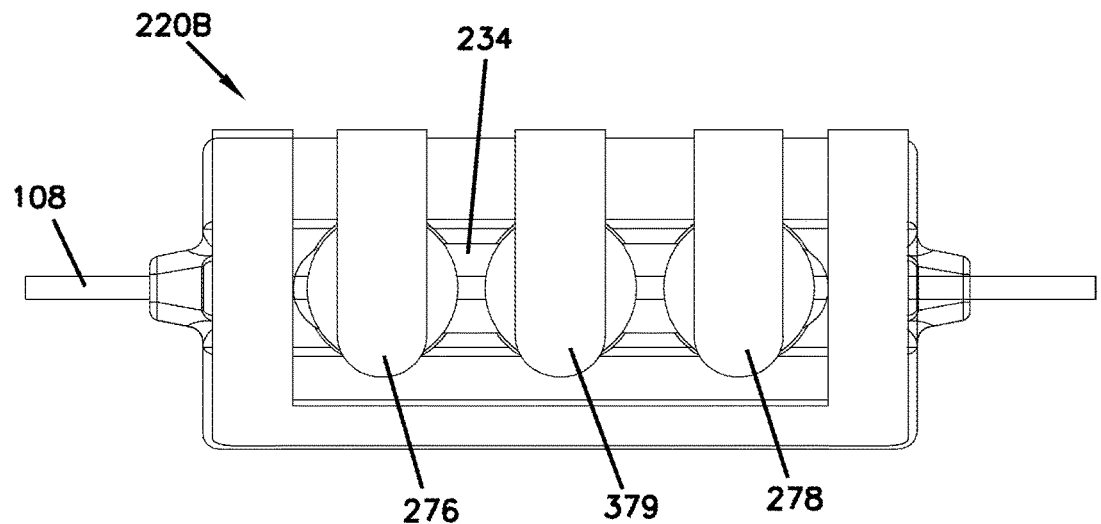
FIG. 8A is a top plan view of an optical fiber alignment device in accordance with the principles of the present disclosure.
Figure 8B:
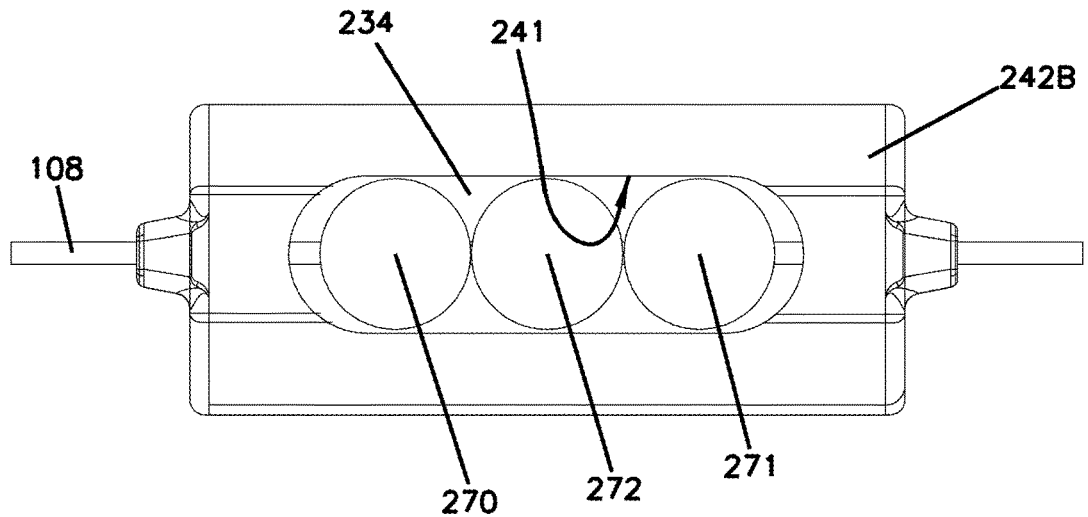
FIG. 8B is a top view of the optical fiber alignment device of FIG. 8A with the biasing arrangement removed.
Figure 8C:
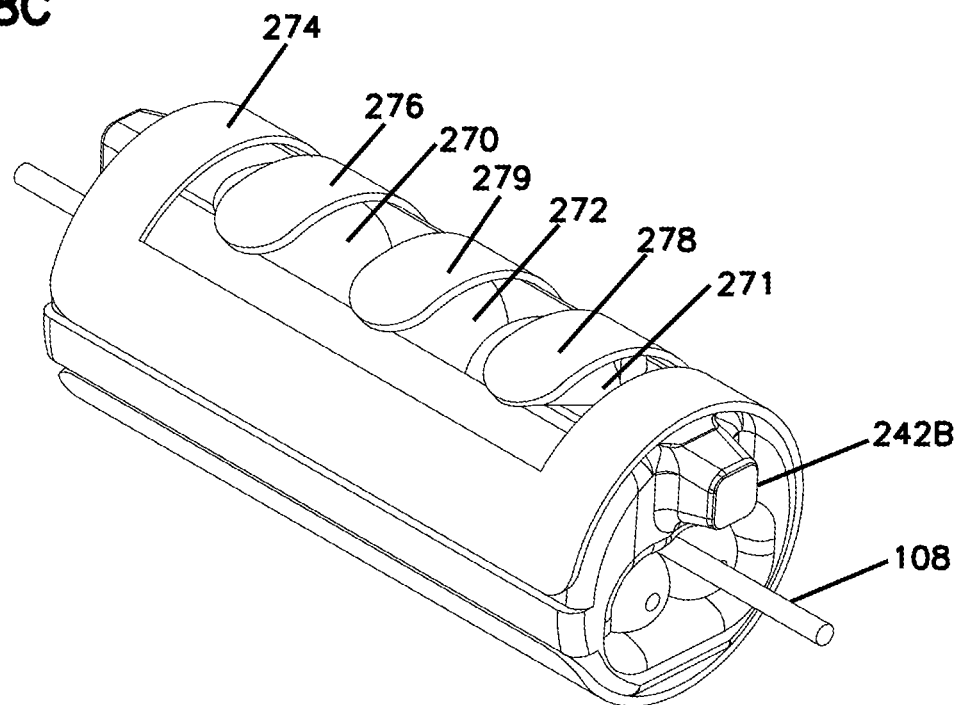
FIG. 8C is a perspective view of the optical fiber alignment device of FIG. 8A.
Figure 8D:
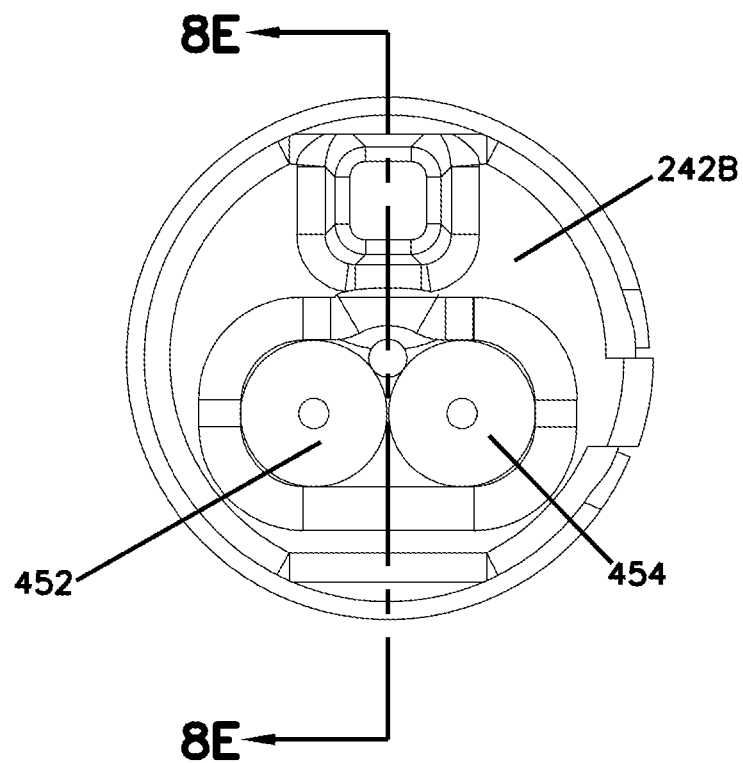
FIG. 8D is a transverse cross section of the optical fiber alignment device of FIG. 8A.
Figure 8E:
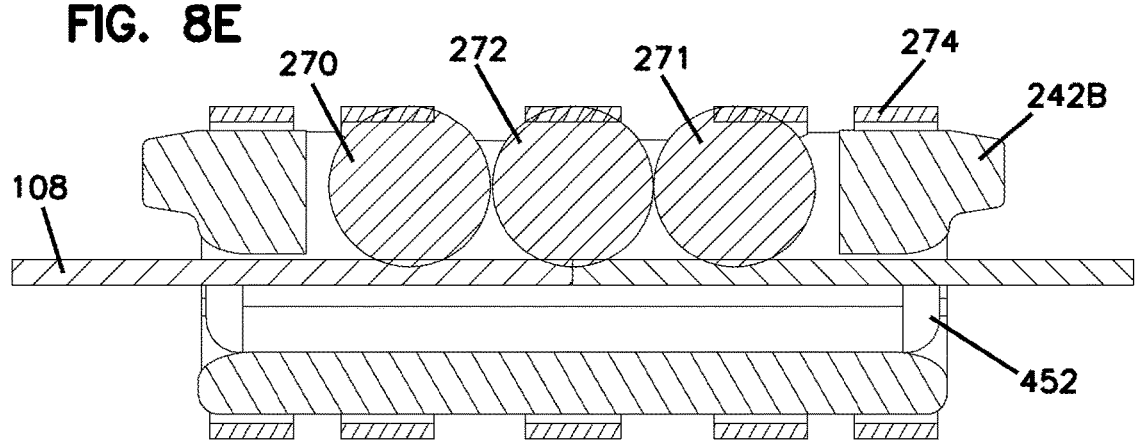
FIG. 8E is a longitudinal cross section of the optical fiber alignment device of FIG. 8D along section line 8E-8E.

In some aspects, the elongated access slot 234 is provided with ball-receiving pockets 235, as shown in FIGS. 7A-7C. The ball-receiving pockets 235 can have a shape that generally follows the contour of the fiber biasing members (e.g., first, second, and third balls 270, 271, 272). For example, as shown in FIGS. 7A-7C, the ball-receiving pockets 235 have an inside wall 240 that is curved to accommodate the balls. However, the elongated access slot 234 may also be constructed with straight side walls 241 to receive either a plurality of fiber contact members, as in FIGS. 8A-8C, or a single fiber contact rod 273, as in FIGS. 9A-9C.

Figure 9A:
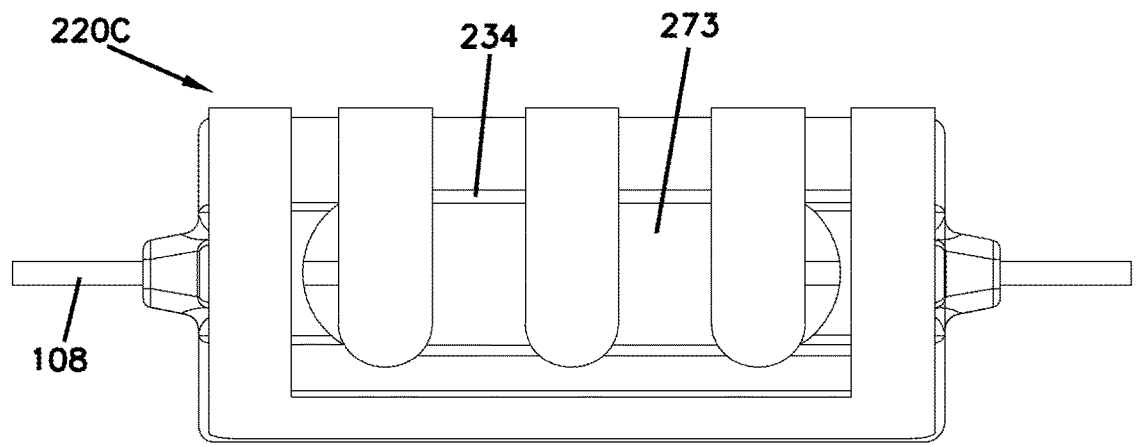
FIG. 9A is a top plan view of an optical fiber alignment device in accordance with the principles of the present disclosure.
Figure 9B:
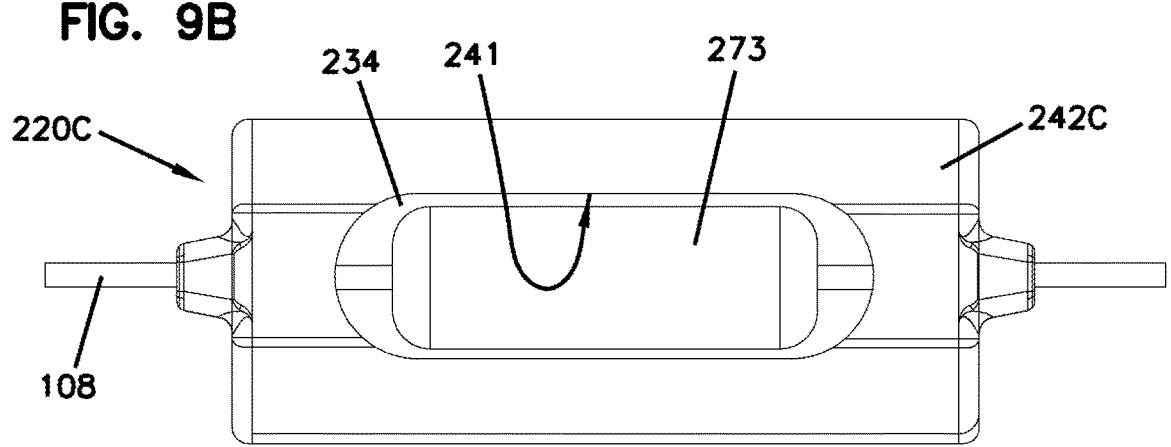
FIG. 9B is a top view of the optical fiber alignment device of FIG. 9A with the biasing arrangement removed.
Figure 9C:
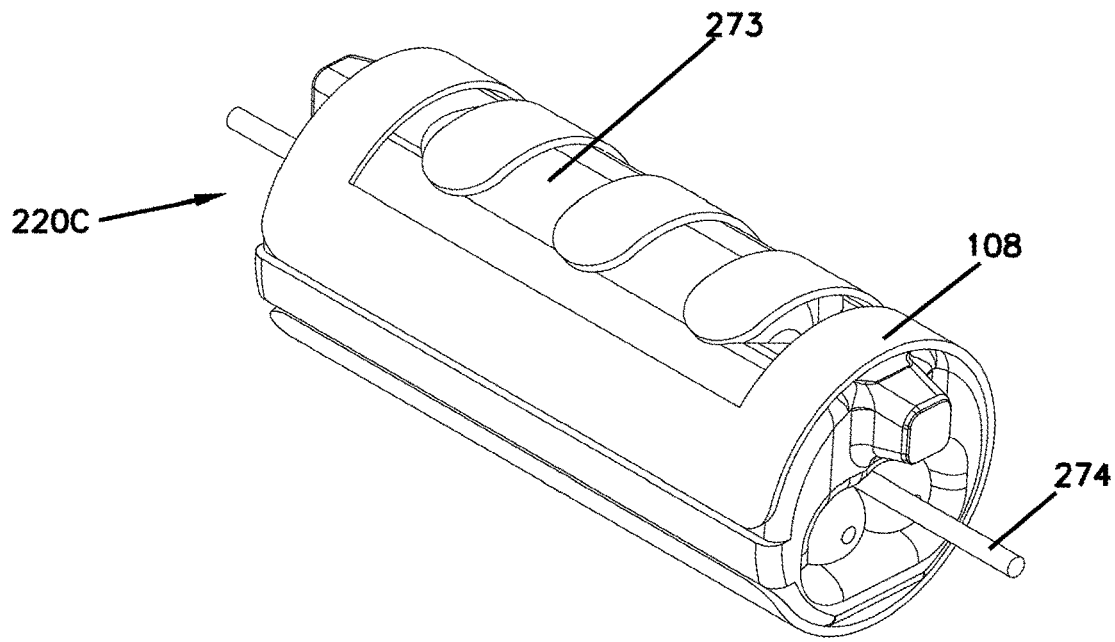
FIG. 9C is a perspective view of the optical fiber alignment device of FIG. 9A.
Figure 9D:
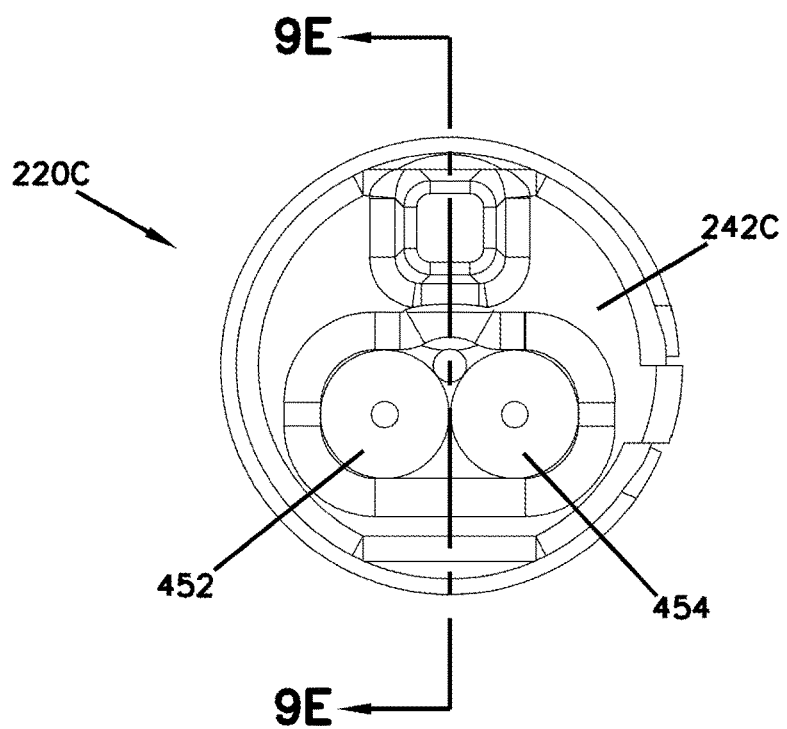
FIG. 9D is a transverse cross section of the optical fiber alignment device of FIG. 9A.
Figure 9E:
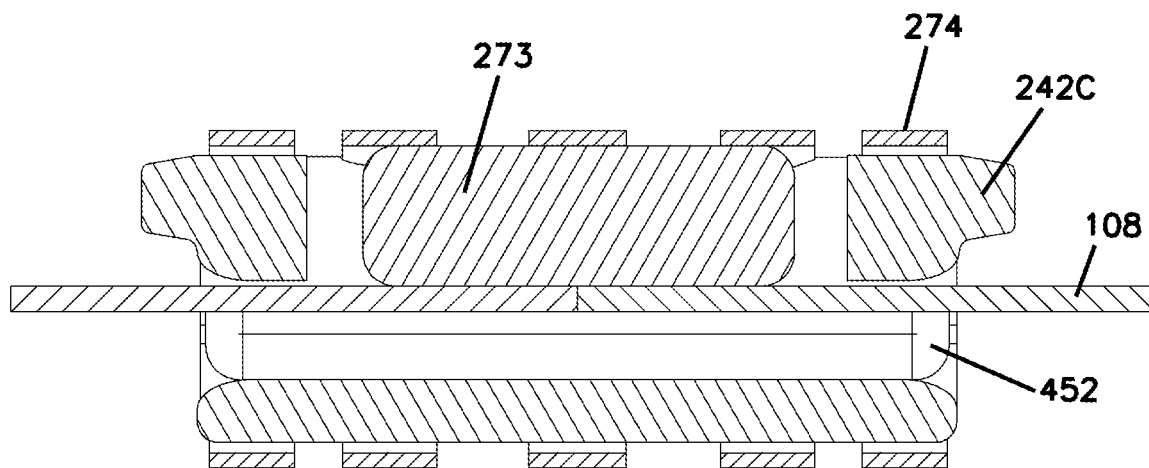
FIG. 9E is a longitudinal cross section of the optical fiber alignment device of FIG. 9D along section line 9E-9E.

The biasing arrangement is shown including a clip 274 (e.g., a metal clip having elastic properties) mounted (e.g., snap fitted) over the alignment housing 224. The clip 274 can have a transverse cross-sectional profile that is generally C-shaped. For example, if the biasing members comprise first, second, and third balls 270, 271, 272, the biasing arrangement may correspondingly include first, second, and third springs 276, 278, 279. If the biasing member comprises a single fiber contact rod 273, the biasing arrangement may include either a plurality of springs (e.g., as shown in FIG. 9A), or may include a single spring.

Shutter

In general, it is desired that both light loss across the adapter and variability in the light loss are minimized when the fibers are connected using connectors. However, when the connector is unconnected, it is desirable that little or no light is reflected back into the fiber. The amount of light reflected by a fiber-optic connector is known as the return loss of the connector, and is typically measured in units of dB. For example, if 1% of light is reflected back, then the reflectance is R=0.01 and the return loss is RL=−10 log(R) =+20 dB. It is desirable to have the return loss of an unconnected plug be 50 to 70 dB, with higher values of return loss preferred. In some aspects the fiber optic connector can be provided with a shutter that, when in a closed position, reduces the return of light through the fiber in an unconnected connector plug.

Figure 10A:
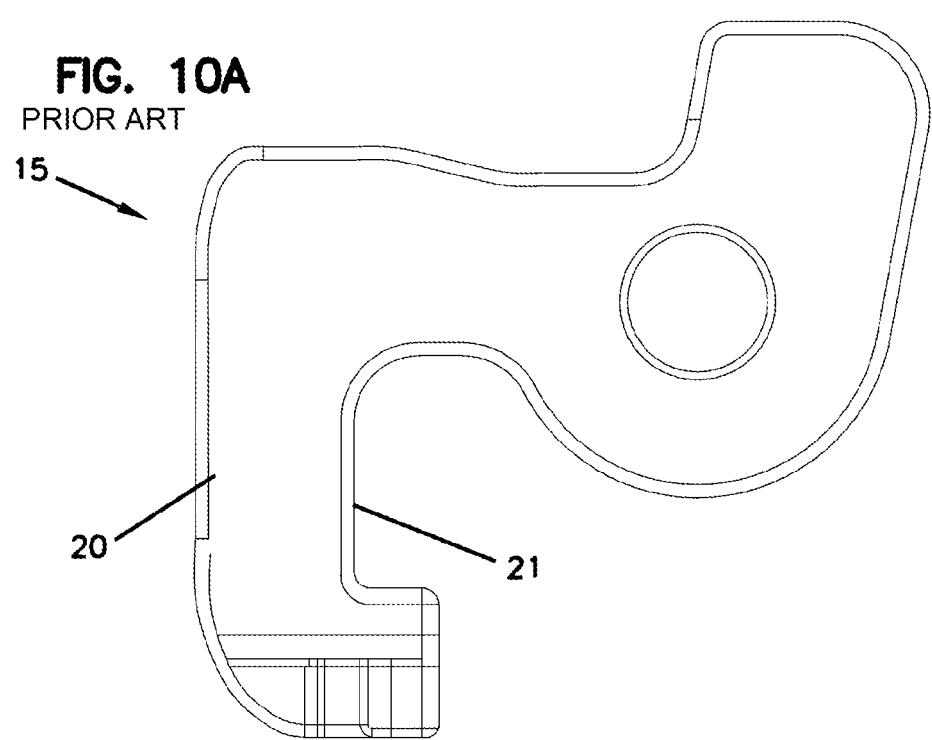
FIG. 10A is a side view of a prior art shutter for an optical connector.
Figure 10B:
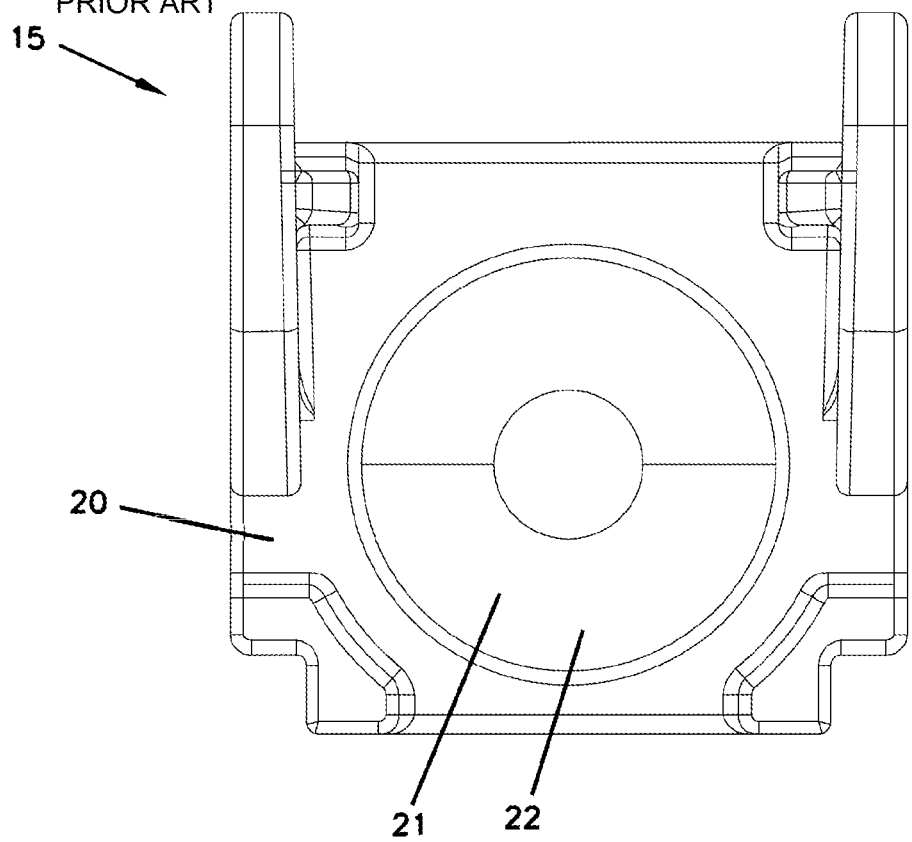
FIG. 10B is a back view of the shutter of FIG. 10A.
Figure 11A:
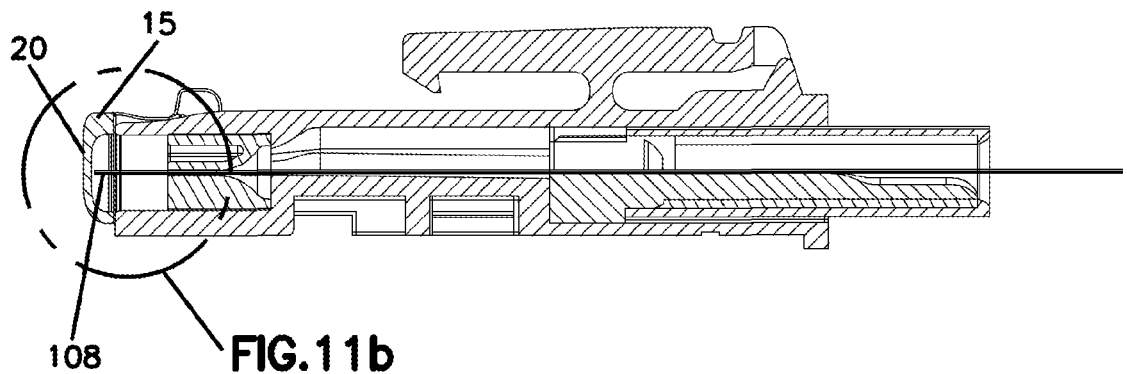
FIG. 11A is an axial cross section of an optical connector including a shutter.
Figure 11B:
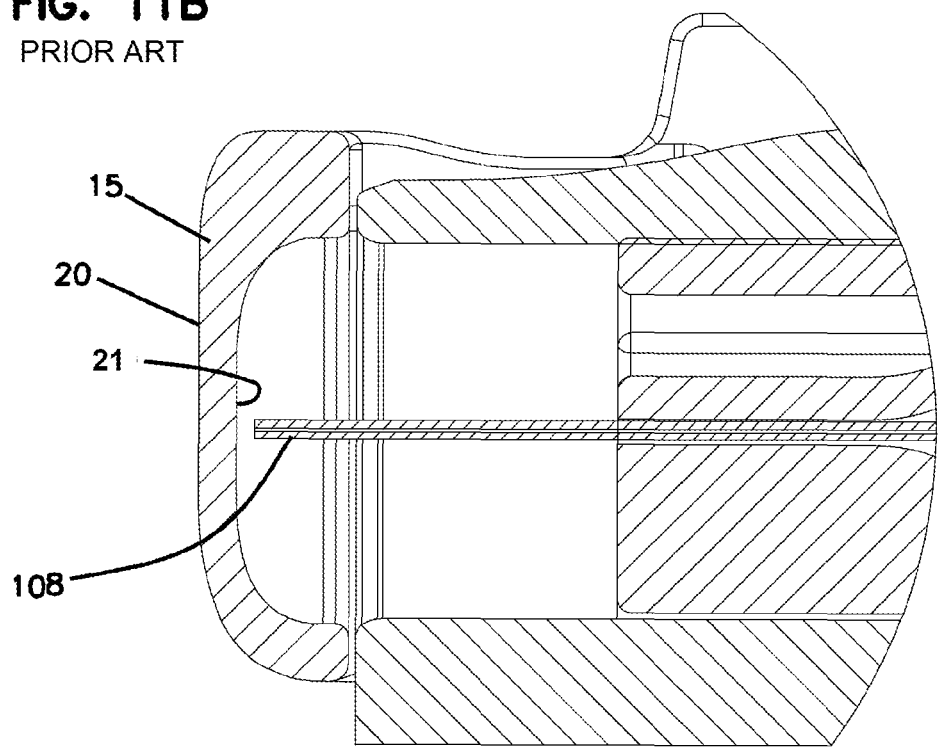
FIG. 11B is a detail of the shutter in FIG. 11A.

In a typical prior art shutter 15, shown in FIGS. 10A and 10B, the forward-facing shutter wall 20 has an inside surface 21 with a planar center portion 22. The planar center portion 22 can be surrounded by rounded edges, forming a bowl-shape interior receptacle that may contain an index matching gel used to protect and clean the fiber when the shutter 15 is closed. As seen in cross-sectional FIGS. 11A and 11B, the free end of the optical fiber 108 is received by the interior receptacle and is located close to the inside surface of the shutter when the shutter 15 is in a closed position. The distance from the tip of the optical fiber 108 to the shutter is nominally about 0.15 mm. With the fiber tip located close to the inside surface 21 of the shutter 15, a relatively large amount of light reflected back from the closed shutter 15 can re-enter the optical fiber 108 when the connector plug is not connected.

Figure 12A:
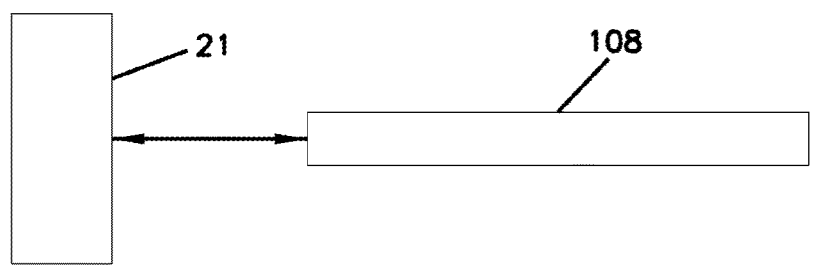
FIGS. 12A-12C are schematic depictions of the path of a light ray from an optical fiber.
Figure 12B:
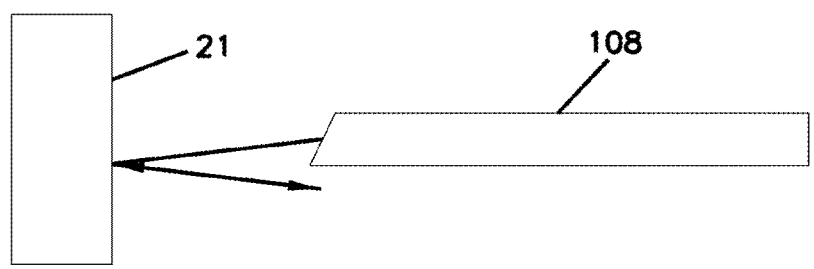
Figure 12C:
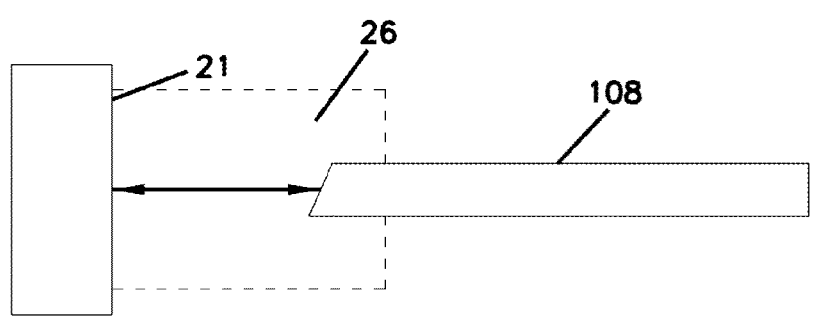

Simplified depictions of the tip of an optical fiber 108 pointed at the inside surface 21, 541 of the shutter 15, 528, are shown in FIGS. 12A-12C, 13, and 14, showing a single "ray" of light. If the tip of the optical fiber 108 is cut flat (perpendicular to the optical axis of the fiber) as in FIG. 12A, light from the fiber reflects back into the optical fiber 108 from the inside surface 21. Although the intensity of the reflected light is reduced due to the finite reflectivity of the shutter's inside surface, it is desired to reduce the amount of reflected light (i.e., to increase the return loss). Fiber tips are typically cut at an angle of about 8°, as shown in FIGS. 12B and 12C (the angles are exaggerated for demonstration purposes). When the angled tip is in air, as in FIG. 12B, the light will bend and reflect away from the optical fiber 108. However, when the tip is embedded in index matching gel 26 with an index of refraction that matches the index of refraction of the fiber, the light travels straight and again reflects back into the optical fiber 108, as shown in FIG. 12C.

Figure 13:
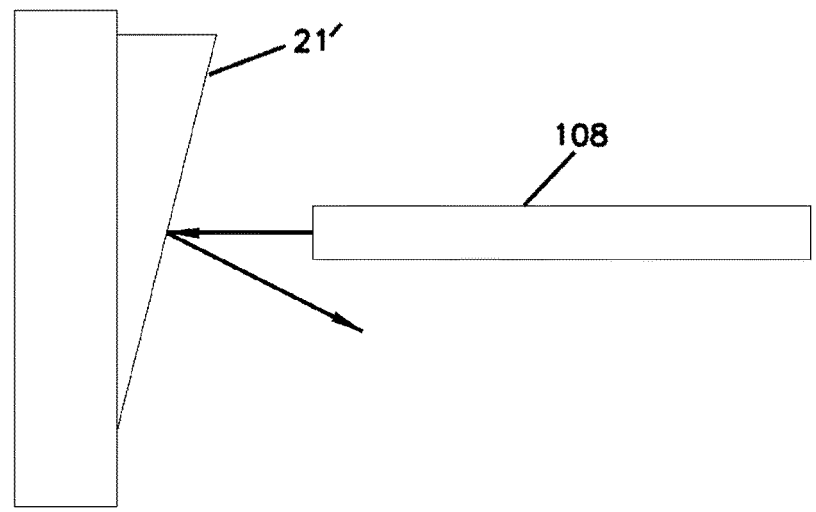
FIG. 13 is a schematic depiction of the path of a light ray from an optical fiber in a prior art system.
Figure 14:
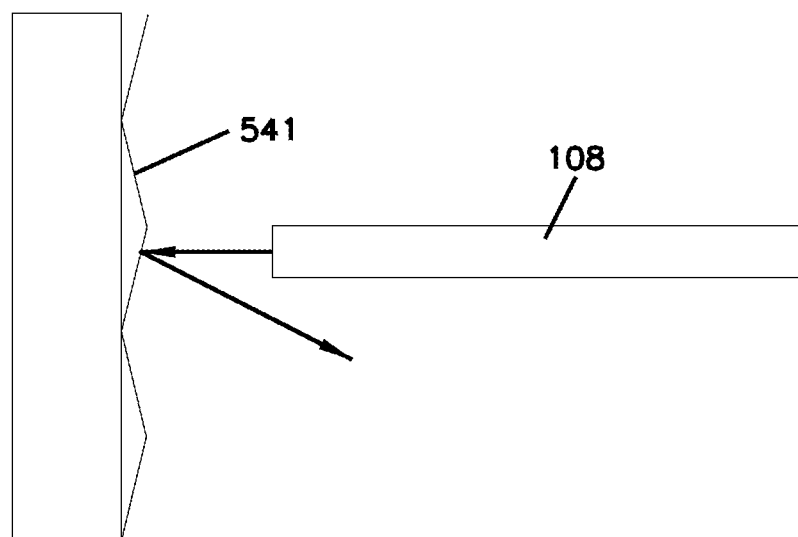
FIG. 14 is a schematic depiction of the path of a light ray from an optical fiber in a system in accordance with the principles of the present disclosure.

In some fiber optic connectors, this problem has been solved by an angled inside surface 21' of the shutter, as shown schematically in FIG. 13. The angled inside surface 21' increases the return loss, thus preventing most of the light from returning back into the fiber. However, a disadvantage of the angled surface is that the shutter wall is much thicker at one side (top in FIG. 13) relative to the other side (bottom in FIG. 13). Further, the solution of a single angled inside surface 21' cannot be implemented in a shutter where the gap between the fiber and the shutter is only 0.15 mm. In other cases, a non-uniform wall thickness may cause excessive "sink" when the shutter surface is molded. This sink is a localized deformation of the surface which may act as a lens, focusing the light back on the fiber, thereby causing undesirably high light return.

According to an aspect of the present disclosure shown in FIGS. 14, 15B, 15G, 15H, and 15J, the inside surface 541 of the shutter wall 540 includes a light distribution structure with a plurality (or series) of angled facets 542a, 542b. The facet surfaces are angled relative to one another. When the shutter is closed, the fiber axis intersects the light distribution structure. As a result, the light is reflected back at an angle, causing a high return loss, while the thickness T540 of the shutter wall 540 can be kept from getting too thick. In one embodiment, the texture on the inside surface of the shutter consists of a series of flat surfaces (facets 542a, 542b) which are arranged in a configuration that has the appearance of a "washboard," or a "saw tooth" in cross-section (see FIGS. 14, 15G, and 15H). As compared to the single angled surface of FIG. 13, the thickness T542 of the faceted portion 542 (see FIG. 15K) is reduced by a factor of 4, while retaining the functionality of the angled feature.

The angle $\beta$ of the facets 542a, 542b, and the thickness T542 of the faceted portion 542 can be adjusted to minimize light reflected back within limitations of the fabrication method used to produce the shutter 528. The angle $\beta$ and thickness T542 can also be adjusted to provide a low-profile shutter wall 540 having a relatively low wall thickness T540. The angle $\beta$ of the facets 542a, 542b in the series of facets can also vary such that different facets have different angles. In a preferred embodiment, the facets surfaces are smooth to minimize light scattering, and the corners between the facet surfaces are sharp. However, due to limitations of materials and fabrication methods, some roughness of the surfaces and rounding of the corners inevitably occurs, resulting in a trade-off between a more uniform thickness T540 of the shutter wall 540 and reduction in the return loss.

Figure 15J:
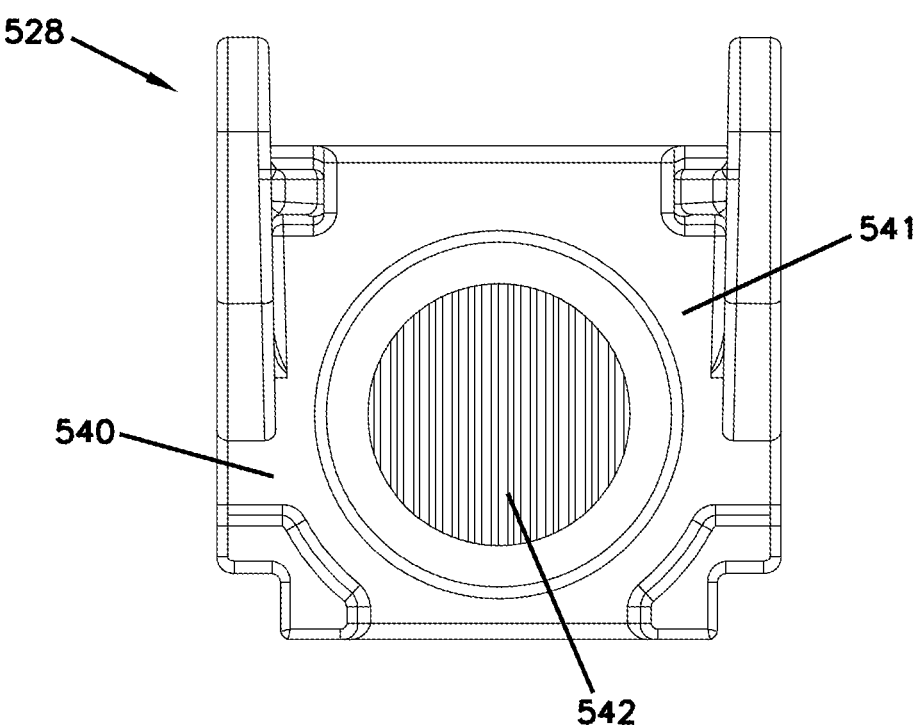
FIG. 15J is a back view of the shutter of FIG. 15A.
Figure 15A:
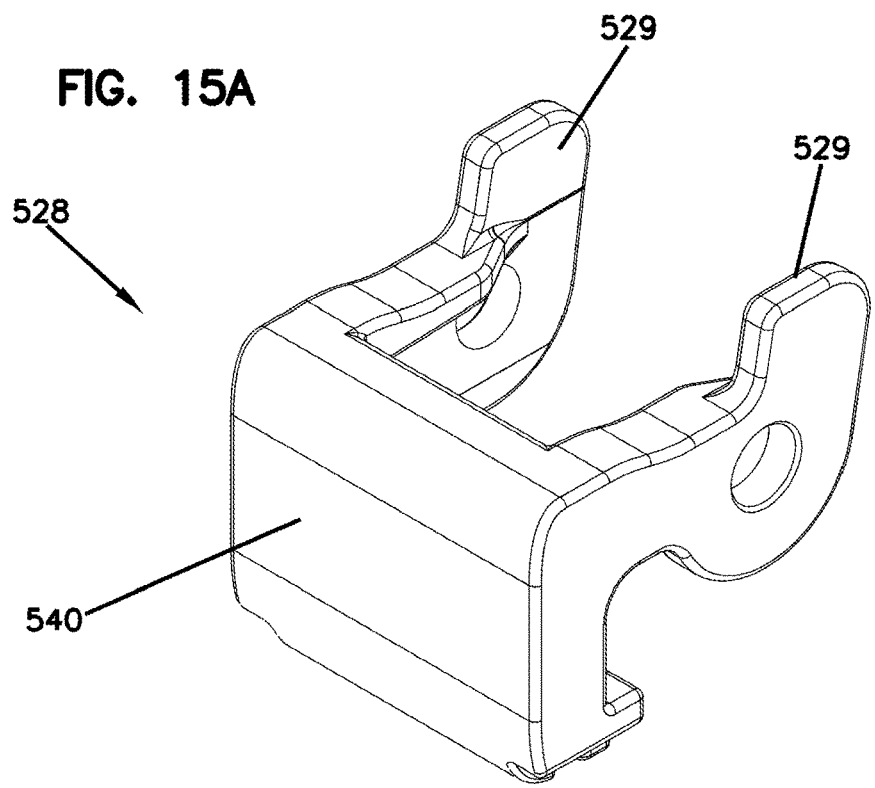
FIG. 15A is a perspective view of a shutter for an optical connector in accordance with the principles of the present disclosure.
Figure 15B:
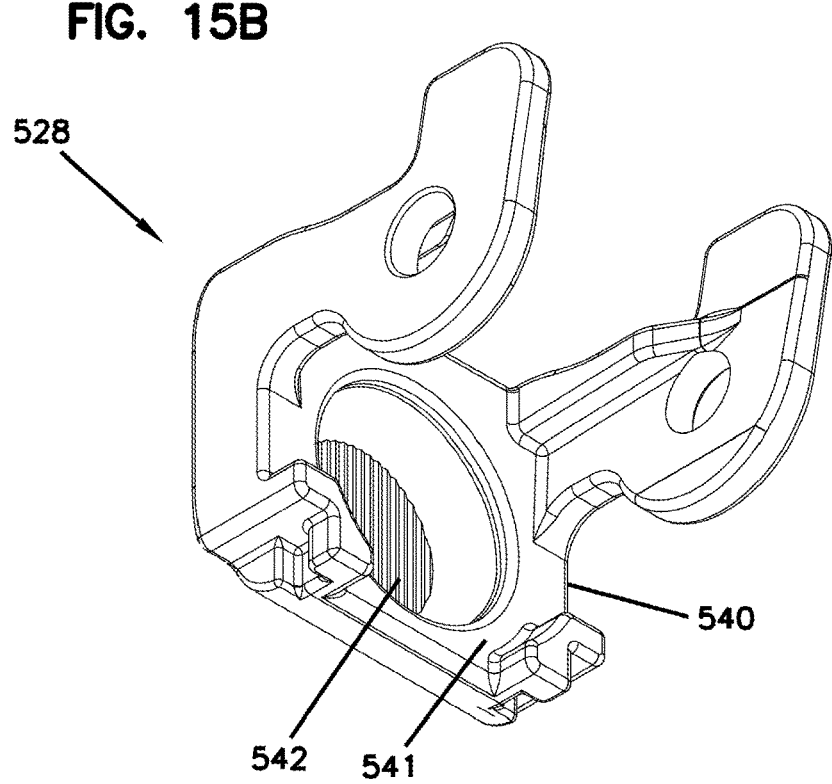
FIG. 15B is a back perspective view of the shutter of FIG. 15A.
Figure 15C:
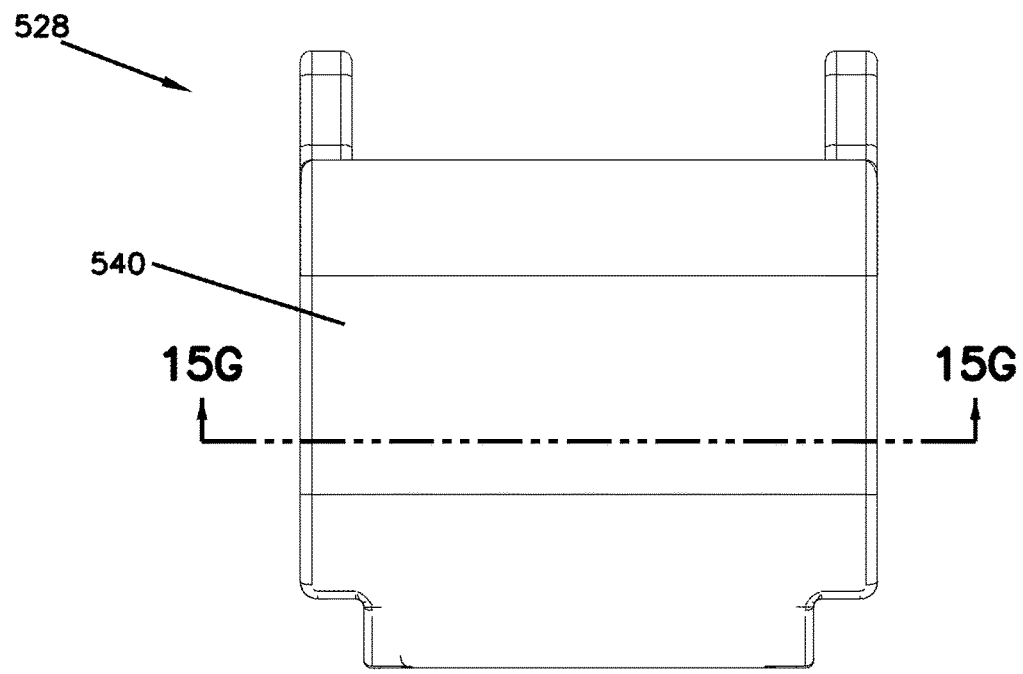
FIG. 15C is a front view of the shutter of FIG. 15A.
Figure 15D:
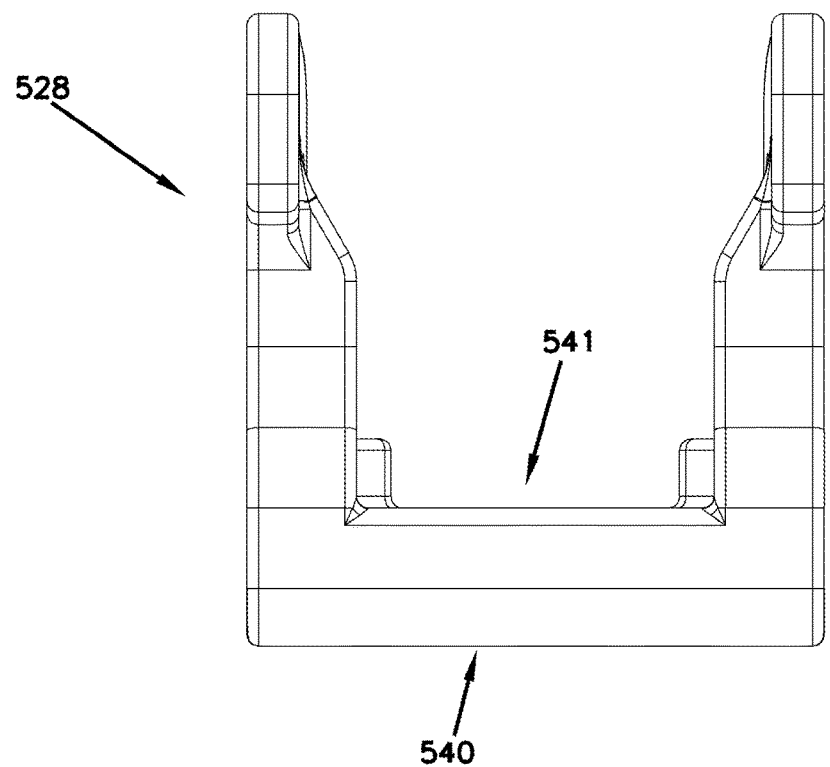
FIG. 15D is a top view of the shutter of FIG. 15A.
Figure 15E:
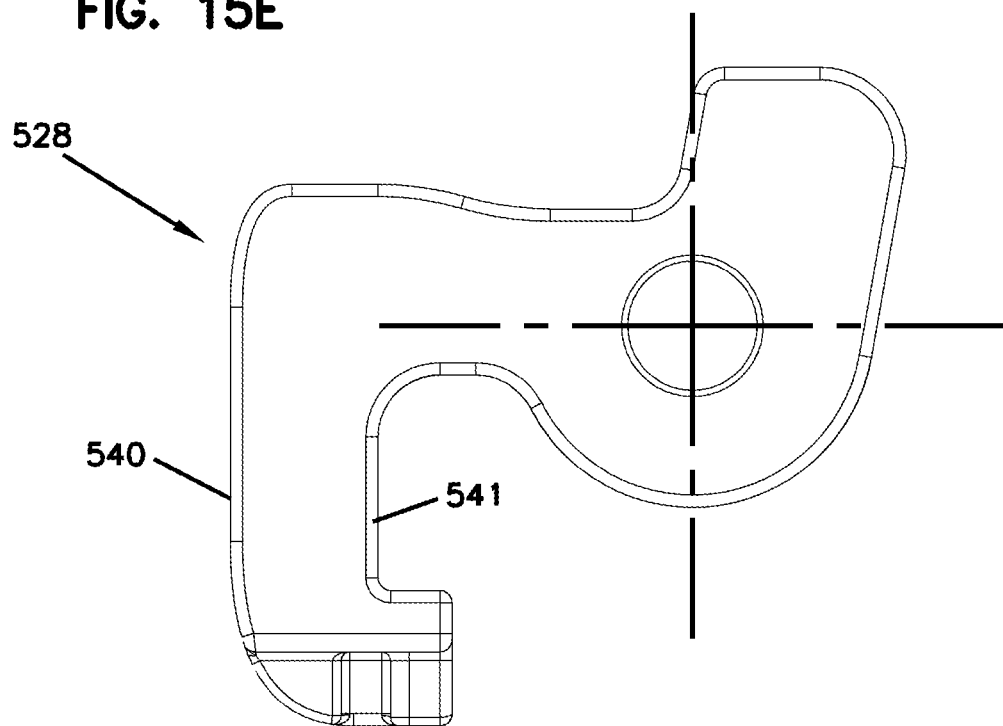
FIG. 15E is a side view of the shutter of FIG. 15A.
Figure 15F:
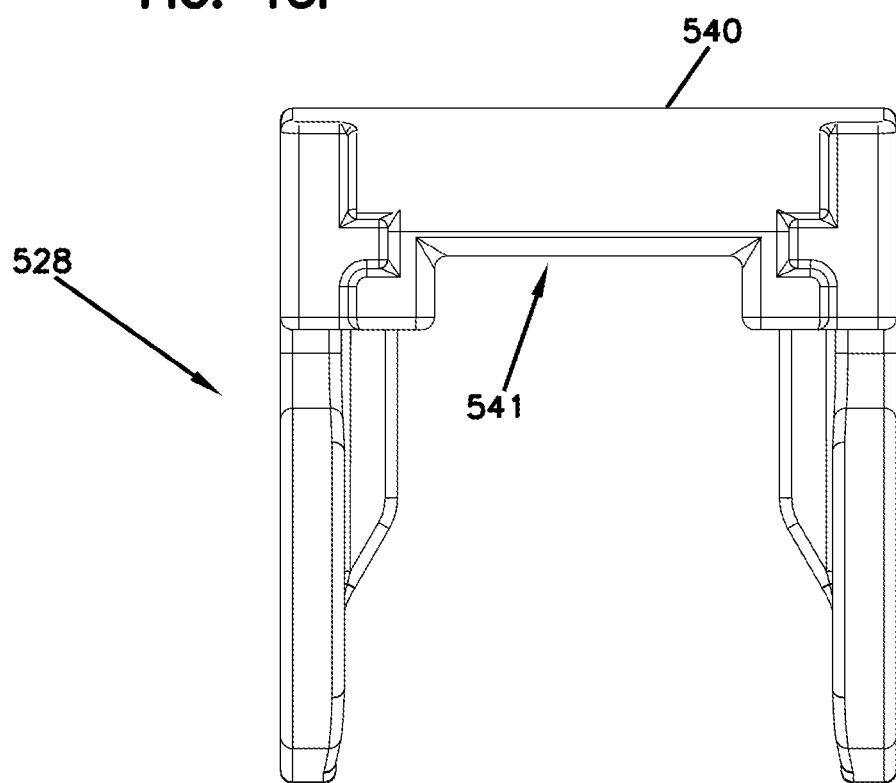
FIG. 15F is a bottom view of the shutter of FIG. 15A.
Figure 15G:
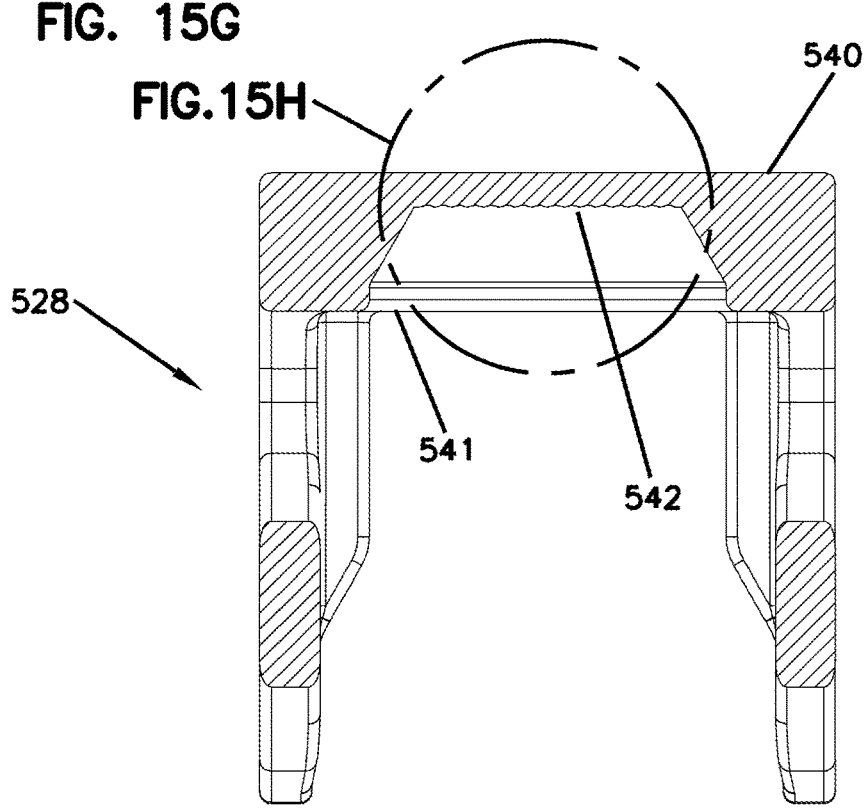
FIG. 15G is a cross-sectional view of the shutter of FIG. 15A taken along section line 15G-15G.
Figure 15H:
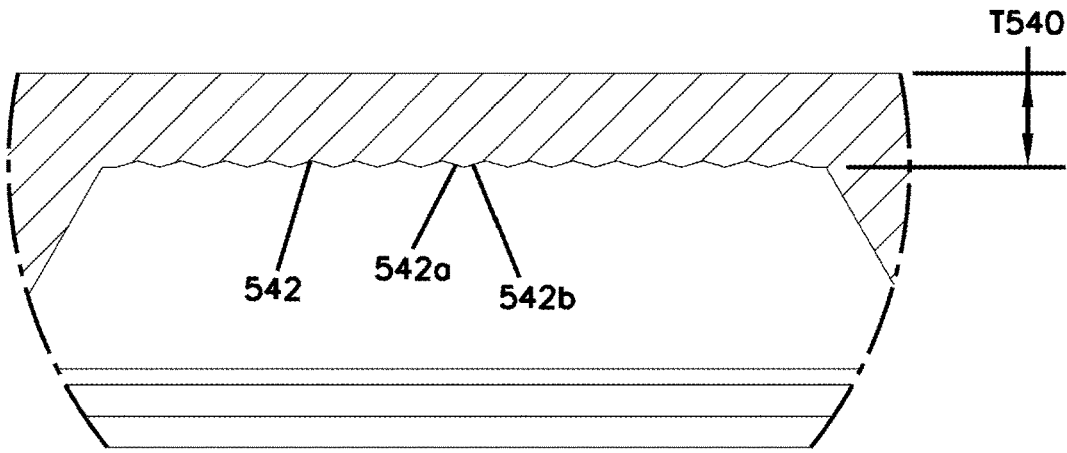
FIG. 15H is a detail view of the shutter of FIG. 15G.
Figure 15K:
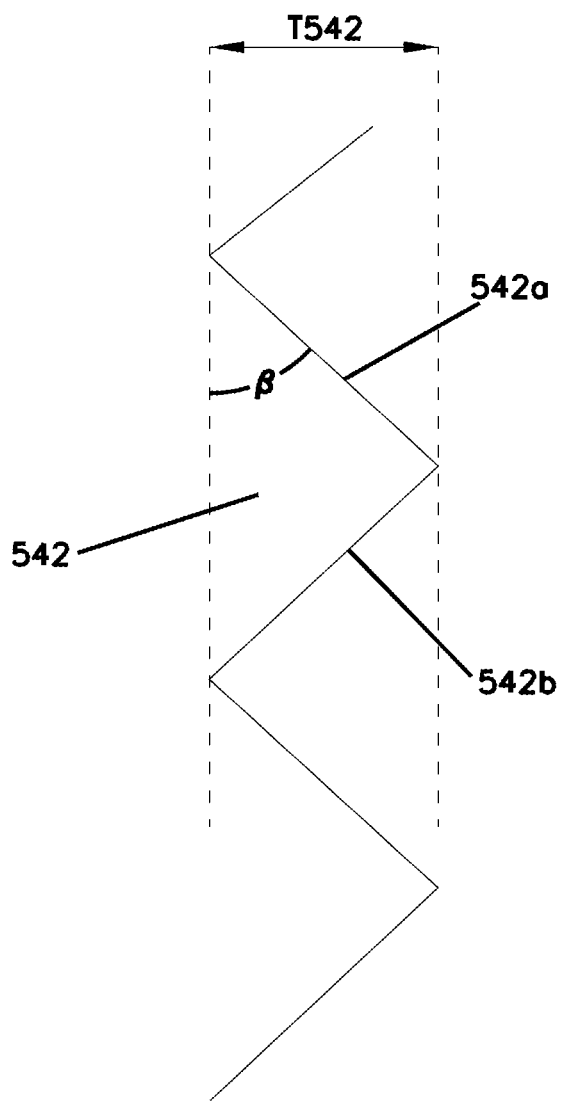
FIG. 15K is a schematic depiction of the cross section of the inside surface of the shutter of FIG. 15A.
Figure 16A:
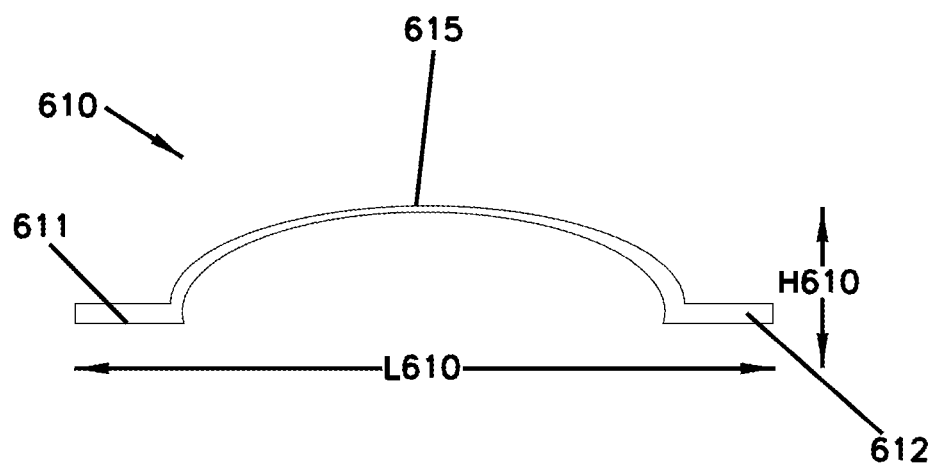
FIG. 16A is a side view of a biasing spring in accordance with the principles of the present disclosure.
Figure 16B:
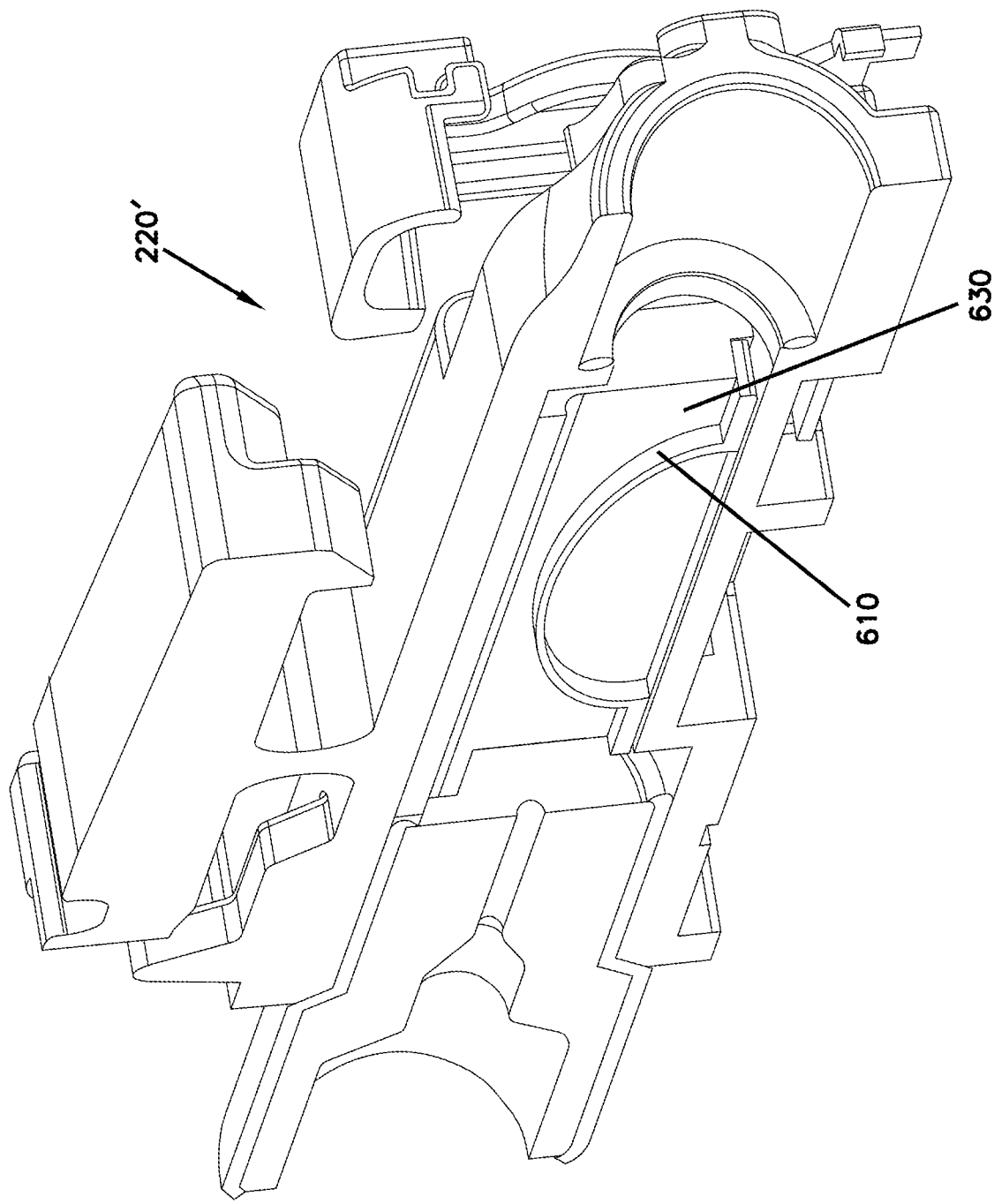
FIG. 16B is a perspective view of a cross section of an optical connector plug with the biasing spring of FIG. 16A.
Figure 17A:
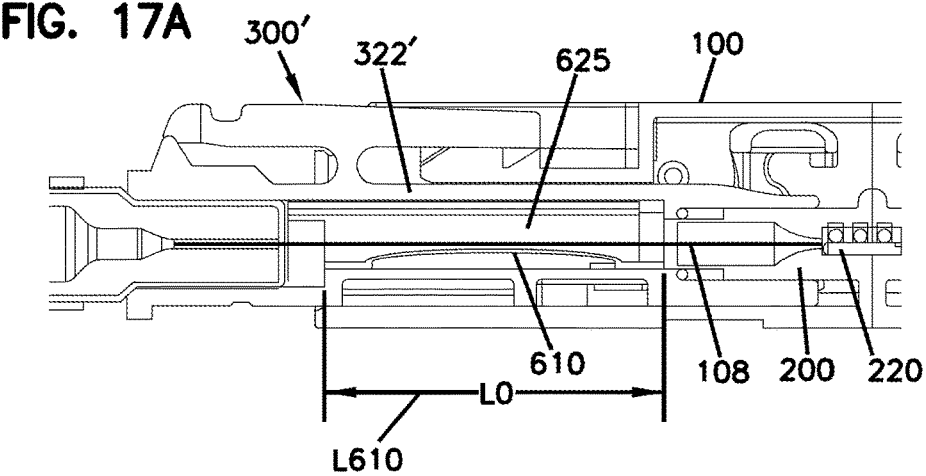
FIGS. 17A-17D are sequential diagrammatic views of the optical connector plug of FIG. 16B as the optical connector plug is inserted into an optical adapter in accordance with the principles of the present disclosure.
Figure 17B:
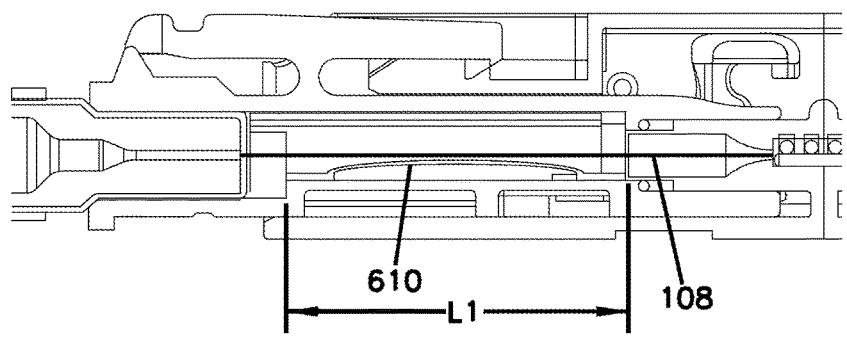
Figure 17C:
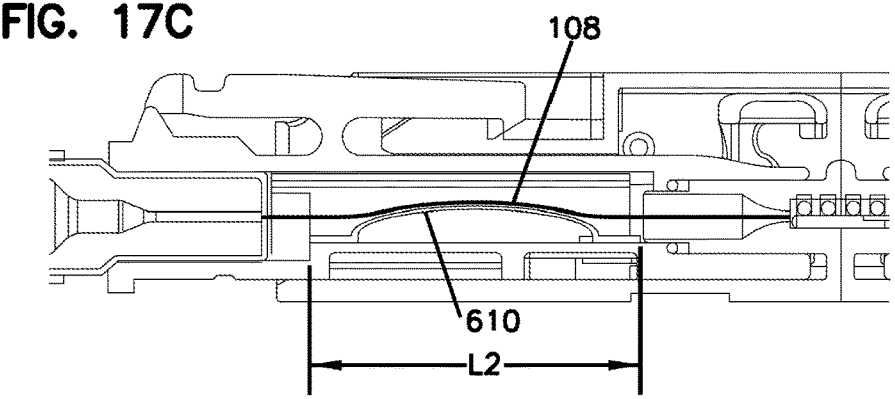
Figure 17D:
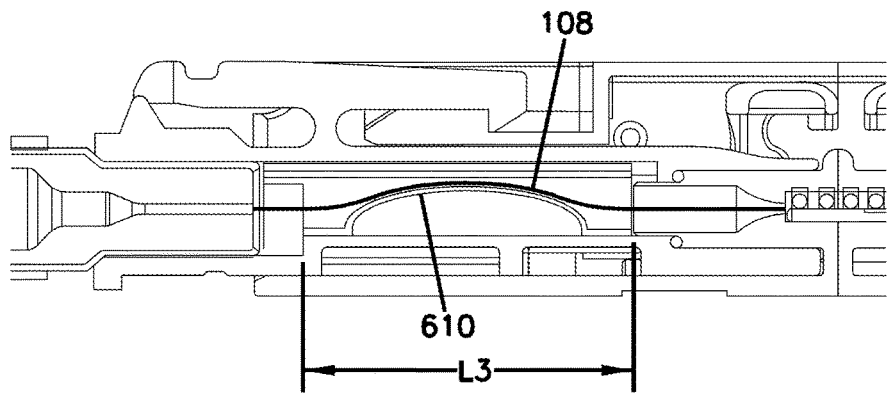

The facets 542a, 542b can be arranged in substantially vertical, parallel lines, as shown in the example in FIGS. 15B and 15J. However, many other possible configurations exist, such as parallel lines arranged at a non-vertical angle (e.g., horizontal, diagonal, or any other angle), or facets arranged in the shape of tetrahedrons or pyramids, or arranged in concentric circles or other concentric shapes. The fabrication method will, in some cases, dictate the type of surface which can be formed at a reasonable cost.

The shutter 528 can be constructed out of any suitable material. One example of a suitable material is molded plastic (e.g., an engineering plastic). The parallel lines shown in FIGS. 15B and 15J can be created in the mold steel using grinding. More complex features can be created using diamond-turning, which is a more expensive process. Chemical etching may also be employed to create angled features in either the mold steel or in the finished part. Shutter 528 may be constructed with tabs 529.

In some implementations, the faceted portion 542 has a thickness T542 of about 0.001 to 1 mm, or about 0.01 to 0.5 mm. The thickness T542 of the faceted portion 542 is preferably less than the thickness T540 of the wall 540. For example, the thickness T542 of the faceted portion 542 can be about half, about 1/3, about 1/4, about 1/5, about 1/10, or from about 1/2 to about 1/20 of the thickness T540 of the wall 540. The faceted portion 542 can extend throughout the planar center portion of the inside surface 541, of can be provided in a center part of the planar center portion only. For example, the faceted portion 542 can be provided in an area where light from the optical fiber 108 is expected to hit the inside surface 541.

The facets 542a, 542b can be disposed at an angle $\beta$ of about 5° to 45°, about 8° to 30°, about 10° to 20°, about 12° to 16°, or any number therebetween. The angle $\beta$ is measured as the angle of the facets 542a, 542b relative to a plane perpendicular to the optical axis of the fiber 108. A higher return loss can be achieved with a greater angle $\beta$.

Figure 22A:
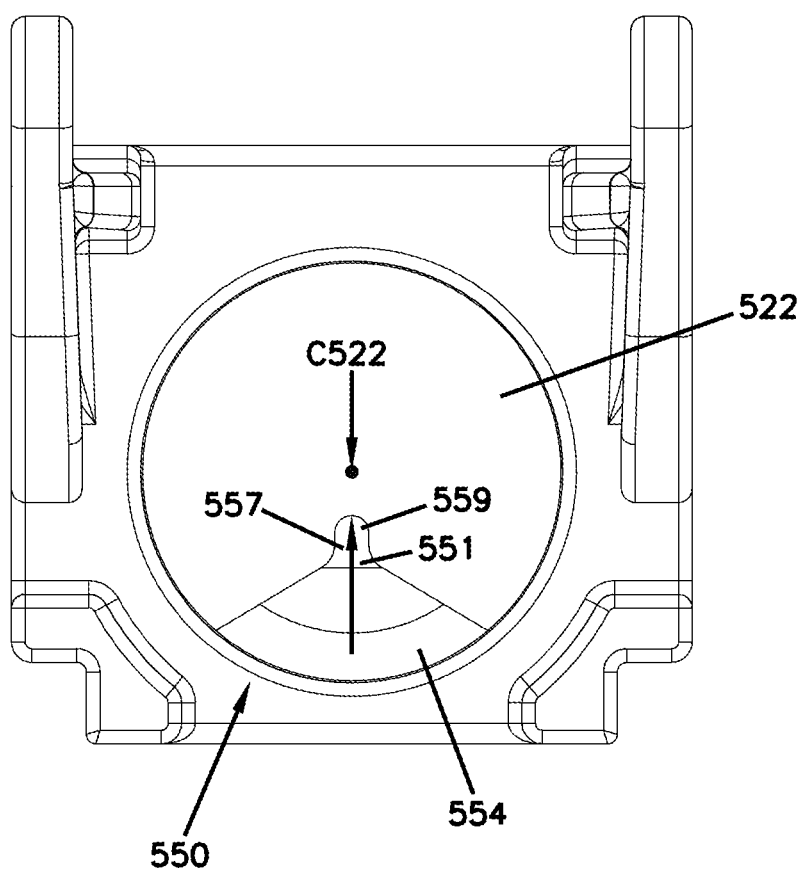
FIG. 22A is a back view of a shutter for an optical connector in accordance with the principles of the present disclosure.
Figure 22B:
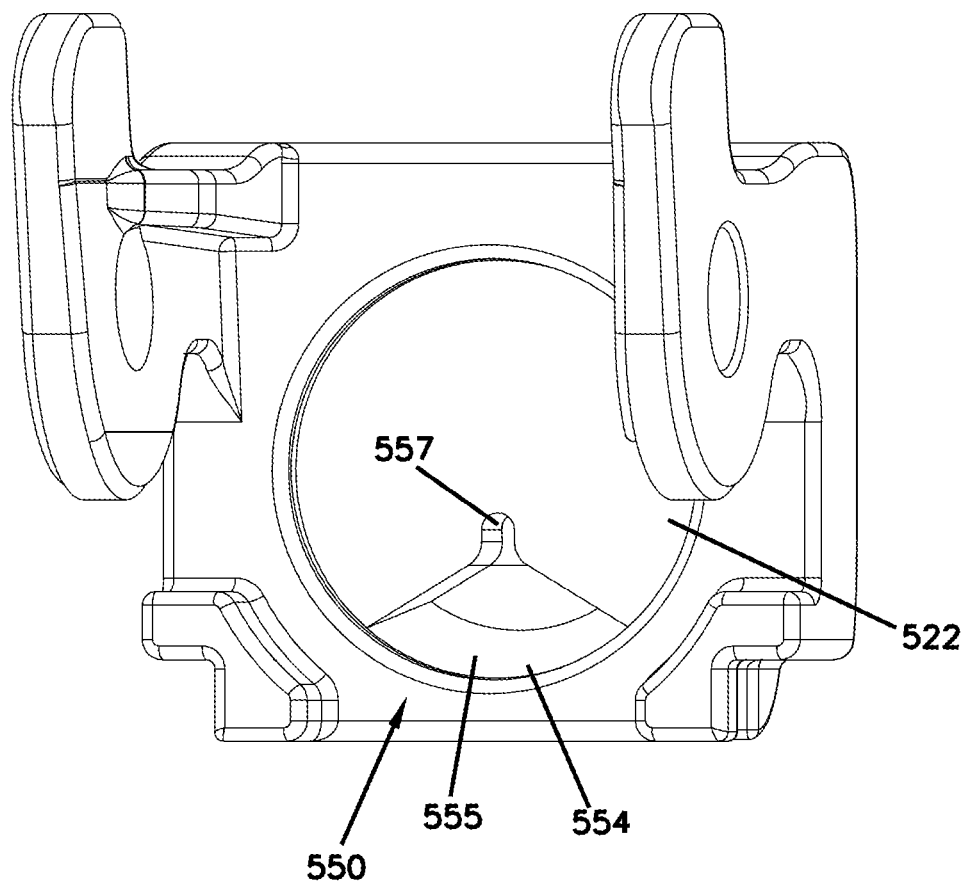
FIG. 22B is back perspective view of the shutter of FIG. 22A.
Figure 22C:
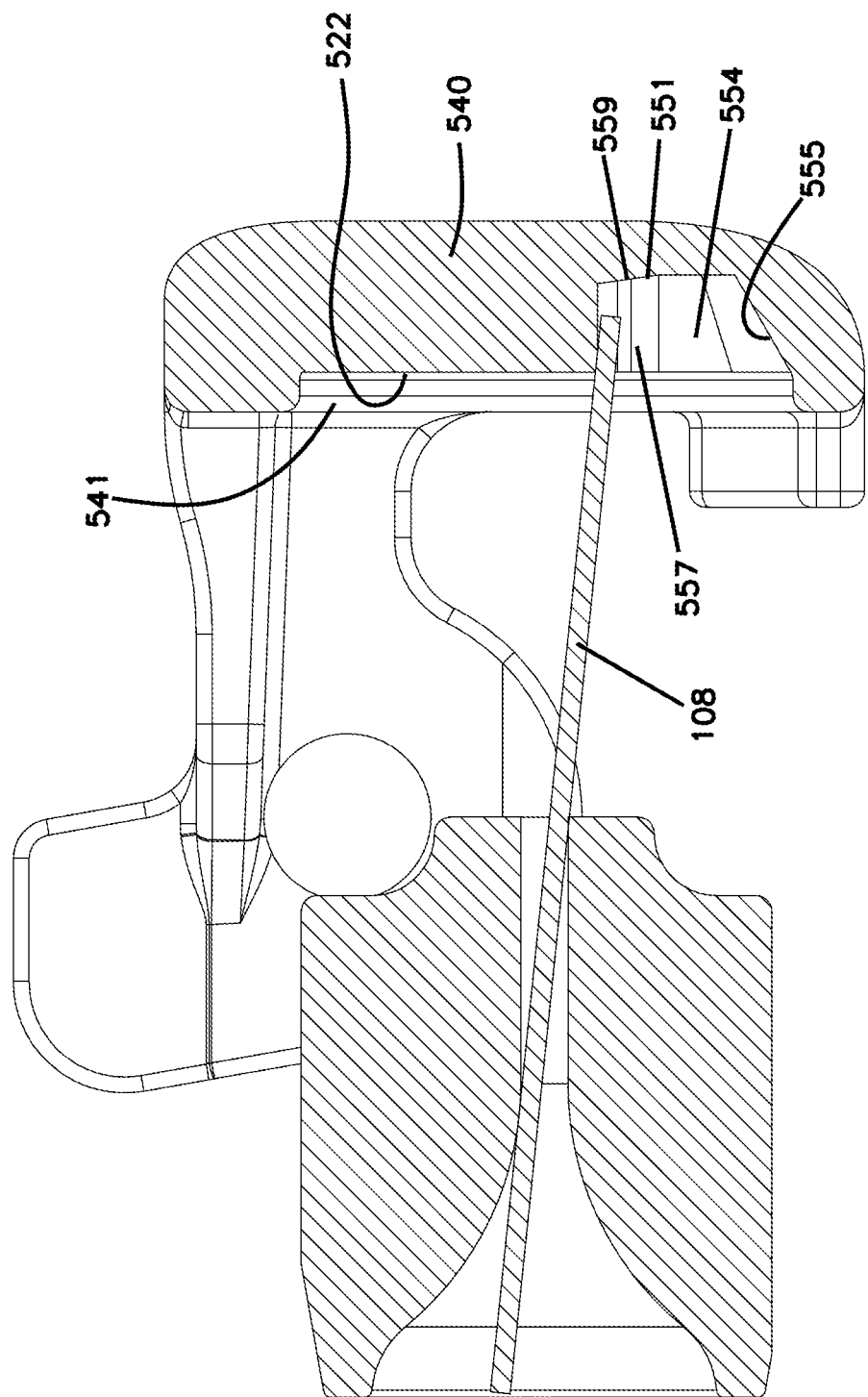
FIG. 22C is a cross-sectional view of the shutter of FIG. 22A with an optical fiber tip positioned therein.

According to some aspects, the inside surface 541 of the shutter wall 540 includes a fiber guiding structure 550 that receives the tip of the optical fiber 108 and guides the end portion of the optical fiber 108 into an angle relative to the axis of the connector. In some embodiments, the fiber guiding structure 550 can be formed as a cut-out or a groove on the planar center portion 522 of the shutter wall 540. Exemplary fiber guiding structures 550 are shown in FIGS. 22A-25C. In one embodiment shown in FIGS. 22A-22C, the fiber guiding structure 550 comprises a guiding portion 554 and a tip-receiving portion 557. The guiding portion 554 and the tip-receiving portion 557 are part of an integrated depression (e.g., a cut out) in the planar center portion 522. The tip-receiving portion 557 is positioned at a distance from the center C522 of the planar center portion 522 as shown in FIG. 22A. For example, the tip-receiving portion 557 can be positioned about 10 to about 90% of the way from the center C522 toward an edge 523 of the planar center portion 522, or about 20 to about 50% of the way from the center C522 toward the edge 523. The fiber guiding structure 550 and the tip-receiving portion 557 can be disposed on any side of the center C522 (e.g., below, above, or on one side). In the examples shown, the fiber guiding structure 550 and the tip-receiving portion 557 are positioned below the center C522. The fiber guiding structure 550 has a back wall 551 and sloping side walls that lead into the tip-receiving portion 557. The back wall 551 of the guiding portion 554 may be flat or perpendicular to the axis of the connector 300, or may include a sloping section 555 that helps to guide the tip of the fiber 108 into the tip-receiving portion 557. In the tip-receiving portion 557 the back wall 551 may include one or more angled facets that reflect the light from the tip of the fiber 108 away from the fiber 108. For example, the back wall 551 may include a single angled facet 559. The tip-receiving portion 557 has side walls (e.g., a curved side wall, as shown) that partially circumscribe the tip of the fiber 108.

Figure 23A:
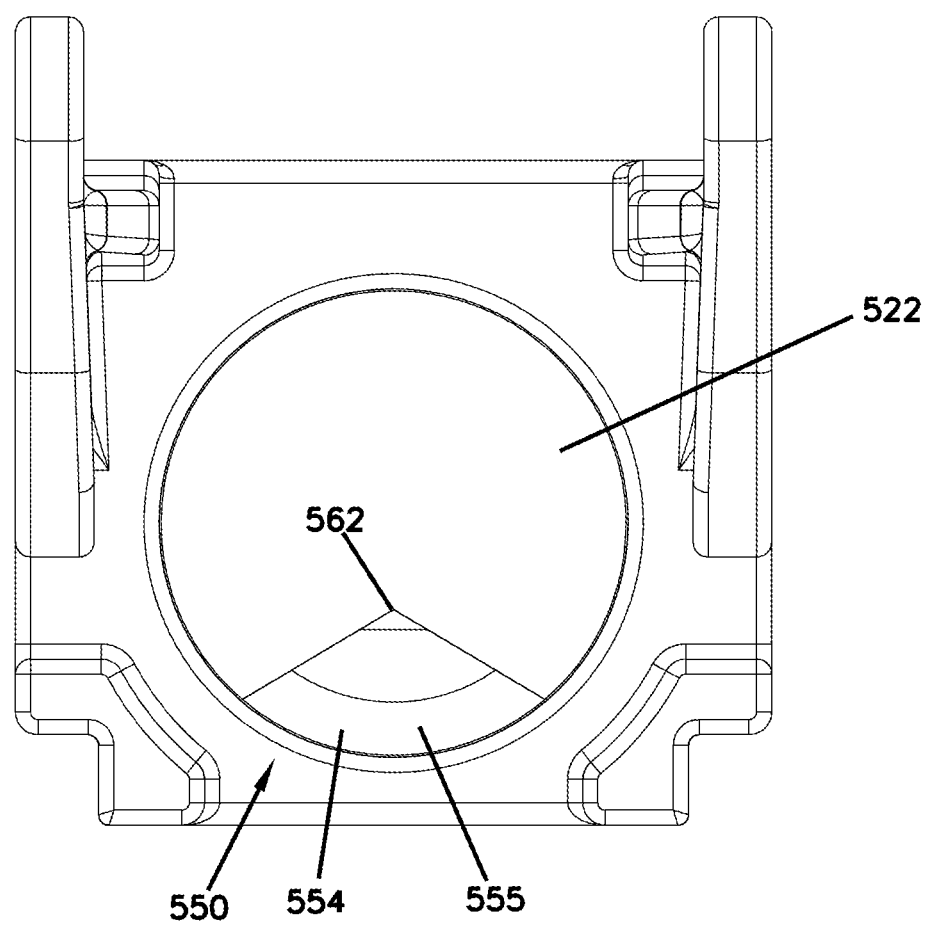
FIG. 23A is a back view of a shutter for an optical connector in accordance with the principles of the present disclosure.
Figure 23B:
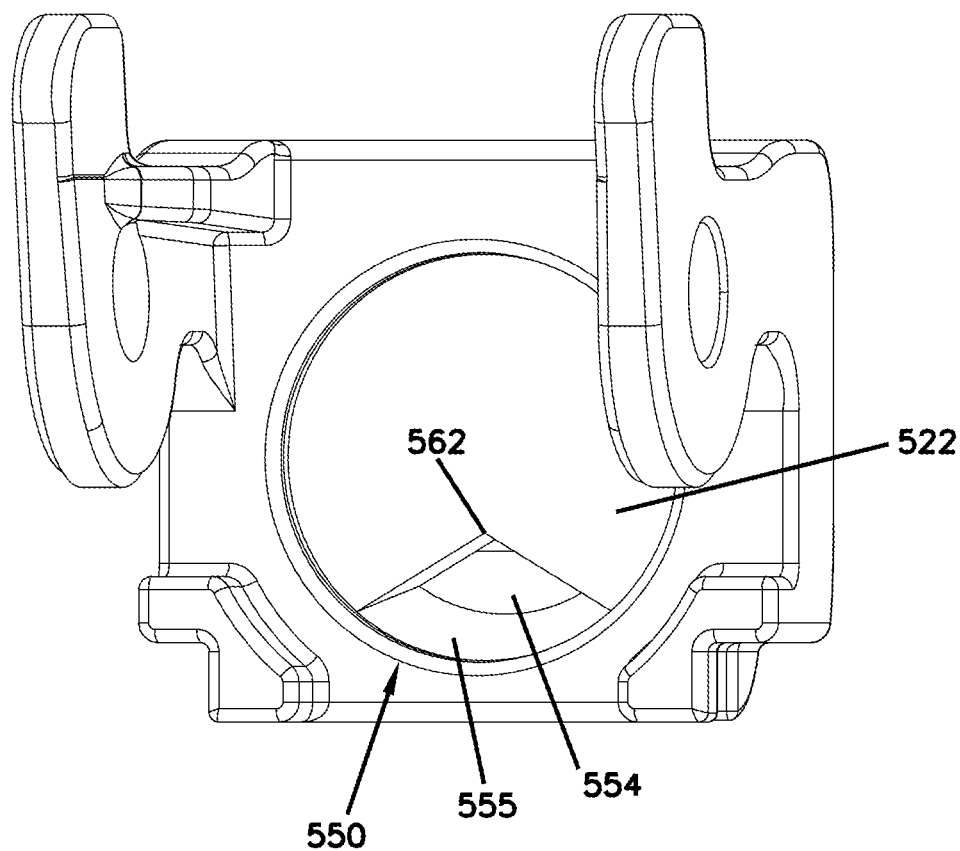
FIG. 23B is back perspective view of the shutter of FIG. 23A.
Figure 23C:
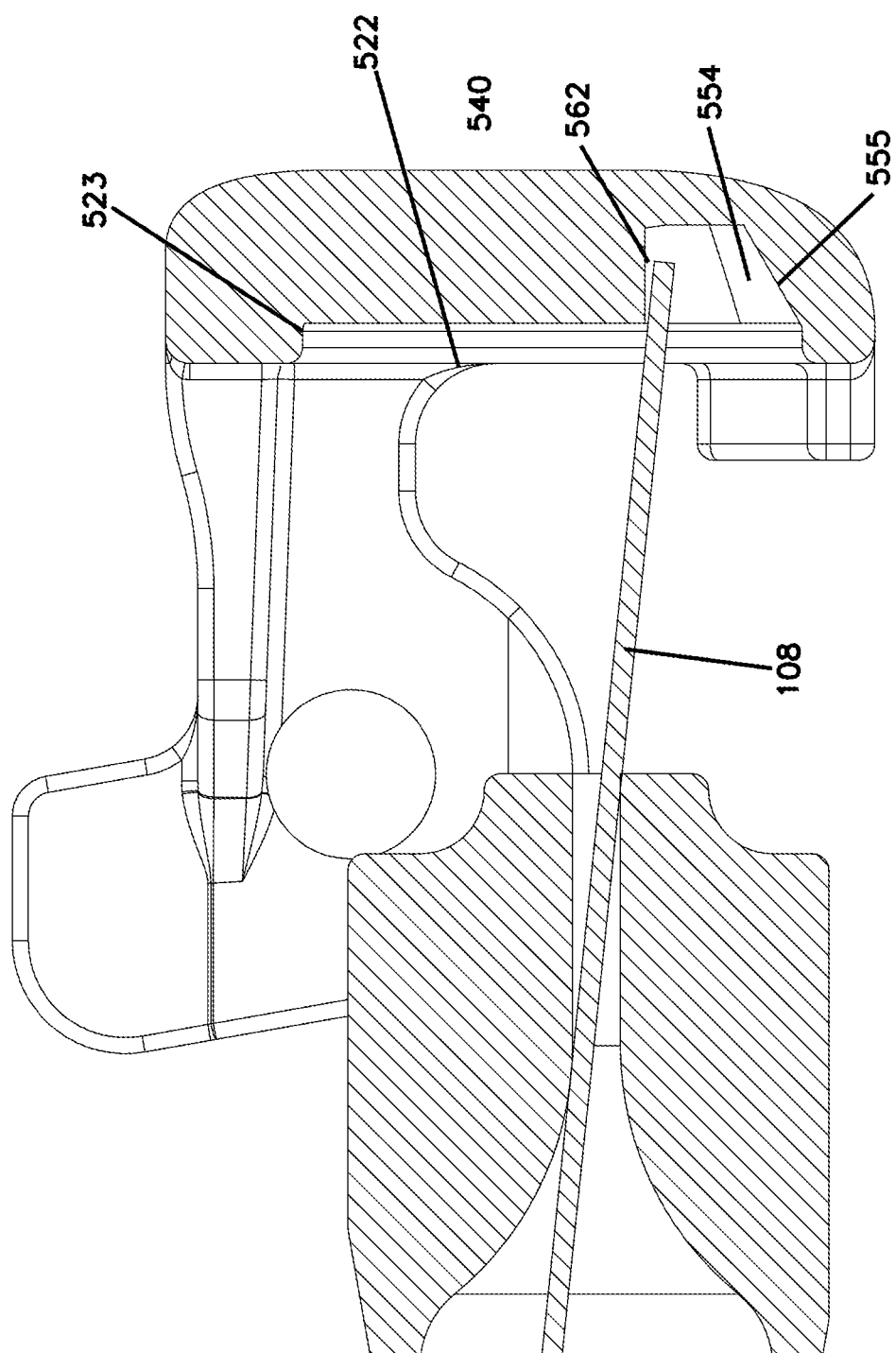
FIG. 23C is a cross-sectional view of the shutter of FIG. 23A with an optical fiber.
Figure 24A:
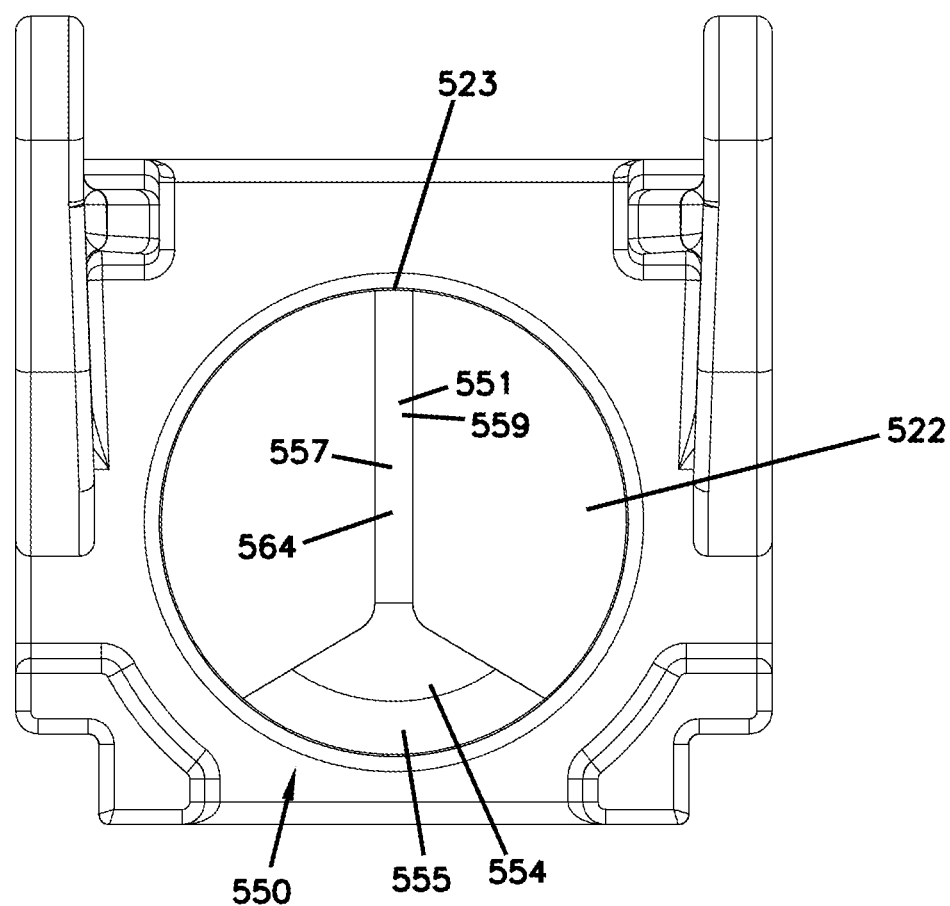
FIG. 24A is a back view of a shutter for an optical connector in accordance with the principles of the present disclosure.
Figure 24B:
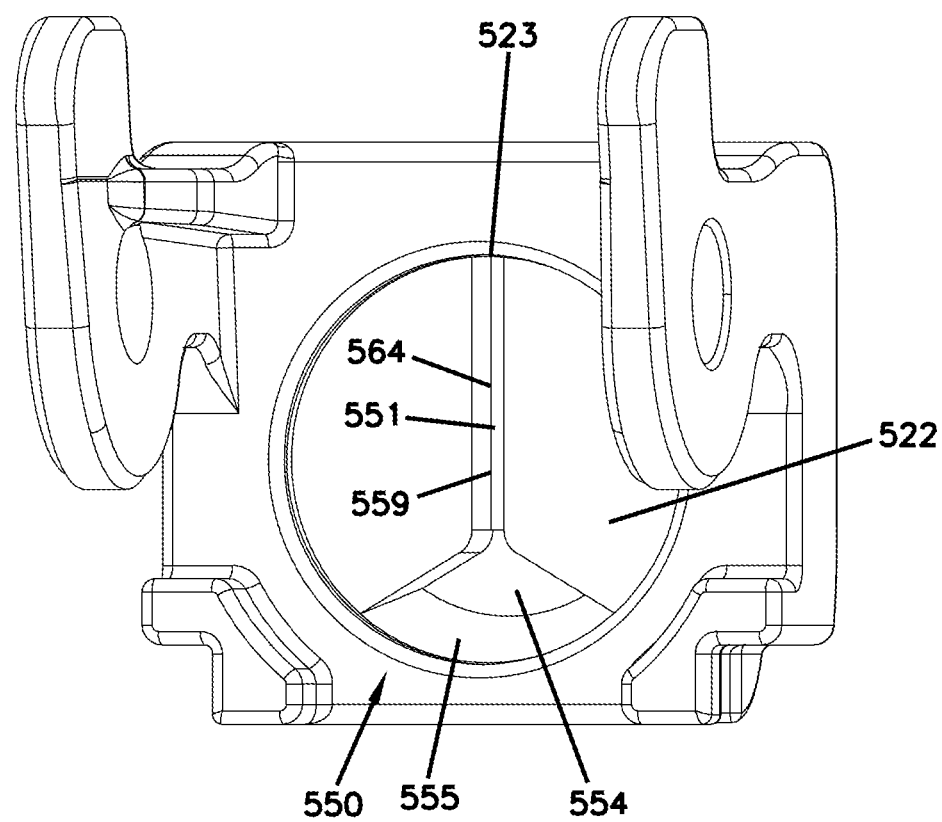
FIG. 24B is back perspective view of the shutter of FIG. 24A.
Figure 24C:
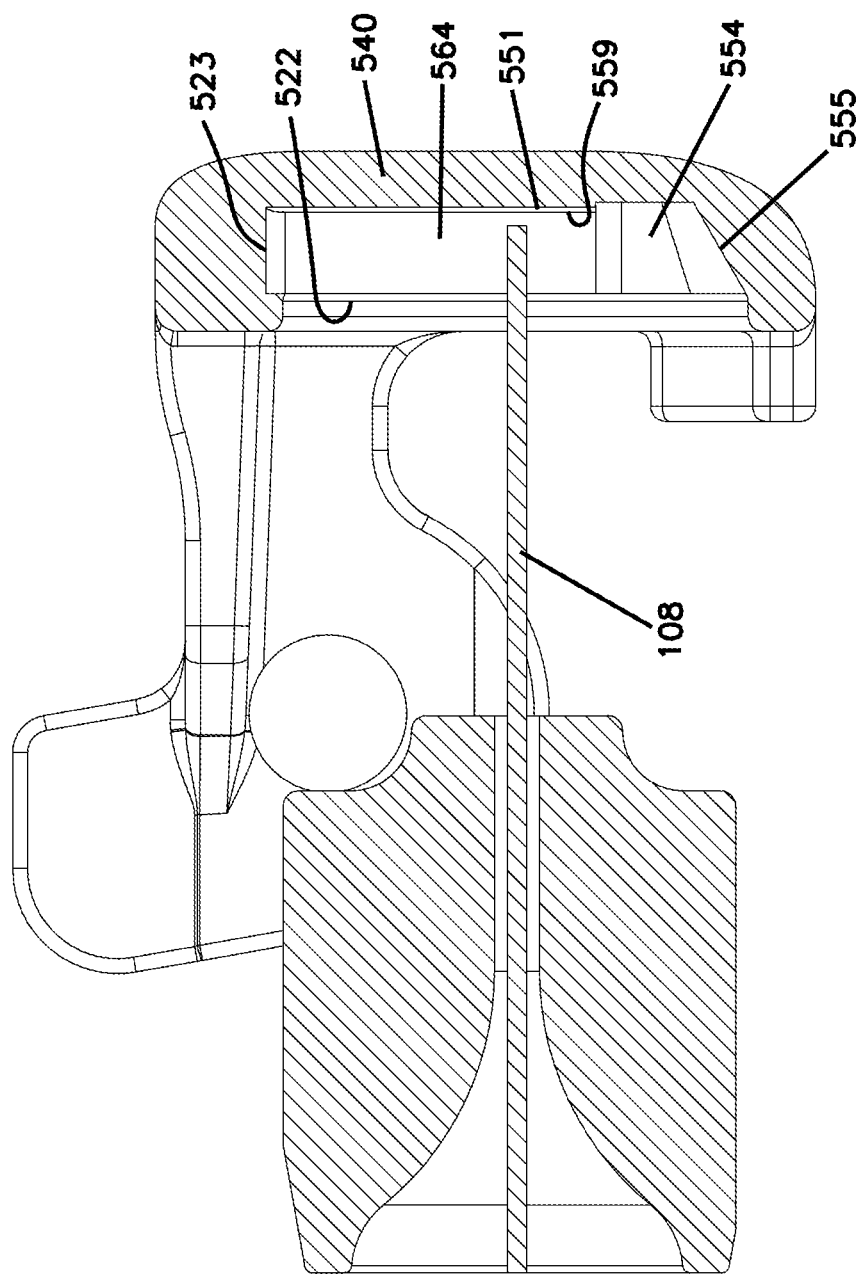
FIG. 24C is a cross-sectional view of the shutter of FIG. 24A with an optical fiber.
Figure 25A:
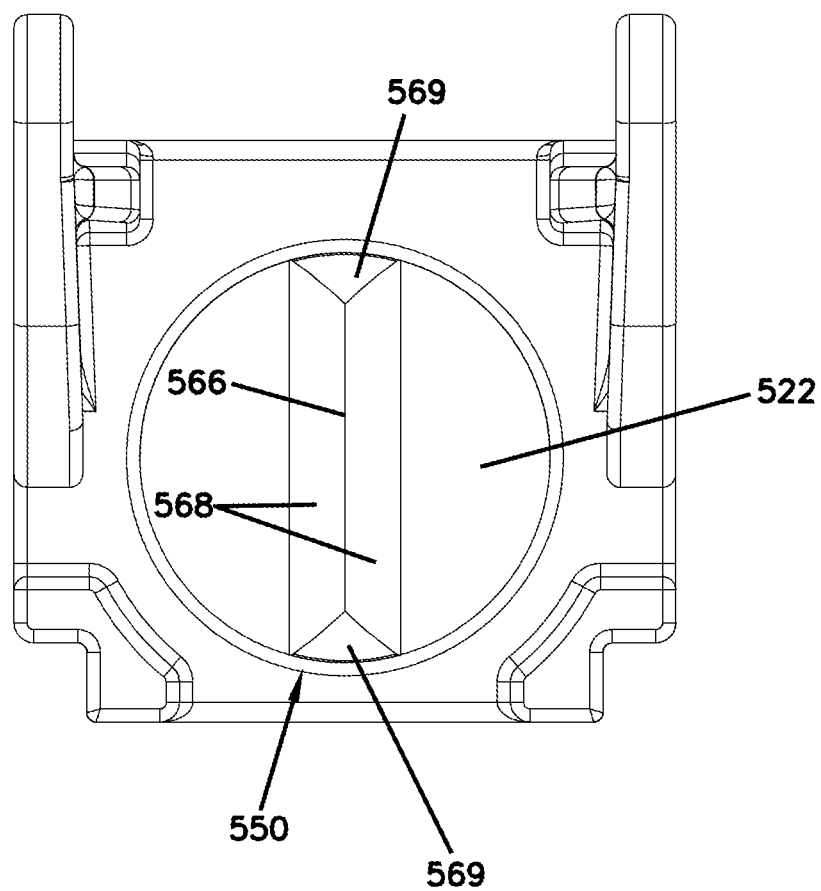
FIG. 25A is a back view of a shutter for an optical connector in accordance with the principles of the present disclosure.
Figure 25B:
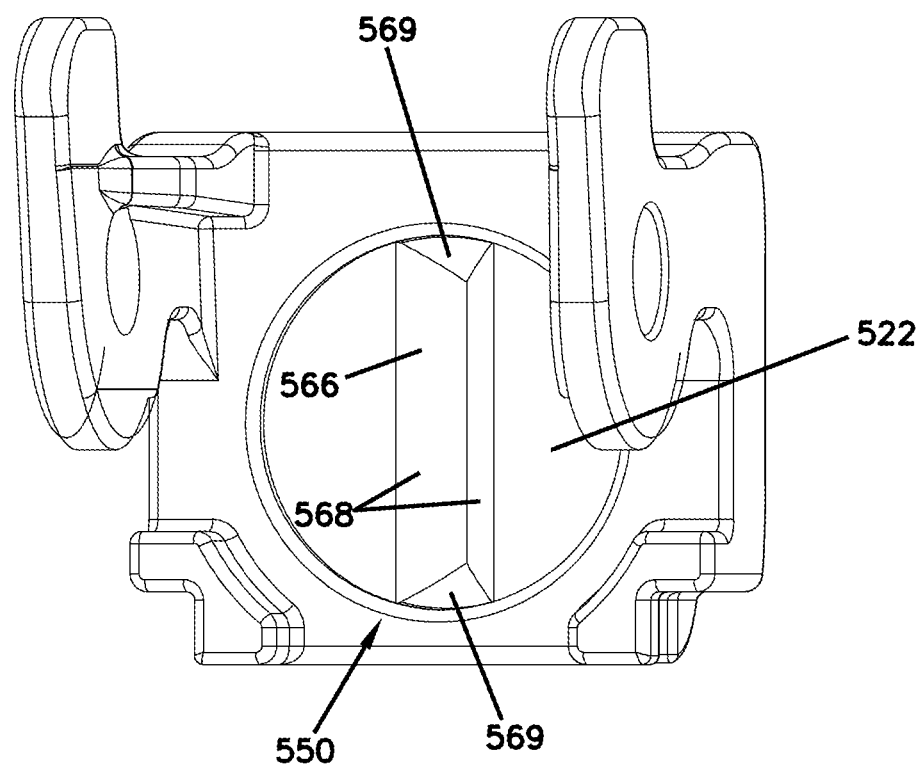
FIG. 25B is back perspective view of the shutter of FIG. 25A.
Figure 25C:
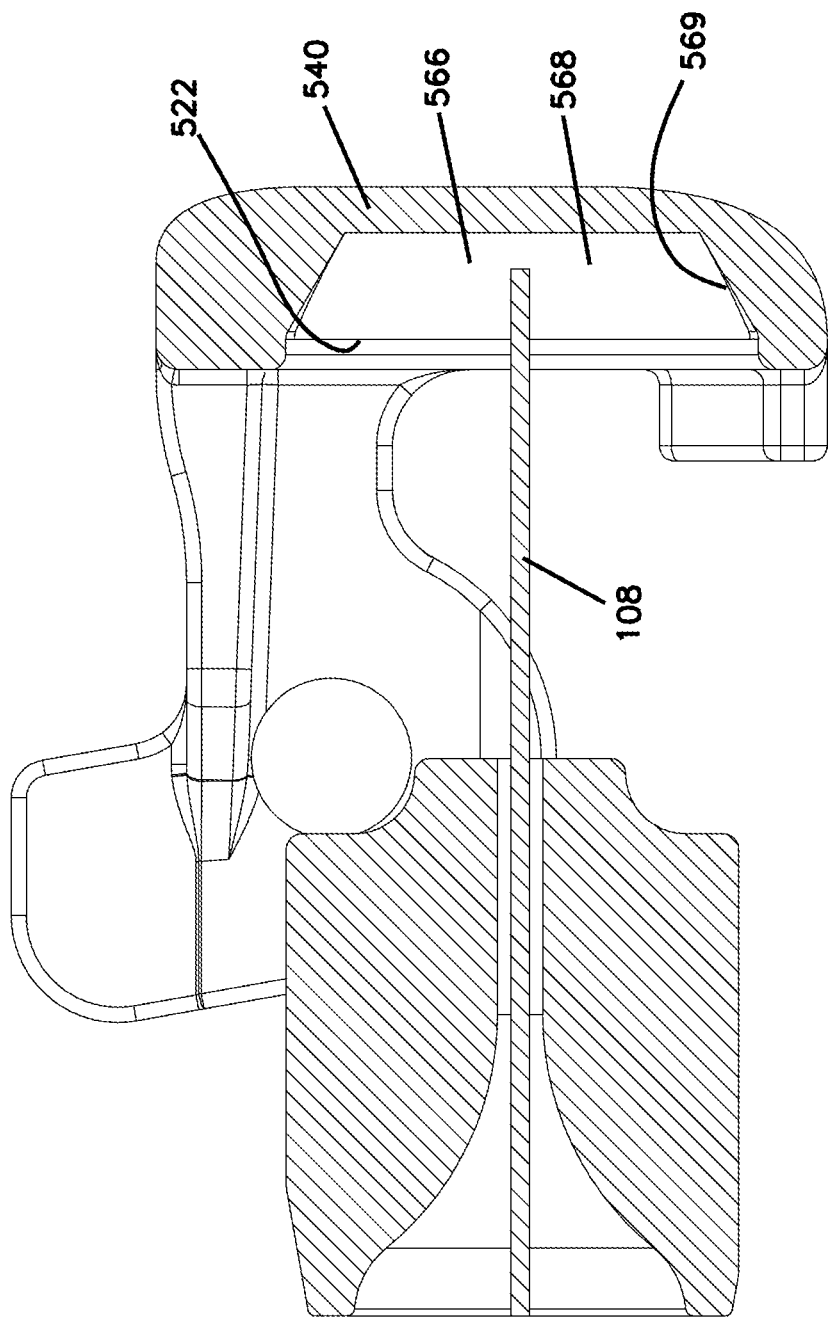
FIG. 25C is a cross-sectional view of the shutter of FIG. 25A with an optical fiber.

In one embodiment shown in FIGS. 23A-23C, the fiber guiding structure 550 does not include a separate tip-receiving portion, but rather, the guiding portion 554 terminates in a corner 562 where the tip of the optical fiber 108 is received. In another embodiment shown in FIGS. 24A-24C, the tip-receiving portion 557 comprises a groove 564 that extends from the guiding portion 554 to the opposite edge 523 of the planar center portion 522. The back wall 551 in the groove 564 may include a single angled facet 559 for directing the light from the optical fiber 108. Yet another embodiment of the fiber guiding structure 550 is shown in FIGS. 25A-25C, where the fiber guiding structure 550 includes a single groove 566 with faceted side walls 568 and top and bottom walls 569, where the groove 566 extends from one edge of the planar center portion at least partially to an opposite edge of the planar center portion.

Providing the shutter 528 with a fiber guiding structure 550 helps capture the position of the optical fiber 108 tip and can help point the tip toward a faceted surface at a specific angle. Further, a fewer number of facets (e.g., a single facet or two facets) is easier to manufacture than a large number of facets, thus resulting in a more consistent and reliable product. Because of the smaller facet surface and the indented structure, the fiber guiding structure 550 does not add or only adds minimally to the thickness of the wall 540. In the embodiments where the end portion of the optical fiber 108 is bent by the tip-receiving portion 557, a very shallow angle of the back wall 551 is sufficient to divert the light coming from the optical fiber 108, further reducing the need for added thickness. For example, the back wall 551 may have an angle of about 3° to 45°, about 4° to 30°, about 5° to 20°, about 5° to 10°, or any number therebetween. The fiber guiding structure 550 also reduces the amount of index matching gel needed because the gel can be provided only in the fiber guiding structure 550 and does not need to cover the whole area of the planar center portion 522.

Fiber Buckling

Optical losses and variance in the adapter system can be further reduced by controlling the direction of buckling of the fiber 108.

According to some aspects, the fiber optic adapter 100 can be arranged such that one of the fiber optic connectors 300 is installed first in a first connector port 110, and the second fiber optic connector 302 is installed second in a second connector port 120, where the adapter 100 and connectors 301, 302 are constructed so that buckling only happens in one of the connectors 300. This can be done, for example, by controlling the order of installation of the connectors, or by altering the geometry of the connectors. For example, the first fiber optic connector 301 can be installed without buckling, and the second fiber optic connector 302 installed after the first fiber optic connector 301 so that buckling only occurs in the second fiber optic connector 302.

The fiber optic adapter 100 can be labelled to indicate which side should be installed first, for example, by including text (e.g., "first" and "second") or a numeric indication (e.g., "1" and "2") by the first and second ports 110, 120. The fiber optic adapter 100 may also be constructed to include a mechanism that prevents a second fiber optic connector 300 from being installed in the second connector port 120 before the first fiber optic connector 300 is installed in the first port 110. For example, the fiber optic adapter 100 can include a latch or other mechanism that protrudes into the second connector port 120 but moves out of the way when the first fiber optic connector 300 is installed. In one embodiment, the fiber optic adapter 100 has a first connector key corresponding to the first fiber optic connector, and a second connector key corresponding to the second fiber optic connector, such that the first and second fiber optic connectors can only be installed in their corresponding ports 110, 120. For example, the port opening can have a shape that corresponds to the respective connector, and is different for the first and second fiber optic connectors. When the order of installation is controlled, also buckling can be controlled so that buckling only occurs in one of the fiber optic connectors. The first and second connector ports 110, 120 and the fiber alignment structure can also be configured to accommodate single fiber ferrule-less fiber optic connectors.

Fiber buckling can also be controlled by constructing the fiber optic connectors 300 so that one of the fiber optic connectors can accommodate more buckling than the other. For example, one of the fiber optic connectors (e.g., the first fiber optic connector) can have an axial length that is shorter than the axial length of the other fiber optic connector (e.g., the second fiber optic connector). Further, one of the fiber optic connectors can be constructed so that it accommodates no fiber buckling or very minimal fiber buckling.

Figure 21:
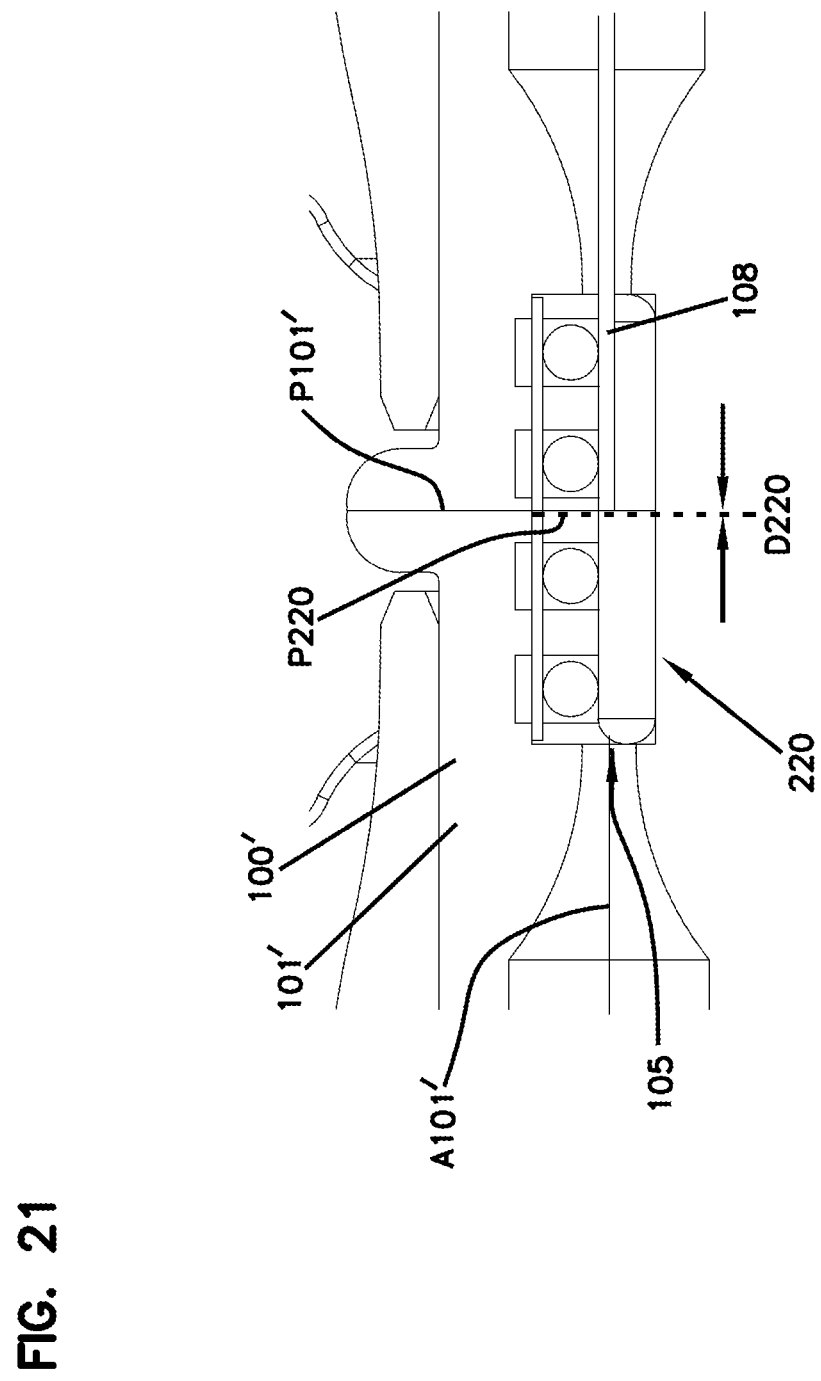
FIG. 21 is an axial cross sectional view of a fiber optic adapter in accordance with the principles of the present disclosure.

In one example, the fiber optic adapter 100' is constructed so that the position of the alignment device 220 is offset in the axial direction, as shown in FIG. 21. In the example, the adapter body 101' defines an adapter axis A101', and the adapter body 101' is bisected by a first reference plane P101' that is perpendicular relative to the adapter axis A101'. A fiber alignment groove 105 extends axially through at least a portion of the adapter body 101'. The fiber alignment groove 105 has an open side that extends axially along the groove. The adapter body 101' also defines a first connector port 110 and a second connector port 120, each aligned along the adapter axis, and the first connector port 110 having an open end that faces in a first axial direction and the second connector port 120 having an open end that faces in a second axial direction. A first portion of the fiber alignment groove 105 corresponds to the first connector port and a second portion corresponds to the second connector port. The fiber alignment structure 220 is mounted within the adapter body 101' such that a second reference plane P220 that bisects the fiber alignment structure 220 in a direction perpendicular relative to the adapter axis A101' is offset from the first reference plane P101' in a direction toward the first or second connector port. The offset distance D220 is greater than what may be expected based on normal manufacturing tolerances in the art, such as when the off-set is unintentionally more than zero. In some embodiments the offset distance D220 is greater than 0.05 mm (50 μm) and up to 0.2 mm (200 μm).

The controlled order of installation can be utilized, for example, in a cassette or a panel having a backside and a front side, where a plurality of fibers 108 can be connected by pre-installing a first set of fibers on the "backside" of the cassette or panel without buckling. The fibers 108 in the first set can be installed so that the end 109 of the fiber 108 is centered in each adapter. A second set of fibers is then connected to the front side of the cassette using connectors 300. Optionally, the alignment device 220 can be off-set such that the alignment device extends further on the side of the second set (the front side of the cassette) than the first set (the backside).

In one aspect, a second set of fibers is connected to the first set using connector plugs with a buckling controller, e.g., a buckling spring 610, to control the direction of buckling of the fibers 108 in the second set of fibers. The connector plugs may be labelled "first" and "second" to indicate order of installation, where the "second" set includes a buckling spring 610. The "first" set may be constructed to be shorter, as the "first" set does not need to include space for buckling and may be constructed without buckling springs, thus allowing for smaller cassettes, adapters, and/or connectors to be provided.

In one aspect, the direction of buckling is controlled by providing a fiber buckling controller that can be used with the ferrule-less fiber connector, where the optical fiber is axially movable relative to the connector tip. The fiber buckling controller includes a flex member that can elastically flex from a first flex position to a second flex position, the first and second flex positions being axial positions relative to the fiber connector tip. The fiber buckling controller can be constructed so that the flex member moves between first and second axial positions when the connector body moves inside the adapter between first and second axial positions along an axis that extends through the fiber buckling zone. The flex member has a curving portion (e.g., a spring member 615) that in the second flex position has a sharper curvature than in the first flex position. In one example, the curving portion is straight or only has a slight curve when the flex member is in the first flex position. The flex member is configured to positively force the optical fiber to buckle within the buckling zone as the flex member moves from the first flex position to the second flex position.

The fiber optic adapter can be constructed to include a positive stop that stops the movement of the connector tip when the connector tip engages the positive stop. The fiber optic connector can continue to move into the connector port, causing the connector body 322 to move from a first axial position to a second axial position. Continued movement of the connector body 322 can then cause the flex member to move from the first flex position to a second flex position, thus causing the buckling of the fiber 108 in the same direction (e.g., upward) as the flex member. The connector body 322 will stop at an end point (e.g., second axial position), where the flex member reaches the second flex position.

One example of the flex member is a buckling spring 610 shown in FIGS. 16A, 16B, and 17A-17D. The buckling spring 610 can be disposed inside the connector plug body 322' in front of the lead-in section into the alignment device 220 as shown. The buckling spring 610 has a height H610, width, and length L610 (as measured in a non-tensioned position), and a spring member 615 extending between a first end 611 and a second end 612. The connector plug body may be provided with a channel 625 for housing the fiber 108 and the buckling spring 610. The channel 625 has a length extending axially from a first end to a second end of the channel 625, a height perpendicular to the length, and a width extending laterally perpendicular to the length and the height. The length and height control the maximum extent of buckling that the buckling spring 610 and the fiber can experience in the channel 625. In some examples the length is about 3-8 times as long as, about 4 times as long, or about 8 times as long the height. The width of the channel 625 is constructed to accommodate the width of the buckling spring and to minimize buckling in the lateral direction. For example, the width can be about the width of the optical fiber, or from about 0.125 mm (125 µm) to 2 mm, or from about 0.125 mm to about 0.5 mm (500 µm). The width of the buckling spring 610 can be just slightly less than the width of the channel 625 so that the buckling spring 610 fits in the channel 625 and can move when the ends of the buckling spring 610 are brought closer together by the insertion of the plug into the adapter. The connector plug body may be provided with an insert 630 that defines the channel 625.

FIGS. 17A-17D show sequential diagrammatic views of the connector plug body 322 being introduced into a fiber optic adapter 100. The buckling spring 610 has a length L610 at rest, and as the connector plug body 322 is pushed further into the adapter 100, the buckling spring 610 is compressed and the length of the buckling spring 610 becomes shorter (shown as L0, L1, L2, and L3). The buckling spring 610 directs the buckling of the fiber 108. The buckling spring 610 continues to bow and to push the fiber 108 in a pre-determined direction (upward in the figures) until the connector plug body 322 is fully seated in the adapter 100.

The buckling spring 610 can be constructed out of any suitable material. In one implementation, the buckling spring 610 is constructed from high temperature thermoplastic that retains its plasticity even after exposure to elevated temperatures. In preferred embodiments, the buckling spring 610 remains flexible throughout the useful lifetime of the connector plug, and provides flexibility to the fiber in the event that the connector plug is unplugged or put under tension from the rear. The flexible buckling spring 610 can maintain the fiber mating location near the center of the alignment mechanism even when the connector plug is tensioned.

Biased Alignment

The fiber insertion axis I is generally aligned with the fiber alignment slot 260, 460. However, when the fiber is inserted into the fiber alignment slot 260, 460 and the fiber biasing members (e.g., first, second, third (or further) balls 270, 271, 272) are inserted to push the fiber into the fiber alignment groove 105, the fiber biasing members may be balanced atop the fiber 108 and may fall onto one side or the other, causing the biasing force to be off-center, potentially misaligning the fiber. When the off-centered alignment is uncontrolled, it may result in optical losses and cause undesirable variability in the fiber connection. In order to control the direction of the biasing force, the fiber biasing members (e.g., first, second, third (or further) balls 270, 271, 272) can be intentionally biased in a controlled manner toward one side in a lateral direction. The fiber contact members can be biased either by constructing the elongated access slot 234 to be off-set from the fiber alignment groove 105, or by directing the biasing force toward one side using the biasing arrangement. In one example, the fiber alignment groove 105 is bisected by a reference plane P that includes the axis of the adapter axis and the insertion axis I, and the fiber biasing members are offset in a lateral direction from the reference plane P by a lateral distance D260. The offset distance is greater than what may be expected based on normal manufacturing tolerances in the art, such as when the off-set is unintentionally more than zero. Generally, the offset distance is less than the thickness of the fiber. In some embodiments the lateral distance (offset) D260 is at least 0.05 mm (50 µm) and up to about 0.125 mm (125 µm).

Figure 18:
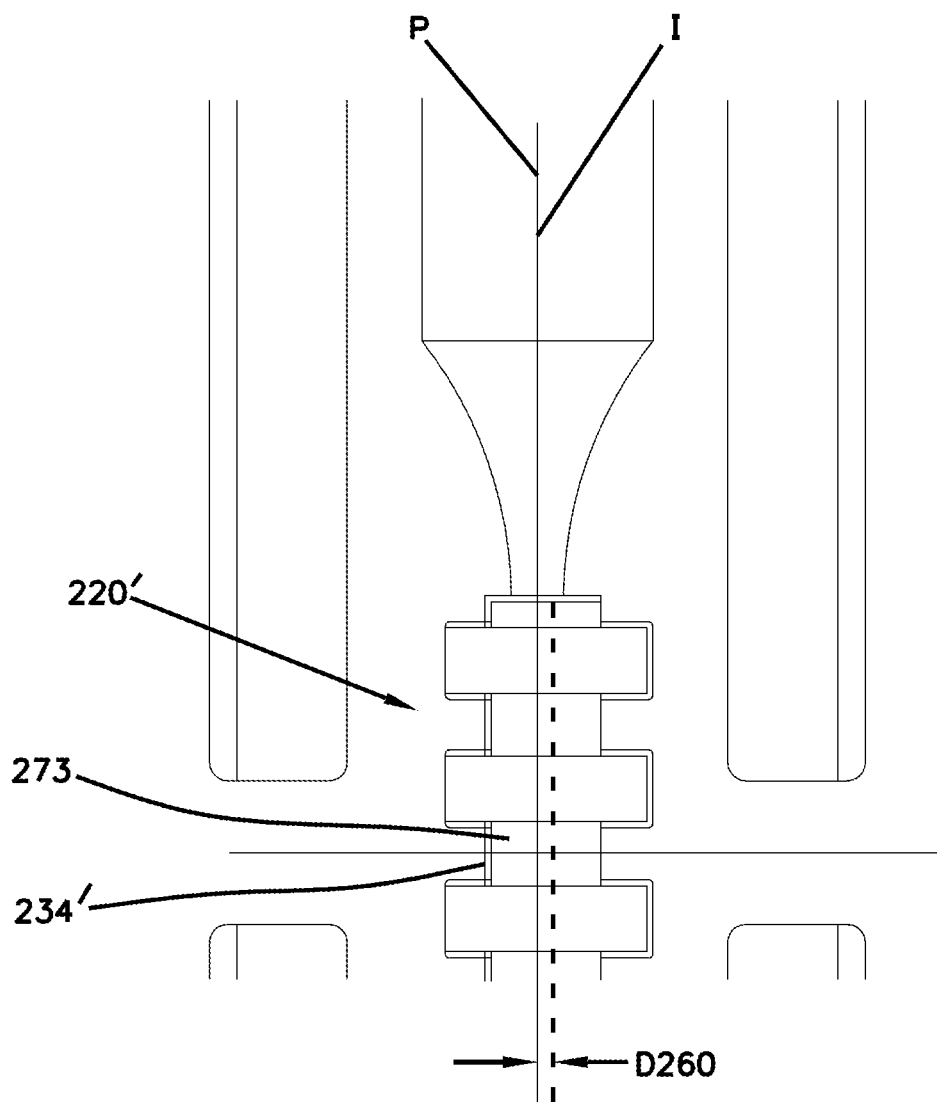
FIG. 18 is a cross sectional top view of a fiber alignment device in accordance with the principles of the present disclosure having a fiber biasing member laterally offset from an alignment groove.
Figure 20A:
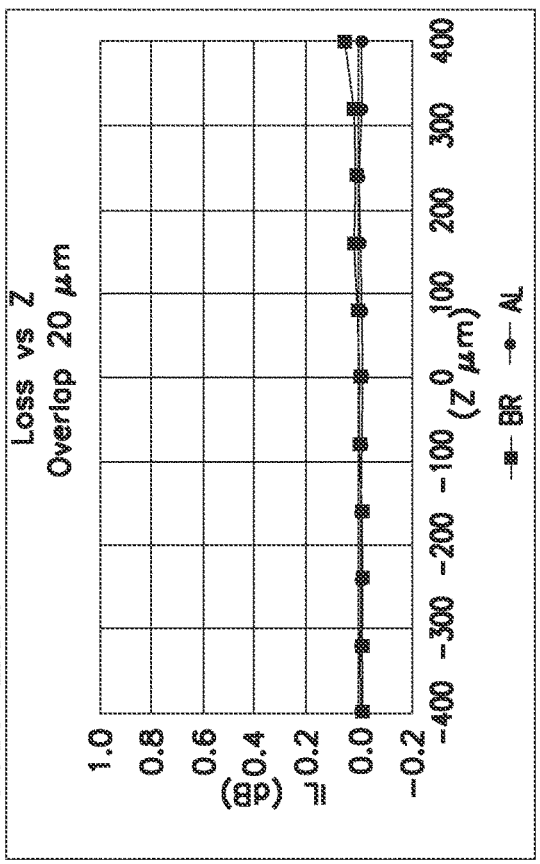
FIGS. 20A-20D are graphical presentations of the results from Example 1.
Figure 20B:
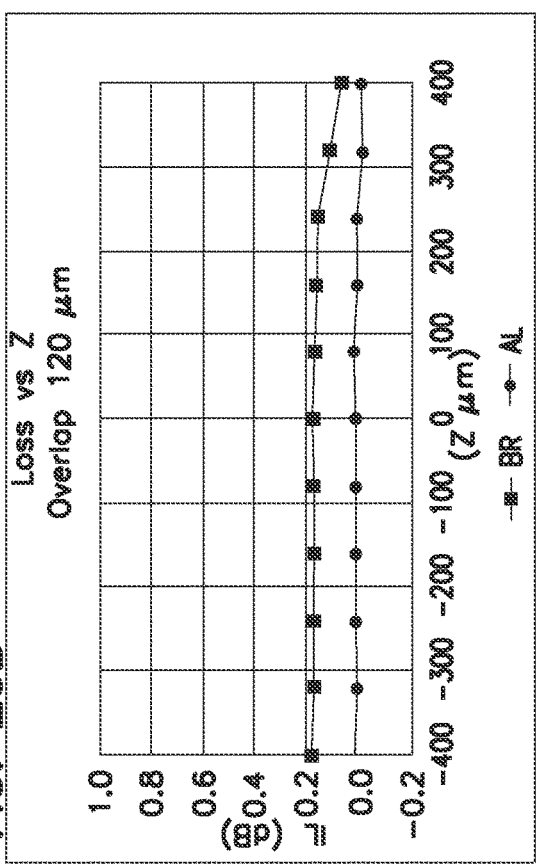
Figure 20C:
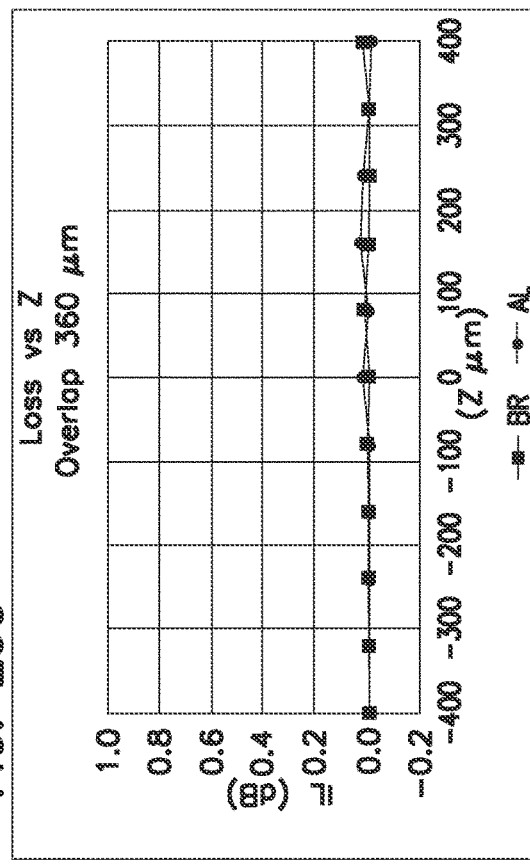
Figure 20D:
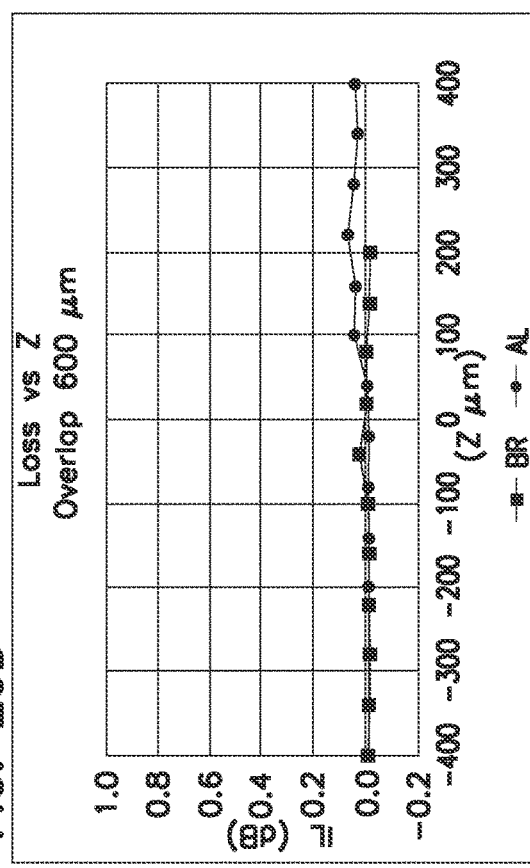

An exemplary implementation of an off-set fiber contact member (fiber contact rod 273) is shown in FIG. 18. The depicted embodiment includes a fiber contact rod 273 that biases the fiber into the fiber alignment groove 105. The elongated access slot 234' for the fiber contact rod 273 is positioned off-center by distance D260 as compared to the fiber insertion axis I. The alignment structure can also be constructed with balls or other fiber biasing members.

Lead-In Funnel

The adapter body 101' comprises a lead-in section 160 with a funnel portion 162 and a cylindrical portion 164. According to one aspect shown in FIG. 19, the cylindrical portion 164 has tapered walls 165. The cylindrical portion 164 includes a first width W31 at the proximal end and a second width W32 at the distal end, where the distal end is the plug end that is plugged into the adapter and disposed adjacent to the alignment device 220. In an embodiment, the tapered walls 165 widen toward the distal end such that the second width W32 is greater than the first width W31. Thus, when the fiber is inserted into the lead-in section 160, it is less likely to come into contact with the tapered walls 165 or any dust or dirt that may have been collected there. The second width W32 can be greater than the first width W31 by at least twice the width of the optical fiber. For example, the second width W32 can be greater than the first width W31 by at least 0.25 mm (250 µm). In one embodiment, the second width W32 is greater than the first width W31 by about 0.25 mm to about 0.5 mm.

To provide the lead-in section 160 with the tapered walls 165, the adapter body 101' may be constructed out to two halves 101A, 101B, as shown in FIG. 19.

Example 1

Exemplary alignment devices were prepared according to the embodiment shown in FIGS. 8A-8E for testing optical loss. The alignment devices included three balls that were biased against the fibers using three springs. The overlap of the fiber tips (i.e., the excess length of the free fiber tips when two fiber connectors are connected) was arranged at 20 µm, 120 µm, 360 µm, and 600 µm. The optical loss across the fiber connection was measured and recorded. The results are shown in FIGS. 20A-20D. It was observed that the optical loss was significantly lower than in the testing using two balls, and was not as dependent on the amount of overlap or the position of the mating interface within the ±400 µm window of measurement.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A fiber optic connector comprising:
   a plug body defining a distal plug end and an opposite proximal end;
   an optical fiber defining a fiber axis, the optical fiber extending along the fiber axis at least partially through the plug body, the optical fiber including a free end portion that extends outwardly from the plug body distally beyond the distal plug end, the free end portion of the optical fiber not being supported by a ferrule;
   a shutter pivotally connected to the plug body, the shutter being pivotally movable relative to the plug body between an open position and a closed position, the shutter including an inside wall with a planar center portion having an interior receptacle that contains gel used to protect and clean the free end portion of the optical fiber when the shutter is in the closed position, wherein the interior receptacle receives the free end portion of the optical fiber and causes the free end portion of the optical fiber to bend away from the fiber axis when the shutter is in the closed position; and
   a reflective structure integrated with the inside wall of the shutter that reflects light away from the optical fiber.

2. The fiber optic connector of claim 1, wherein the reflective structure includes a plurality of angled facets.

3. The fiber optic connector of claim 1, wherein the reflective structure includes a guiding portion and a tip-receiving portion that are part of an integrated depression in the planar center portion of the shutter.

4. The fiber optic connector of claim 1, wherein the reflective structure is formed as a cut-out or groove on the planar center portion of the inside wall of the shutter.

5. The fiber optic connector of claim 3, wherein the reflective structure has a back wall and sloping side walls that lead into the tip-receiving portion.

6. The fiber optic connector of claim 5, wherein the back wall of the reflective structure includes one or more angled facets that reflect light away from the optical fiber.

7. The fiber optic connector of claim 3, wherein the tip-receiving portion has side walls that partially circumscribe the free end portion of the optical fiber.

8. The fiber optic connector of claim 3, wherein the guiding portion of the reflective structure terminates in a corner where the free end portion of the optical fiber is received.

9. The fiber optic connector of claim 3, wherein the tip-receiving portion includes a groove that extends from the guiding portion of the reflective structure to an opposite edge of the planar center portion of the shutter.

10. The fiber optic connector of claim 9, wherein the groove includes a single angled facet for directing light from the optical fiber.

11. The fiber optic connector of claim 1, wherein the reflective structure includes a single groove with faceted side walls and top and bottom walls.

12. The fiber optic connector of claim 11, wherein the single groove extends from one edge of the planar center portion of the shutter at least partially to an opposite edge of the planar center portion.

13. The fiber optic connector of claim 1, wherein the reflective structure guides the free end portion of the optical fiber toward a faceted surface at a specific angle.

14. The fiber optic connector of claim 5, wherein the free end portion of the optical fiber is bent by the tip-receiving portion of the reflective structure, and wherein a shallow angle of the back wall diverts light coming from the optical fiber.

15. The fiber optic connector of claim 2, wherein the plurality of angled facets are disposed at an angle of 5 degrees to 45 degrees relative to a plane perpendicular to the fiber axis.

16. The fiber optic connector of claim 2, wherein the plurality of angled facets are disposed at an angle of 8 degrees to 30 degrees relative to a plane perpendicular to the fiber axis.

17. The fiber optic connector of claim 2, wherein the plurality of angled facets are disposed at an angle of 10 degrees to 0 degrees relative to a plane perpendicular to the fiber axis.

18. The fiber optic connector of claim 2, wherein the plurality of angled facets are disposed at an angle of 12 degrees to 16 degrees relative to a plane perpendicular to the fiber axis.

19. The fiber optic connector of claim 3, wherein the tip-receiving portion is positioned at a distance from a center of the planar center portion, and wherein the tip-receiving portion is positioned 10 percent to 90 percent of the way from the center toward an edge of the planar center portion.

20. A fiber optic connector comprising:
   a plug body defining a distal plug end and an opposite proximal end;
   an optical fiber defining a fiber axis, the optical fiber extending along the fiber axis at least partially through the plug body, the optical fiber including a free end portion adjacent to the distal plug end, the free end portion of the optical fiber not being supported by a ferrule;
   a shutter pivotally connected to the plug body, the shutter being pivotally movable relative to the plug body between an open position and a closed position, the shutter having an interior receptacle that contains gel used to protect and clean the free end portion of the optical fiber when the shutter is in the closed position; and
   a reflective structure integrated with the shutter within the interior receptacle configured to reflect light away from the optical fiber.

21. A fiber optic connector comprising:
   a plug body defining a distal plug end and an opposite proximal end;
   an optical fiber defining a fiber axis, the optical fiber extending along the fiber axis at least partially through the plug body, the optical fiber including an end portion positioned adjacent the distal plug end;
   a shutter being movable relative to the plug body between an open position and a closed position, the shutter having an interior receptacle including a light distribution structure and a gel, wherein the end portion of the optical fiber contacts the gel when the shutter is in the closed position.

22. The fiber optic connector of claim 21, wherein the shutter being movable relative to the plug body comprises the shutter being pivotally movable relative to the plug body.

23. The fiber optic connector of claim 21, wherein the end portion is a bare fiber end.

* * * * *